US 6,636,199 B2

(12) United States Patent
Kobayashi

(10) Patent No.: US 6,636,199 B2
(45) Date of Patent: Oct. 21, 2003

(54) COORDINATE INPUT APPARATUS AND METHOD, COORDINATE INPUT POINTING DEVICE, STORAGE MEDIUM, AND COMPUTER PROGRAM

(75) Inventor: Kiwamu Kobayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 227 days.

(21) Appl. No.: 09/826,911

(22) Filed: Apr. 6, 2001

(65) Prior Publication Data
US 2001/0050672 A1 Dec. 13, 2001

(30) Foreign Application Priority Data

Apr. 7, 2000 (JP) ........................... 2000-106901
Feb. 15, 2001 (JP) ........................... 2001-038862

(51) Int. Cl.$^7$ ................................. G09G 5/08
(52) U.S. Cl. ........................... 345/158; 250/221
(58) Field of Search ..................... 345/157, 158, 345/169; 348/734; 250/221, 229

(56) References Cited

U.S. PATENT DOCUMENTS

| 4,886,943 A | 12/1989 | Suzuki et al. ........... 178/18 |
| 4,887,245 A | 12/1989 | Mori et al. ........... 367/129 |
| 4,931,965 A | 6/1990 | Kaneko et al. ........... 33/1 P |
| 4,980,518 A | 12/1990 | Kobayashi et al. ........... 178/18 |
| 5,070,325 A | 12/1991 | Tanaka et al. ........... 340/706 |
| 5,097,102 A | 3/1992 | Yoshimura et al. ........... 178/18 |
| 5,142,106 A | 8/1992 | Yoshimura et al. ........... 178/18 |
| 5,239,138 A | 8/1993 | Kobayashi et al. ........... 178/18 |
| 5,349,460 A | * 9/1994 | Ogasahara et al. |
| 5,359,348 A | * 10/1994 | Pilcher et al. |
| 5,500,492 A | 3/1996 | Kobayashi et al. ........... 178/18 |
| 5,539,678 A | 7/1996 | Tanaka et al. ........... 364/561 |
| 5,565,893 A | 10/1996 | Sato et al. ........... 345/177 |
| 5,574,479 A | * 11/1996 | Odell |
| 5,644,126 A | * 7/1997 | Ogawa |
| 5,736,979 A | 4/1998 | Kobayashi et al. ........... 345/173 |
| 5,805,147 A | 9/1998 | Tokioka et al. ........... 178/18 |
| 5,818,429 A | 10/1998 | Tanaka et al. ........... 345/173 |
| 5,831,603 A | 11/1998 | Yoshimura et al. ........... 345/177 |
| 5,936,207 A | 8/1999 | Kobayashi et al. ........... 345/175 |

FOREIGN PATENT DOCUMENTS

JP  2000-112644  4/2000

* cited by examiner

Primary Examiner—Regina Liang
(74) Attorney, Agent, or Firm—Fitzpatrick, Cella, Harper & Scinto

(57) ABSTRACT

In inputting coordinate data on an information display screen from a pointing device, a signal is transmitted from the pointing device to a light-receiving element of a fixed unit by infrared light, a signal representing the tilt of the pointing device itself is received by light-receiving elements of the pointing device by infrared light, and on the basis of the signal, coordinate data is calculated by the coordinate calculation section of the pointing device. In this case, the pointing device can obtain the relative tilt of the pointing device itself as coordinate data by the interaction with respect to the fixed unit.

59 Claims, 34 Drawing Sheets

OUTER APPEARANCE OF POINTING DEVICE

FRONT SURFACE OF POINTING DEVICE

Ax: X DIRECTION PARAMETER

OVERALL VIEW

FRONT SURFACE OF POINTING DEVICE
YO LINE SENSOR
101
LIGHT-EMITTING ELEMENT 0
X0 LINE SENSOR

Ax1: X1 DIRECTION PARAMETER

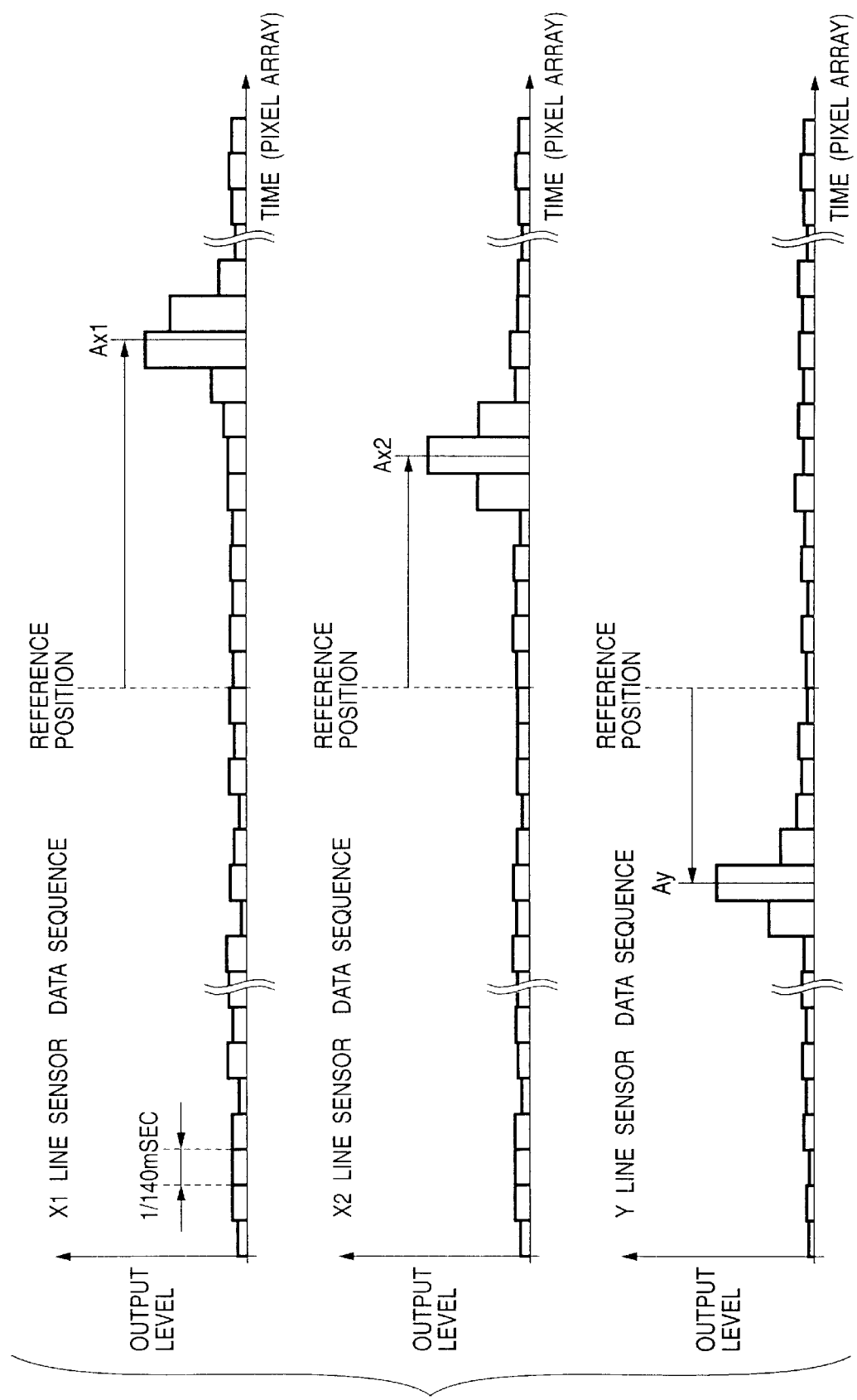

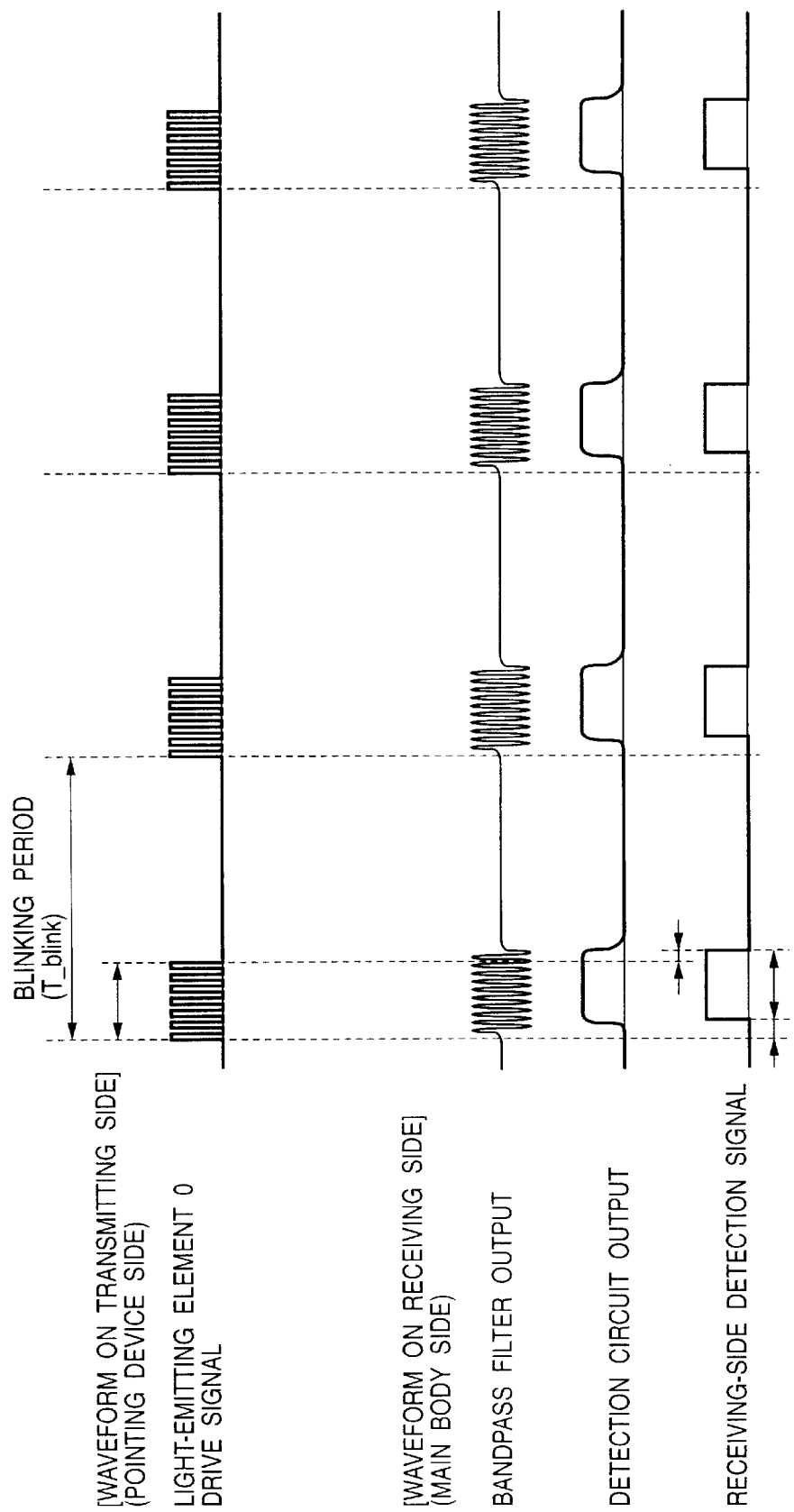

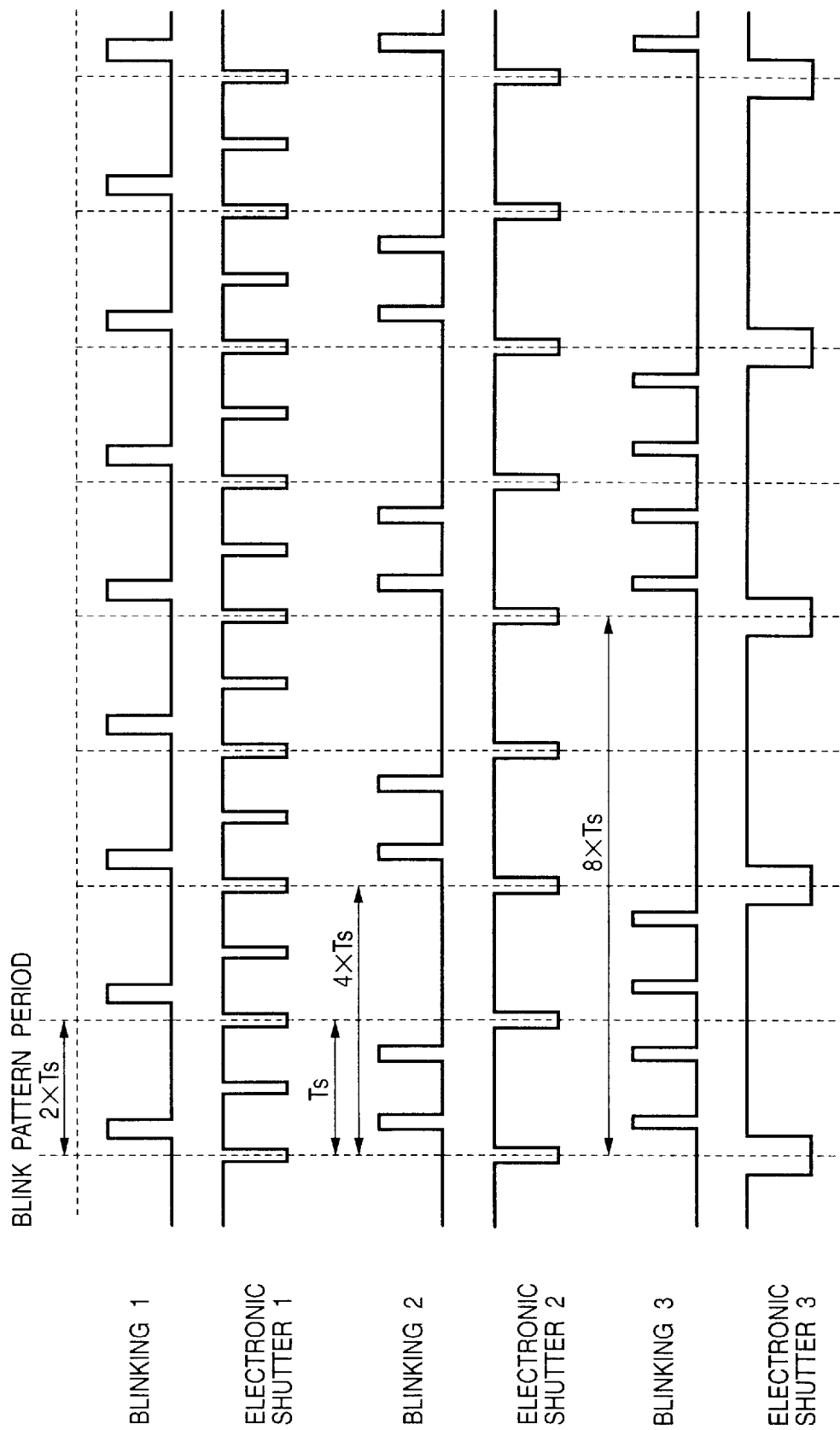

COORDINATE INPUT APPARATUS AND METHOD, COORDINATE INPUT POINTING DEVICE, STORAGE MEDIUM, AND COMPUTER PROGRAM

FIELD OF THE INVENTION

The present invention relates to a coordinate input apparatus and method and coordinate input pointing device which input coordinates using a pointing device and, more particularly, to a coordinate input apparatus which inputs 2D/3D position coordinates by operating a pointing device at a remote place almost toward the information display screen of a display device and consequently inputs a graphic pattern or character or a command for controlling the system to a terminal device connected to the display device.

BACKGROUND OF THE INVENTION

Conventional remote coordinate input apparatuses of following types are available.

For example, an apparatus of first type has a plurality of light-emitting elements laid out in a predetermined form on the pointing device side. The user appropriately tilts the pointing device to input coordinates. For this purpose, a light-receiving element is prepared on the fixed unit (stationary unit) side. The light-receiving element detects that the relative intensity between light beams emitted to the stationary unit side from the plurality of light-emitting elements on the pointing device side changes as the pointing device tilts, thereby calculating coordinates or the amounts of changes in coordinates.

An apparatus of second type irradiates a desired position on a display screen with a laser beam from a pointing device generally called a pointer. The image of the laser beam is detected by a camera behind the screen or on the front side of the display screen, thereby inputting coordinates or the amounts of changes in coordinates.

Conventional application examples of coordinate input apparatuses are a coordinate input apparatus in a system or application software for processing 3D coordinates, such as 3D CAD, 3D layout tool, 3D operation game, or 3D motion measurement apparatus, an operation apparatus, and a multimedia apparatus, amusement apparatus, and educational apparatus which serve as human interfaces and are used to receive the action or sign of a user as input information. These apparatuses for processing 3D coordinates include the following types.

1) An apparatus which uses a sensor supported by an articulated mechanism and detects the 3D motion or position of an object whose coordinates are to be input on the basis of mechanical contact between the sensor and the object whose coordinates are to be input, or mechanical deformation or dynamic acceleration of the sensor.

2) An apparatus which input 3D coordinates by a combination of 2D input operations of, e.g., a joystick.

3) An apparatus which calculates 3D coordinates by arithmetically processing a stereo image obtained by a plurality of video cameras sensitive to visible light or infrared light.

4) An apparatus disclosed in Japanese Patent Laid-Open No. 2000-112644, which comprises a pointing device that has a light-emitting element and points a 3D position, and a light-receiving element formed from a plurality of sensors for receiving light emitted from the light-emitting element and measuring the 3D position where the light-emitting element is present, so that the 3D coordinates at which the pointing device is located are calculated on the basis of a measurement value obtained by the light-receiving element.

Generally, such coordinate input apparatuses using light have the following problems.

In the apparatus of first type which has a plurality of light-emitting elements only on the pointing device, since the relative intensity of light is used as position information, the accuracy of the resultant coordinates or coordinate change amounts is low.

The apparatus of second type is not always safe because a laser beam is used. Additionally, since image processing is used, load on the computer is large. This poses a problem of response speed. Furthermore, even the necessity of a camera makes the hardware bulky.

For the conventional coordinate input apparatuses for processing 3D coordinates, the method 1) requires a large-scale mechanism and high manufacturing cost and therefore cannot cope with application purposes in a wide range. In the method 2), the user cannot intuitively input 3D coordinates, and no real-time and continuous processing can be performed. In the method 3), a continuous still image or moving image has an enormous data amount, and the arithmetic amount in calculating 3D coordinates is large. This increases load on the computer-side CPU and therefore makes real-time processing impossible and delays other processing.

Generally, 3D input includes 3D translation coordinate input (translational motion input) and 3-axis rotation angle input (rotational motion input). No apparatuses satisfactorily achieve both the input modes. The method 4) still has room left unsolved in this point.

SUMMARY OF THE INVENTION

The present invention has been made in consideration of the above situation, and has as its object to provide a coordinate input apparatus and apparatus, coordinate input pointing device, storage medium, and computer program, which are relatively simple and safe to handle and can accurately obtain coordinate data at a very high response speed.

A first coordinate input apparatus of the present invention is a coordinate input apparatus which comprises a fixed unit fixed at a predetermined position and a pointing device operated by a user and inputs coordinate data representing coordinates by the pointing device, wherein the fixed unit comprises first reception means for receiving a first signal from the pointing device, and first transmission means for transmitting a second signal to the pointing device, and the pointing device comprises second reception means for receiving the second signal from the first transmission means, coordinate calculation means for calculating the coordinate data on the basis of the second signal received by the second reception means, and second transmission means for transmitting at least the coordinate data calculated by the coordinate calculation means to the first reception means as the first signal.

According to an aspect of the first coordinate input apparatus of the present invention, the second transmission means transmits a signal containing switch information representing a start of operation and a supplementary information signal to the first reception means as the first signal.

According to an aspect of the first coordinate input apparatus of the present invention, each of the first and second transmission means comprises a light-emitting element for emitting light.

According to an aspect of the first coordinate input apparatus of the present invention, each of the first and second reception means comprises a light-receiving element for receiving light.

According to an aspect of the first coordinate input apparatus of the present invention, the second reception means comprises a single-pixel light-receiving element and a plurality of line sensors laid out in different directions.

According to an aspect of the first coordinate input apparatus of the present invention, each of the line sensors comprises a linear photoelectric conversion element having a circulative charge transfer path constituted by a plurality of cells, and the line sensor is designed to transfer charges simultaneously from all pixels of an arbitrary linear photoelectric conversion element to a charge transfer path connected to the circulative charge transfer path as a branch and then transfer the charges to the circulative charge transfer path, or transfer the charges simultaneously from all pixels of an arbitrary linear photoelectric conversion element directly to the circulative charge transfer path.

According to an aspect of the first coordinate input apparatus of the present invention, the line sensor circulates the charges on the circulative charge transfer path in synchronism with ON/OFF of an electronic shutter function and additionally accumulates the charges from the photoelectric conversion element at the same line position in every circulation of the charges, and a signal read section is connected to a cell midway along the circulative charge transfer path to externally output a voltage proportional to the charges passing through the cell or output a voltage proportional to a difference in passing charges between two adjacent cells.

According to an aspect of the first coordinate input apparatus of the present invention, the electronic shutter function is turned on once at timings when the first transmission means emits light and the first transmission means emits no light to transfer the charges simultaneously from all pixels of the linear photoelectric conversion element to corresponding cells of the circulative charge transfer path once at each timing, and the line sensor is designed to externally perform control to circulate the charges while additionally accumulating the charges by turning on/off the electronic shutter function and control to circulate the charges while fixing the electronic shutter function in an OFF state to stop additionally accumulating the charges.

According to an aspect of the first coordinate input apparatus of the present invention, the number of times of additional accumulation of the charges of the line sensor is controlled by the external control function in accordance with a reception amount of the light emitted from the first transmission means.

According to an aspect of the first coordinate input apparatus of the present invention, the second transmission means synthesizes the coordinate data with a timing signal for synchronizing operation of the line sensor with that of the first transmission means and transmits the synthesized signal to the first reception means as the first signal.

According to an aspect of the first coordinate input apparatus of the present invention, the first transmission means blinks in synchronism with the electronic shutter function in accordance with a predetermined timing sequence generated on the basis of the timing signal.

A first coordinate input method of the present invention is a coordinate input method in which a fixed unit fixed at a predetermined position and a pointing device operated by a user are used, and the pointing device is used to input coordinate data representing coordinates, comprising:

the first transmission step of transmitting a first signal representing a start of operation from the pointing device to the fixed unit;

the first reception step of receiving the first signal by the fixed unit;

the second transmission step of transmitting a second signal representing a direction of presence of the fixed unit itself to the pointing device;

the second reception step of receiving the second signal by the pointing device; and the calculation step of calculating the coordinate data in the pointing device on the basis of the second signal.

According to an aspect of the first coordinate input method of the present invention, each of the first and second signals is an optical signal emitted/received between the fixed unit and the pointing device.

A coordinate input pointing device of the present invention is a coordinate input pointing device operated by a user and used to input coordinate data representing coordinates to a fixed unit fixed at a predetermined position, comprising:

transmission means for transmitting a first signal to the fixed unit;

reception means for receiving a second signal from the fixed unit; and coordinate calculation means for calculating the coordinate data on the basis of the second signal received by the reception means, wherein the coordinate data calculated on the basis of the second signal is transmitted to the fixed unit as the first signal.

According to an aspect of the coordinate input pointing device of the present invention, a signal containing switch information representing a start of operation and a supplementary information signal are transmitted to the fixed unit as the first signal.

According to an aspect of the coordinate input pointing device of the present invention, the transmission means comprises a light-emitting element for emitting light.

According to an aspect of the coordinate input pointing device of the present invention, the reception means comprises a light-receiving element for receiving light.

According to an aspect of the coordinate input pointing device of the present invention, the reception means comprises a single-pixel light-receiving element and a plurality of line sensors laid out in different directions.

According to an aspect of the coordinate input pointing device of the present invention, each of the line sensors comprises a linear photoelectric conversion element having a circulative charge transfer path constituted by a plurality of cells, and the line sensor is designed to transfer charges simultaneously from all pixels of an arbitrary linear photoelectric conversion element to a charge transfer path connected to the circulative charge transfer path as a branch and then transfer the charges to the circulative charge transfer path, or transfer the charges simultaneously from all pixels of an arbitrary linear photoelectric conversion element directly to the circulative charge transfer path.

According to an aspect of the coordinate input pointing device of the present invention, the line sensor circulates the charges on the circulative charge transfer path in synchronism with ON/OFF of an electronic shutter function and additionally accumulates the charges from the photoelectric conversion element at the same line position in every circulation of the charges, and a signal read section is connected to a cell midway along the circulative charge transfer path to externally output a voltage proportional to the charges passing through the cell or output a voltage proportional to a difference in passing charges between two adjacent cells.

According to an aspect of the coordinate input pointing device of the present invention, the electronic shutter function is turned on once at timings when the first transmission means emits light and the first transmission means emits no light to transfer the charges simultaneously from all pixels of the linear photoelectric conversion element to corresponding cells of the circulative charge transfer path once at each timing, and the line sensor is designed to externally perform control to circulate the charges while additionally accumulating the charges by turning on/off the electronic shutter function and control to circulate the charges while fixing the electronic shutter function in an OFF state to stop additionally accumulating the charges.

According to an aspect of the coordinate input pointing device of the present invention, the number of times of additional accumulation of the charges of the line sensor is controlled by the external control function in accordance with a reception amount of the light emitted from the fixed unit.

According to an aspect of the coordinate input pointing device of the present invention, the transmission means synthesizes the coordinate data with a timing signal for synchronizing operation of the line sensor with that of the fixed unit and transmits the synthesized signal to the fixed unit as the first signal.

According to an aspect of the coordinate input pointing device of the present invention, the fixed unit blinks in synchronism with the electronic shutter function in accordance with a predetermined timing sequence generated on the basis of the timing signal.

A first storage medium of the present invention is a storage medium which stores a program for causing a computer to function as each component of the first coordinate input apparatus.

A first storage medium of the present invention is a storage medium which stores a program for executing a processing procedure of the first coordinate input method.

A first storage medium of the present invention is a storage medium which stores a program for causing a computer to function as each component of the coordinate input pointing device.

A second coordinate input apparatus of the present invention is a coordinate input apparatus which comprises a pointing device and a main body unit and inputs coordinate information indicated by the pointing device, wherein the main body unit comprises first detection means for detecting a first incident direction defined as an incident direction of light emitted from the pointing device with reference to the main body unit, and first calculation means for calculating 3D translation information of the pointing device with respect to the main body unit on the basis of a detection result from the first detection means, the pointing device comprises second detection means for detecting a second incident direction defined as a relative incident direction of light emitted from the main body unit with reference to the pointing device, and second calculation means for calculating 3-axis rotation information of the pointing device on the basis of a detection result from the second detection means, and calculation results calculated by the first and second calculation means are substantially simultaneously output.

According to an aspect of the second coordinate input apparatus of the present invention, the first detection means has first line sensors in X and Y directions, the first line sensors detecting the first incident direction, the main body unit further comprises a plurality of first light-emitting elements, and a single-pixel light-receiving element for receiving time series information from the pointing device, the first line sensors comprise a plurality of line sensors in at least one of the X and Y directions, which are spaced apart by a predetermined interval, and the plurality of first light-emitting elements comprise at least three light-emitting elements linearly laid out and spaced apart by a predetermined interval According to an aspect of the second coordinate input apparatus of the present invention, the second detection means has second line sensors in X and Y directions, the second line sensors detecting the second incident direction, and the pointing device further comprises at least one second light-emitting element, and a plurality of switches.

According to an aspect of the second coordinate input apparatus of the present invention, the first calculation means further calculates, on the basis of the first incident direction, 3D position coordinates of the pointing device with reference to a predetermined position, an amount of change in 3D position coordinates, and a moving amount corresponding to the 3D position coordinates.

According to an aspect of the second coordinate input apparatus of the present invention, the second calculation means further calculates, on the basis of the second incident direction, a tilt of the pointing device with reference to a predetermined direction, and an amount of change in tilt, and the second light-emitting element transmits to the main body unit information obtained by synthesizing a calculation result from the second calculation means and switch information of the plurality of switches.

According to an aspect of the second coordinate input apparatus of the present invention, a Z-axis of the pointing device is defined as a direction indicating a front side of the pointing device or a direction from the pointing device to the main body unit, X0- and Y0-axes of the pointing device are defined as coordinate axes that rotate along the Z-axis as the pointing device itself rotates along the Z-axis, and are perpendicular to each other and perpendicular to the Z-axis of the pointing device, and the tilt is detected as a synthesis of $\theta x$, $\theta y$, and $\theta z$ defined on the basis of rotation along the three, X0-, Y0-, and Z-axes.

According to an aspect of the second coordinate input apparatus of the present invention, a Z-axis of the pointing device is defined as a direction indicating a front side of the pointing device or a direction from the pointing device to the main-body unit, X0_fix and Y0_fix axes of the pointing device are defined as coordinate axes that do not rotate along the Z-axis as the pointing device itself rotates along the Z-axis, and are perpendicular to each other and perpendicular to the Z-axis of the pointing device, and the tilt is detected as a synthesis of θx fix, θv_fix, and θz defined on the basis of rotation along the three, X0_fix, Y0_fix, and Z-axes.

According to an aspect of the second coordinate input apparatus of the present invention, each of the first and second line sensors is a ring CCD formed from a linear photoelectric conversion element and having a circulative charge transfer path constructed by a plurality of cells, charges are transferred simultaneously from all pixels of an arbitrary linear photoelectric conversion element to a charge transfer path connected to the circulative charge transfer path as a branch and then transferred to the circulative charge transfer path, or transferred simultaneously from all pixels of an arbitrary linear photoelectric conversion element directly to the circulative charge transfer path, and the charges on the circulative charge transfer path are circulated in synchronism with ON/OFF of an electronic shutter function and additionally accumulated from the photoelectric conversion element at the same line position in every circulation of the charges.

According to an aspect of the second coordinate input apparatus of the present invention, in the line sensor, a signal read section is connected to a cell midway along the circulative charge transfer path to externally output a voltage proportional to the charges passing through the cell.

According to an aspect of the second coordinate input apparatus of the present invention, the electronic shutter function is turned on once during each of ON and OFF periods of light-emission-side blinking of incident light, and the charges accumulated at each timing are transferred to adjacent cells on the circulative charge transfer path.

According to an aspect of the second coordinate input apparatus of the present invention, the signal read section can nondestructively read one of a voltage proportional to a difference of charges in an odd-numbered cell with respect to those of an even-numbered cell and a voltage proportional to a difference of charges in the even-numbered cell with respect to those of the odd-numbered cell.

According to an aspect of the second coordinate input apparatus of the present invention, the line sensor is designed to externally perform control to circulate the charges while additionally accumulating the charges by turning on/off the electronic shutter function and control to circulate the charges while fixing the electronic shutter function in an OFF state to stop additionally accumulating the charges.

According to an aspect of the second coordinate input apparatus of the present invention, the line sensor adaptively controls the number of times of accumulation in accordance with a light reception amount or an amount of accumulated charges.

According to an aspect of the second coordinate input apparatus of the present invention, blinking of light emitted from the pointing device is synchronized with an electronic shutter function of the first line sensors of the main body unit, and blinking of light emitted from the main body unit is synchronized with an electronic shutter function of the line sensors of the pointing device.

According to an aspect of the second coordinate input apparatus of the present invention, the second light-emitting element has a function of emitting light in accordance with a signal modulated by a carrier having a frequency much higher than a blinking frequency within a blinking period of light-emission-side blinking of the incident light, and transmits the time series information of blinking and the switch information on the pointing device by controlling presence/absence of modulation.

According to an aspect of the second coordinate input apparatus of the present invention, the main body unit comprises a bandpass filter having a center frequency substantially equal to a modulation frequency in the second light-emitting element, and a detection circuit, and detects the time series information and switch information transmitted by the second light-emitting element by passing a signal obtained by the first light-receiving element through the bandpass filter and detection circuit.

According to an aspect of the second coordinate input apparatus of the present invention, first light-emitting operation of the light emitted from the main body unit has a first correspondence relationship synchronized with second detection operation of the second detection means, second light-emitting operation of the light emitted from the pointing device has a second correspondence relationship synchronized with first detection operation of the first detection means, and the first and second correspondence relationships satisfy a predetermined condition.

According to an aspect of the second coordinate input apparatus of the present invention, for the synchronization, with reference to time of a leading edge or trailing edge of arbitrary lighting of-the blinking obtained from a time series signal detected by detection means which is characterized by having a function of emitting light in accordance with the signal modulated by the carrier having the frequency sufficiently higher than the blinking frequency within the blinking period of light-emission-side blinking of the incident light, and transmitting the time series information of blinking and the switch information on the pointing device by controlling the presence/absence of modulation, a timing sequence as a control signal of the ring CCD is started, and a series of operations are repeated every time coordinates of one point are processed.

A second coordinate input method of the present invention is a coordinate input method of using a pointing device and a main body unit and inputting coordinate information indicated by the pointing device, comprising:

the first detection step of detecting, by the main body unit, a first incident direction defined as an incident direction of light emitted from the pointing device with reference to the main body unit;

the first calculation step of calculating 3D translation information of the pointing device with respect to the main body unit on the basis of a detection result in the first detection step;

the second detection step of detecting, by the pointing device, a second incident direction defined as a relative incident direction of light emitted from the main body unit with reference to the pointing device; and the second calculation step of calculating 3-axis rotation information of the pointing device on the basis of a detection result in the second detection step, wherein calculation results calculated in the first and second calculation steps are substantially simultaneously output.

A second storage medium of the present invention is a storage medium which stores a program for causing a computer to function as each component of the second coordinate input apparatus.

A second storage medium of the present invention is a storage medium which stores a program for executing a processing procedure of the second coordinate input method.

A third coordinate input apparatus of the present invention is a coordinate input apparatus which comprises a pointing device and a main body unit and inputs coordinate information indicated by the pointing device, wherein the main body unit comprises first light-emitting means for emitting light, and first detection means for detecting light emitted from the pointing device, and the pointing device comprises second light-emitting means for emitting light, and second detection means for detecting the light emitted from the main body unit, first light-emitting operation of the first light-emitting means has a first correspondence relationship synchronized with second detection operation of the second detection means, second light-emitting operation of the second light-emitting means has a second correspondence relationship synchronized with first detection operation of the first detection means, and the first and second correspondence relationships satisfy a predetermined condition.

According to an aspect of the third coordinate input apparatus of the present invention, the first detection means comprises a first line sensor having a first electronic shutter function synchronized with a first blink pattern period of the light which is emitted from the pointing device in accordance with a first blink pattern, the first line sensor outputs a signal corresponding to a difference between charges accumulated during an ON period of the first blink pattern and those accumulated during an OFF period, the second detection means comprises a second line sensor having a second electronic shutter function synchronized with a second blink pattern period of the light which is emitted from the main body unit in accordance with a second blink pattern, and the second line sensor outputs a signal corresponding to a difference between charges accumulated during an ON period of the second blink pattern and those accumulated during an OFF period.

According to an aspect of the third coordinate input apparatus of the present invention, the second blink pattern period is twice the first blink pattern period, blinking in the first blink pattern period is performed a total of two times during ½ the first blink pattern period in each second electronic shutter function ON period, and the first ON period during the second blink pattern period and the ON period of the first blink pattern period are within the second electronic shutter function ON period, and the first electronic shutter period of the first electronic shutter function is twice the second electronic shutter period of the second electronic shutter function, the first electronic shutter function ON-period includes the twice ON periods of the second blink pattern period, and an OFF timing of the first electronic shutter function matches one of OFF timings of the second electronic shutter function.

According to an aspect of the third coordinate input apparatus of the present invention, for a combination of the second electronic shutter period and the first blink pattern period and a combination of the first electronic shutter period and the second blink pattern period satisfy the predetermined condition in that "for a first-order electronic shutter period Ts, a first-order blink pattern period of first-order blinking is 2*Ts, the number of times of ON operations during one first-order blink pattern period is one, the ON time of the first-order blinking is always included in an even-numbered (or odd-numbered) ON region of the first-order electronic shutter, an nth-order blink pattern period of nth-order blinking is $Ts*2^n$, the total number of times of ON operations is $2^{n-1}$ times at the interval Ts during ½ the nth blink pattern period in each first-order electronic shutter ON period, for a phase relationship, a first ON operation in each blink pattern period is performed during the first-order electronic shutter ON period corresponding to the first-order blinking ON period, the nth-order electronic shutter period is $Ts*2^{n-1}$, one nth-order electronic shutter ON period includes all ON periods during one nth-order blink pattern period, and the nth-order electronic shutter OFF period matches at least one of the first-order electronic shutter OFF periods", and the combination is included in combination of the nth-order blinking and electronic shutter and is a combination with different orders.

A third coordinate input method of the present invention is a coordinate input method of using a pointing device and a main body unit and inputting coordinate information indicated by the pointing device, comprising:

the first light-emitting step of emitting light from the main body unit;

the first detection step of detecting, by the main body unit, light emitted from the pointing device;

the second light-emitting step of emitting light from the pointing device; and the second detection step of detecting, by the pointing device, the light emitted from the main body unit, wherein first light-emitting operation in the first light-emitting step has a first correspondence relationship synchronized with second detection operation in the second detection step, second light-emitting operation in the second light-emitting step has a second correspondence relationship synchronized with first detection operation in the first detection step, and the first and second correspondence relationships satisfy a predetermined condition.

A third storage medium of the present invention is a storage medium which stores a program for causing a computer to function as each component of the third coordinate input apparatus.

A third storage medium of the present invention is a storage medium which stores a program for executing a processing procedure of the third coordinate input method.

A first computer program of the present invention is a computer program for causing a computer to function as each component of the first coordinate input apparatus.

A first computer program of the present invention is a computer program for causing a computer to function as each component of the first coordinate input pointing device.

A second computer program of the present invention is a computer program for causing a computer to function as each component of the second coordinate input apparatus.

A second computer program of the present invention is a computer program for executing a processing procedure of the second coordinate input method.

A third computer program of the present invention is a computer program for causing a computer to function as each component of the third coordinate input apparatus.

A third computer program of the present invention is a computer program for executing a processing procedure of the third coordinate input method.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 27 shows timing charts of the output waveforms from the line sensors on the main body unit according to the third embodiment;

FIG. 28B is a timing chart for explaining modulation and detection in the third embodiment;

FIG. 29 is a timing chart for explaining the relationship between a blink signal and an electronic shutter function in the fourth embodiment;

DETAILED DESCRIPTION OF THE PREFERRED EMBODIMENTS

Preferred embodiments to which the present invention is applied will be described below in detail with reference to the accompanying drawings.

(First Embodiment)

Figure 1:
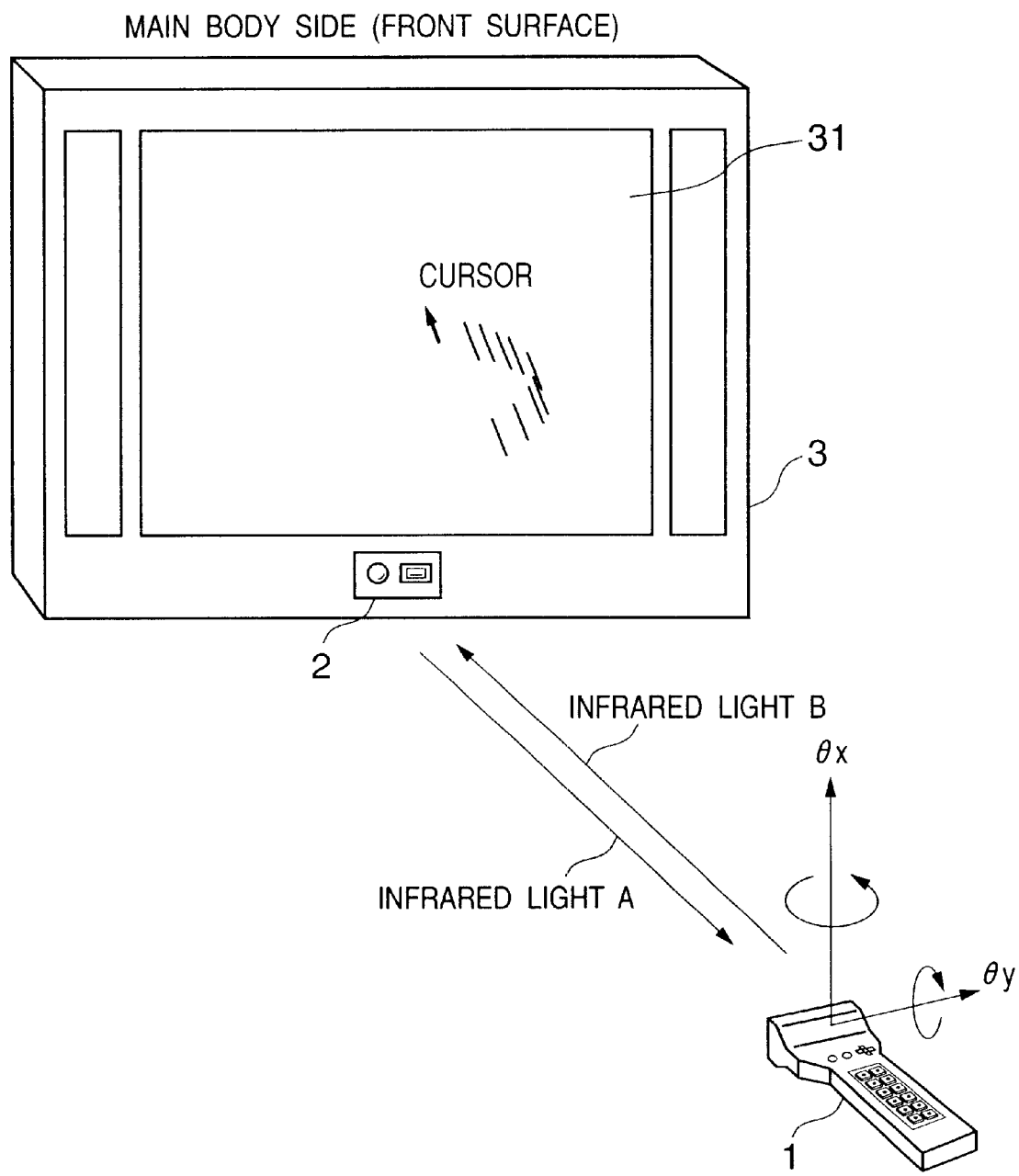
FIG. 1 is a view showing the outer appearance of a coordinate input system according to the first embodiment.
Figure 2:
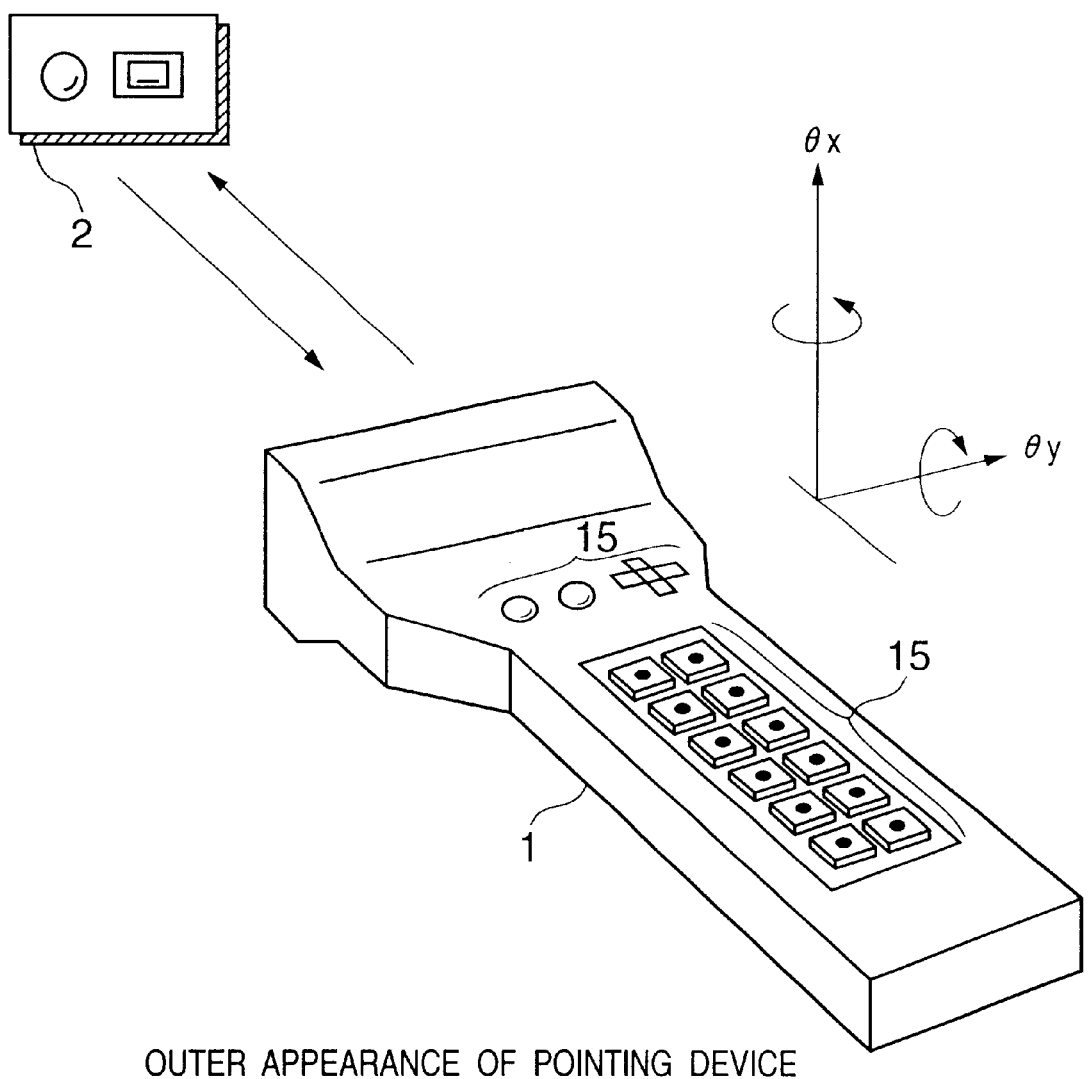
FIG. 2 is a view showing the outer appearance of a pointing device used in the coordinate input system according to the first embodiment.
Figure 3:
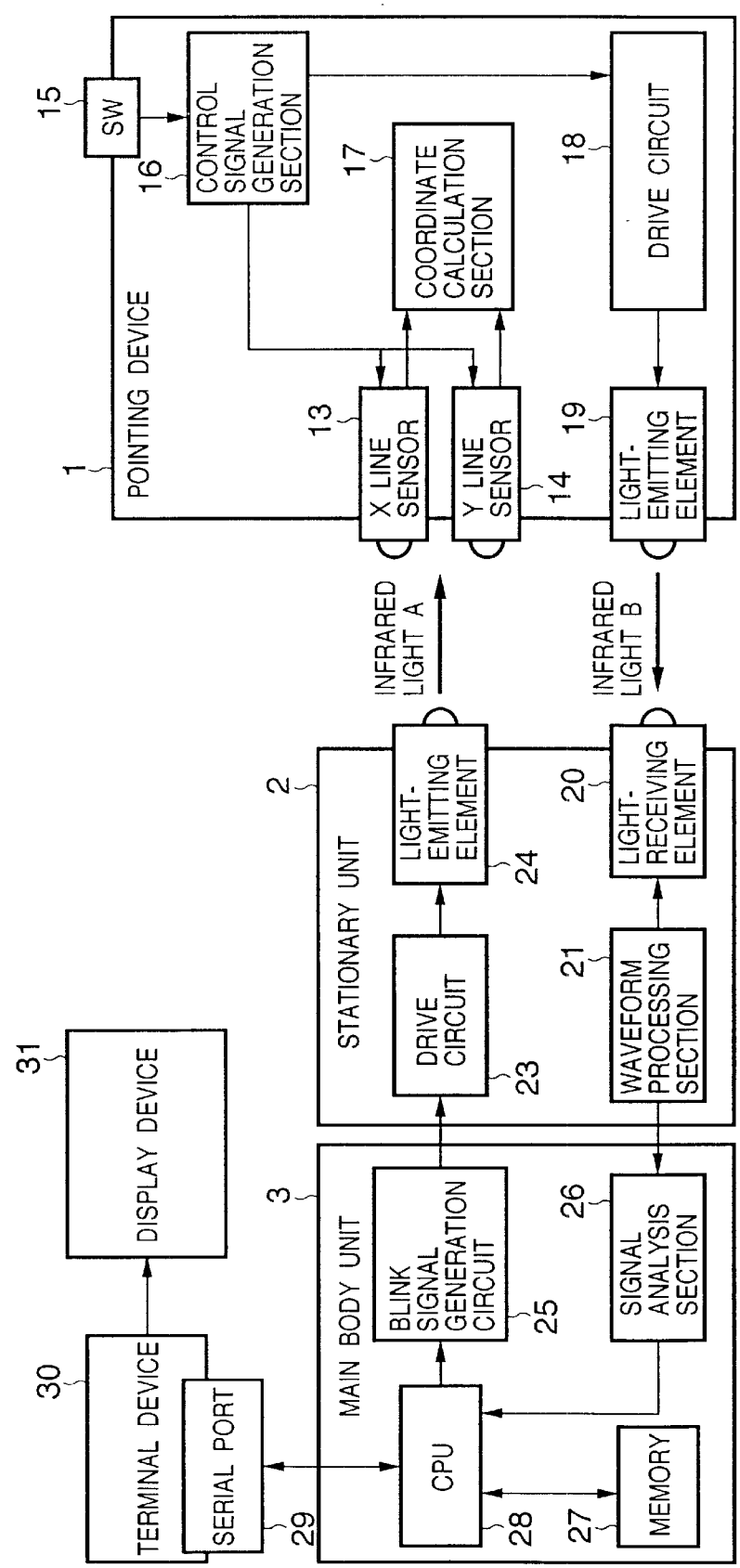
FIG. 3 is a block diagram showing the functional arrangement of the coordinate input system according to the first embodiment.

FIG. 1 is a view showing the outer appearance of a coordinate input system according to the first embodiment. FIG. 2 is a view showing the outer appearance of a pointing device used in the coordinate input system according to the first embodiment. FIG. 3 is a block diagram showing the functional arrangement of the coordinate input system according to the first embodiment.

The coordinate input system of the first embodiment comprises a coordinate input apparatus formed from a pointing device 1 operated by a user, and a fixed unit (stationary unit) 2 fixed for use, a main body unit 3 having the stationary unit 2, and a display device 31 serving as the external device of the main body unit 3 and having a terminal device 30 such as a computer or image device, a serial port 29 such as an RS232C port or USB port, and an information display screen.

As shown in FIGS. 2 and 3, the pointing device 1 comprises a switch group (SW) 15 used to start coordinate input or input supplementary information as a remote controller, a control signal generation section 16 which is prompted by the SW group 15 to generate a control signal for controlling the entire pointing device 1, X line sensor 13 and Y line sensor (second reception means) 14 each controlled by the control signal from the control signal generation section 16 to detect an infrared light A (first signal) emitted from the stationary unit 2 and generate a data sequence as the base of coordinate data, a coordinate calculation section 17 for calculating an angle of incidence on the basis of the data sequence and then calculating coordinates or coordinate change amounts (coordinate data), a drive circuit 18 for generating a light emission signal on the basis of the coordinate data and the control signal sent from the control signal generation section 16, and a light-emitting element (second transmission means) 19 for emitting an infrared light (second signal) B representing the coordinate data toward the stationary unit 2 on the basis of the light emission signal.

Figure 4:
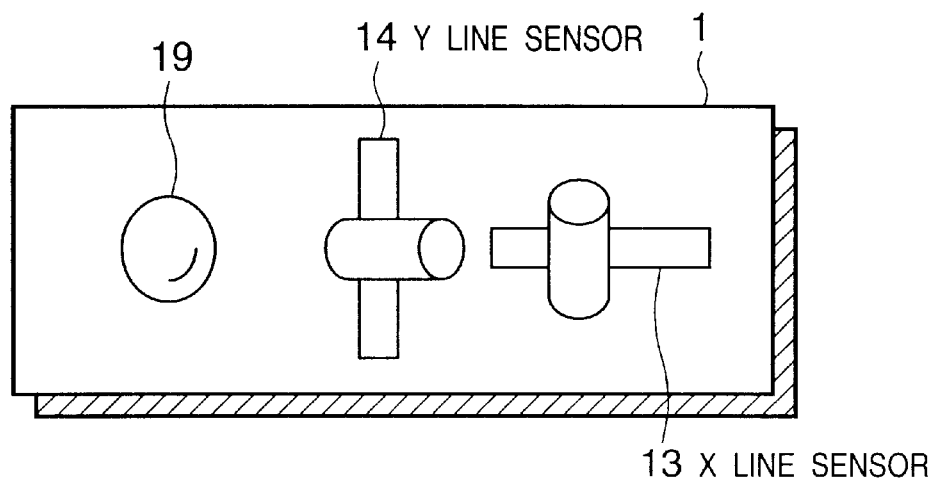
FIG. 4 is a view showing the outer appearance of the front surface of the pointing device according to the first embodiment.
Figure 5:
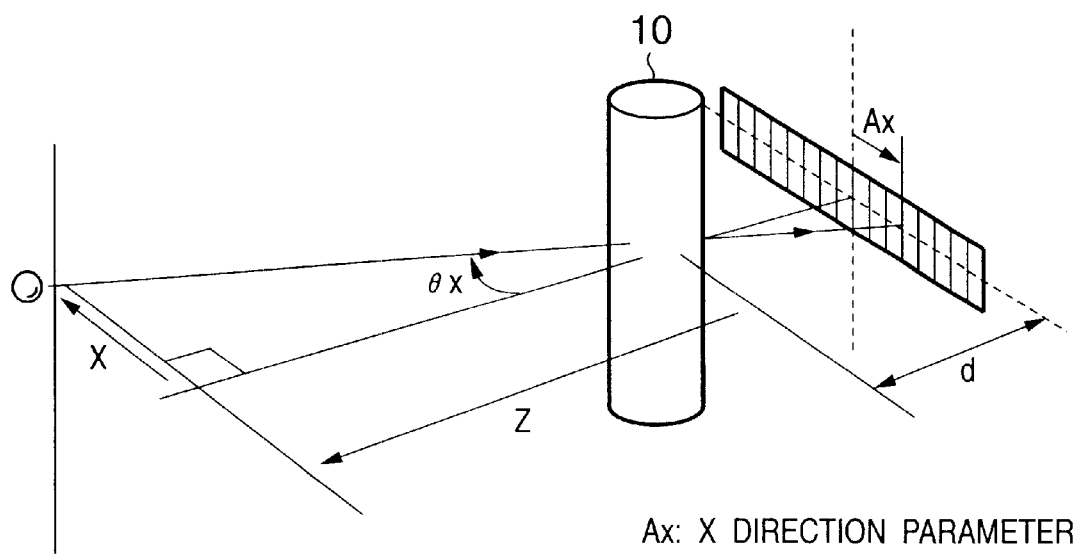
FIG. 5 is a view showing the structure near a line sensor according to the first embodiment.

The X line sensor 13 and Y line sensor 14 constitute a line sensor having two variables (x, y) and are laid out to be perpendicular to each other, as shown in FIG. 4. Each line sensor has a cylindrical lens 10, as shown in FIG. 5, and is designed such that the infrared light A emitted from the stationary unit 2 forms an image on the line sensor.

Figure 6:
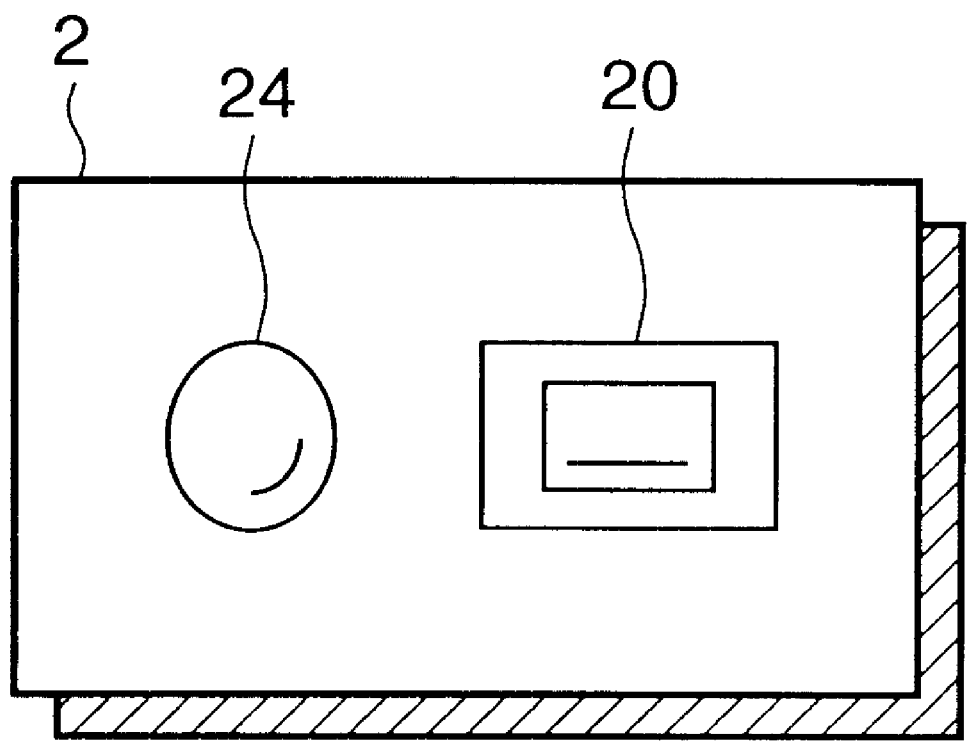
FIG. 6 is a view showing the outer appearance of the front surface of a stationary unit according to the first embodiment.

As shown in FIGS. 3 and 6, the stationary unit 2 comprises a light-receiving element (first reception means) 20 for receiving the infrared light B transmitted from the light-emitting element 19 of the pointing device 1, a waveform processing section 21 for processing the waveform detected by the light-receiving element 20 to generate a digital signal, a light-emitting element (first transmission means) 24 for emitting, from the stationary unit 2, the infrared light A used for coordinate detection, and a drive circuit 23 for driving the light-emitting element 24.

The main body unit 3 comprises a signal analysis section 26 for analyzing and extracting the coordinate data, timing signal, and supplementary information sent from the pointing device 1 as the infrared light B, a CPU 28 for controlling the entire system on the basis of the pieces of information, a blink signal generation circuit 25 for generating data of a blink signal (infrared light A) to be sent to the pointing device 1 on the basis of an instruction from the CPU 28, and a memory 27 for temporarily holding data as the CPU 28 executes arithmetic operation.

As described above, in the first embodiment, both the stationary unit 2 and pointing device 1 have light-emitting and light-receiving means. A kind of loop is formed by the stationary unit 2 and pointing device 1 to execute infrared communication.

Detailed operation will be described below.

First, the light-emitting element 24 of the stationary unit 2 emits light to notify the pointing device 1 and, more specifically, the X line sensor 13 and Y line sensor 14 of the relative direction of the stationary unit 2 with respect to the pointing device 1.

This light emission is done by blinking light at a predetermined frequency. This blinking is a characteristic feature of a ring CCD (to be described later in detail) that constitutes the X line sensor 13 and Y line sensor 14. This blinking achieves a purpose of eliminating disturbance from the infrared light A emitted by the light-emitting element 24 of the stationary unit 2 and a purpose of receiving, in a wide dynamic range, light whose irradiation intensity to the X line sensor 13 and Y line sensor 14 rapidly changes depending on the distance between the pointing device 1 and the stationary unit 2.

The light-emitting element 19 of the pointing device 1 synthesizes coordinate value data obtained from the angle of incidence of the infrared light A detected by the X line sensor 13 and Y line sensor 14 with a timing signal for synchronizing the X line sensor 13 and Y line sensor 14 with the light-emitting element 24 of the stationary unit 2 and switch information input by the SW group 15 and sends the data as the infrared light B.

That is, in infrared communication of the coordinate input system of the first embodiment, in terms of coordinate detection, a lighting timing signal is transmitted from the pointing device 1, the stationary unit 2 starts lighting (blinking) triggered by the timing signal, the pointing device 1 receives the light to detect its tilt, obtains coordinates (coordinate data) to be pointed from this tilt, synthesizes the coordinate data with switch information and next timing signal, and transmits the data to the stationary unit 2, and this operation is repeated. As described above, in the first embodiment, a feedback loop is formed by the pointing device 1 and stationary unit 2 to continuously input coordinates and their change amounts.

In the first embodiment, the pointing device 1 transmits or receives various data by the light-emitting element 19 or the X line sensor 13 and Y line sensor 14 serving as light-receiving elements. Any other means can be used as long as it can transmit/receive various data. For the stationary unit 2 as well, any other means can be used in place of the light-emitting element 24 or light-receiving element 20 as long as it can transmit/receive various data.

<Use of Ring CCD>

As a main characteristic feature of the first embodiment, ring-shaped photoelectric conversion elements (ring CCDs) are used as the X line sensor 13 and Y line sensor 14. The ring CCD has an externally controlled electronic shutter function.

In the first embodiment, the infrared light A that is blinked at a predetermined frequency is emitted from the light-emitting element 24 of the stationary unit 2 and synchronized with the electronic shutter function, thereby suppressing disturbance light (eliminating the influence of disturbance light).

The ring CCD has a circulative charge transfer path, i.e., a function of transferring charges generated by the photoelectric conversion section to the circulative charge transfer path directly or through a linear transfer path and sequentially additionally accumulating new charges in every circulation through the path.

The ring CCD also has an externally controlled switching function for switching between the state wherein charges are circulated and sequentially additionally accumulated and the state wherein charges are only circulated without being sequentially additionally accumulated. In the first embodiment, this switching control is adaptively performed in accordance with the intensity of light received by the X line sensor 13 and Y line sensor 14. For example, when light of low level is received, charges are accumulated many times. When light of high level is received, charges are accumulated a few times. With this control, a wide light-receiving dynamic range is implemented.

The ring CCD also has a function of, when charges beyond a predetermined charge amount are accumulated in an arbitrary one of cells on the circulative charge transfer path, subtracting a predetermined charge amount from all cells on the circulative charge transfer path. This operation is called skim operation and prevents any saturation of the circulative charge transfer path.

Figure 7:
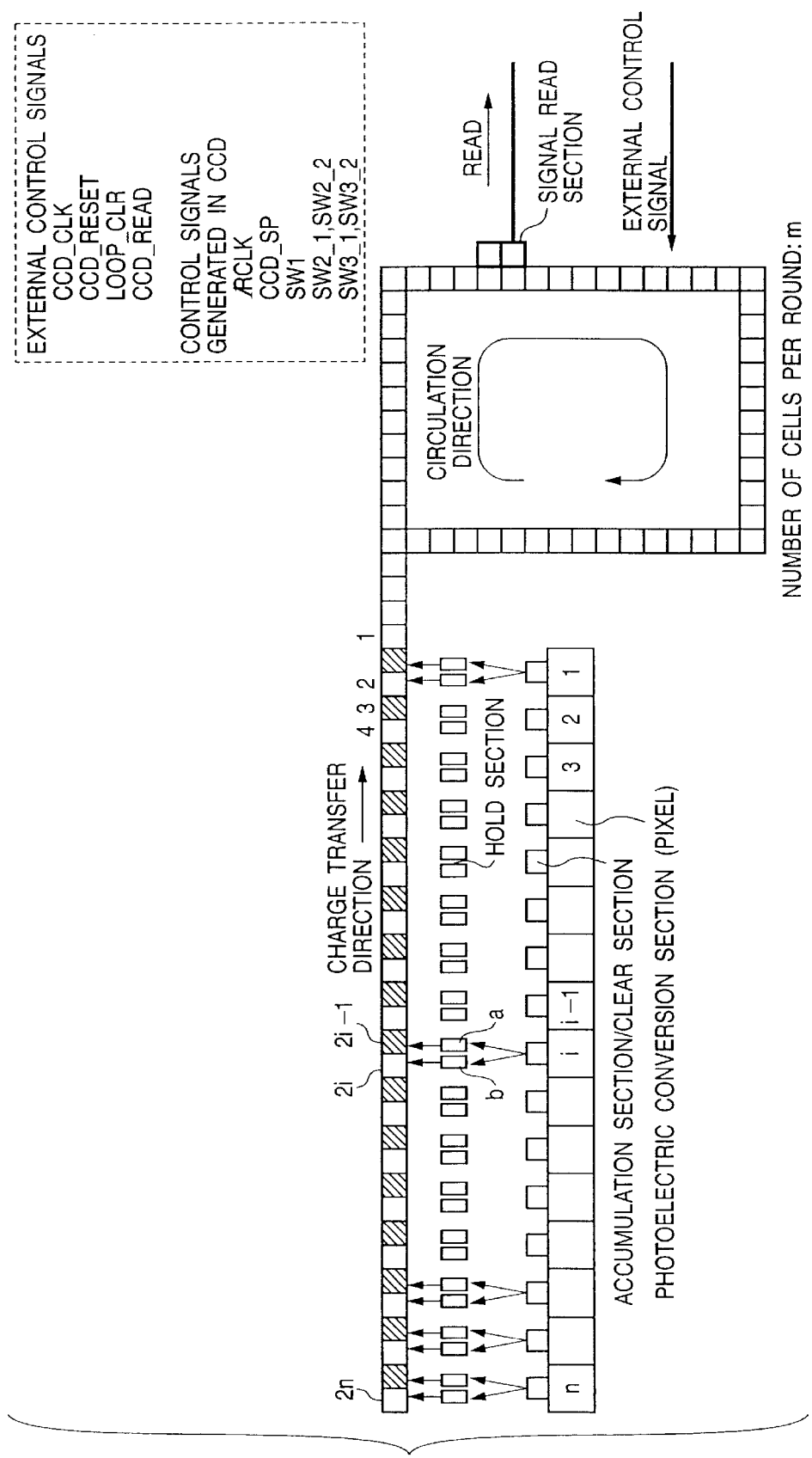
FIG. 7 is a view showing the circulative charge transfer path structure of a ring CCD according to the first embodiment.
Figure 8:
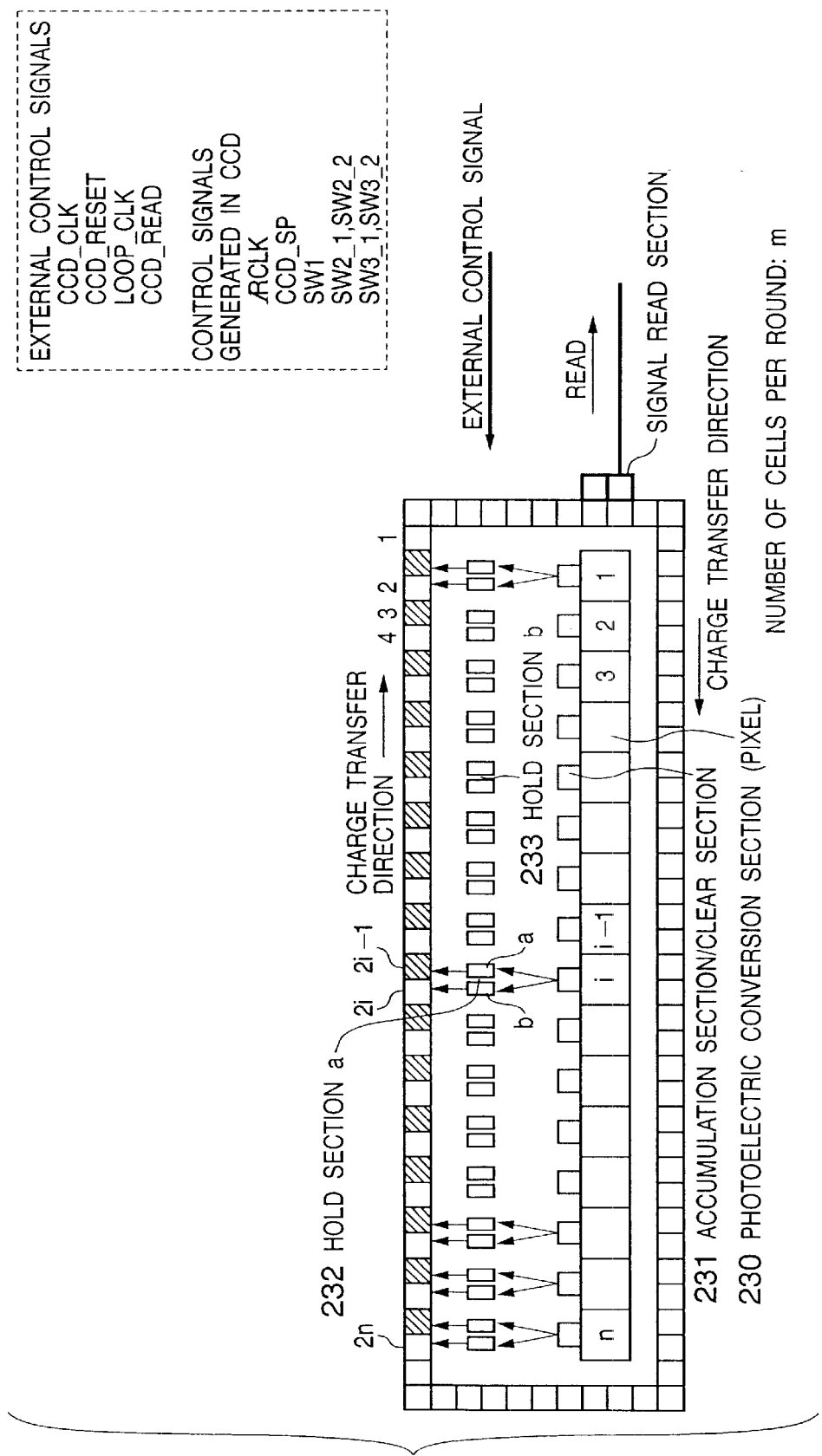
FIG. 8 is a view showing the circulative charge transfer path structure of another ring CCD according to the first embodiment.

The detailed structure of the ring CCD will be described next. FIGS. 7 and 8 are views showing the circulative charge transfer path structure of the ring CCD.

The ring CCD comprises a photoelectric conversion section formed from n pixels linearly arrayed, a circulative charge transfer path formed from m cells arrayed in a ring, and a signal read section connected midway along the circulative charge transfer path, as disclosed in Japanese Patent Laid-Open No. 8-233571.

FIG. 7 shows a ring CCD in which charges are simultaneously transferred from all pixels of arbitrary photoelectric conversion elements linearly arrayed to a charge transfer path connected to the circulative charge transfer path as a branch and then transferred to the circulative charge transfer path. FIG. 8 shows a ring CCD in which charges are simultaneously transferred from all pixels of arbitrary photoelectric conversion elements linearly arrayed directly to the circulative charge transfer path.

The first embodiment will be described on the basis of the ring CCD shown in FIG. 8.

Charge transfer operation of the ring CCD will be described next with reference to FIGS. 8 to 11.

Charges photoelectrically converted by a photoelectric conversion section 230 are accumulated in an accumulation section/clear section 231. The charges are transferred to a hold section a (232) or hold section b (233). The accumulation section/clear section 231 temporarily removes remaining charges before the next accumulation. The charges transferred to the hold section a (232) are transferred to the (2i−1)th cell on the circulative charge transfer path. Similarly, the charges transferred to the hold section b (233) are transferred to the 2ith cell on the circulative charge transfer path.

Figure 9:
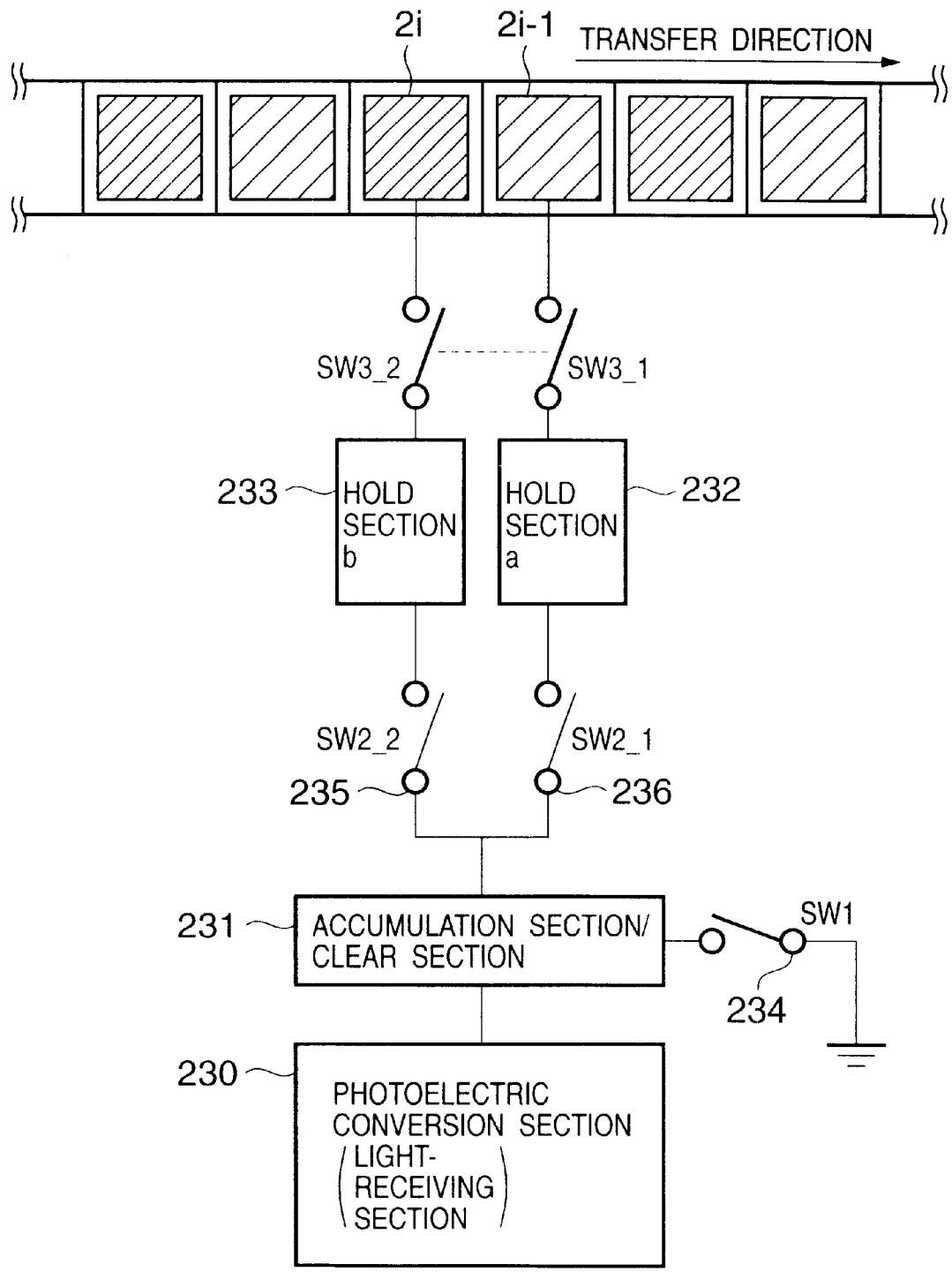
FIG. 9 is a view for explaining the operation of the ring CCD according to the first embodiment.
Figure 10:
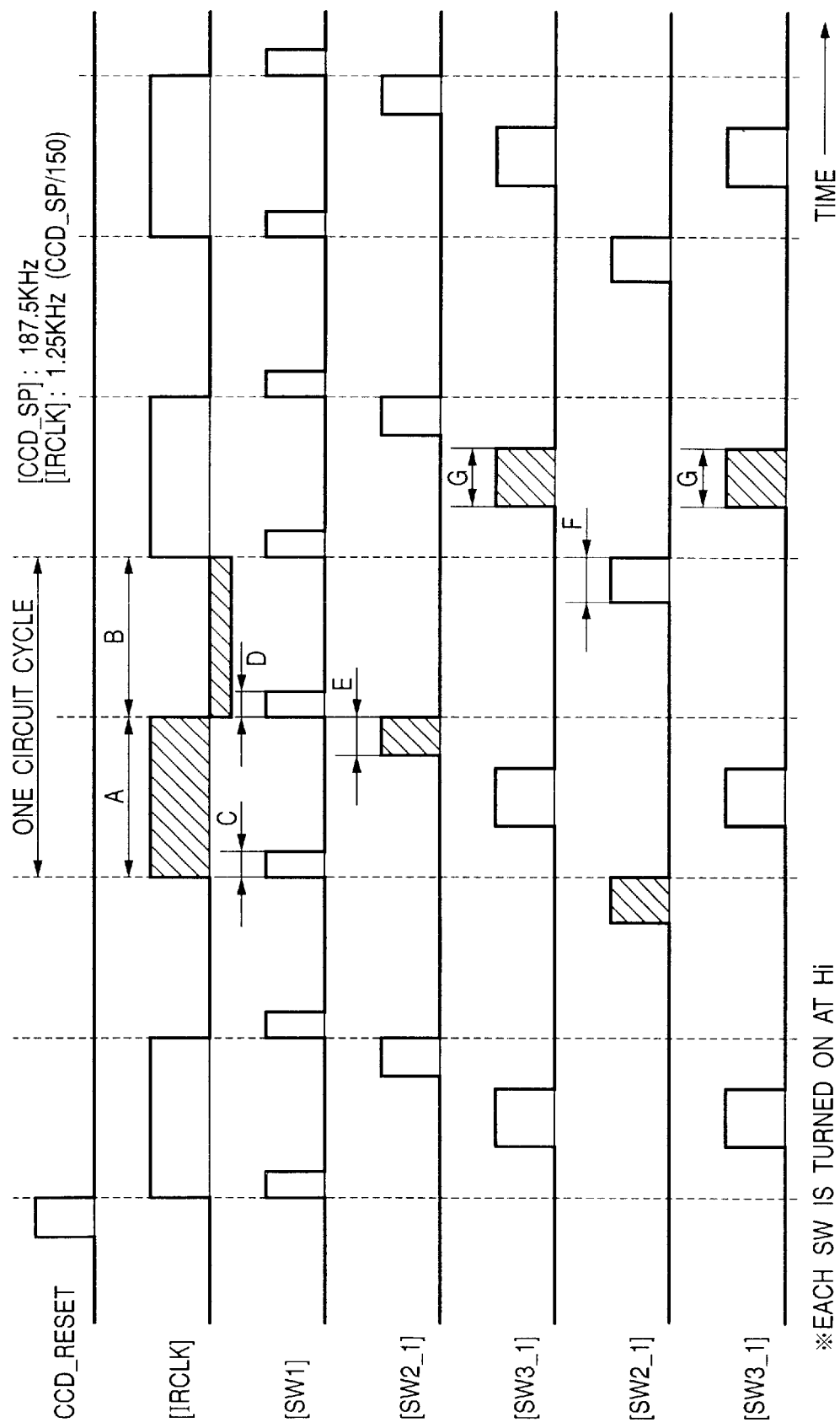
FIG. 10 is a timing chart showing timing signals so as to explain the operation of the ring CCD according to the first embodiment.

FIG. 9 is a view showing a portion near the ith photoelectric conversion section 230 and the (2i−1)th and 2ith cell on the circulative charge transfer path in FIG. 8. FIG. 10 is a timing chart showing the timing sequences of switches shown in FIG. 9.

The operation of this portion is performed using, as a basic period, a signal "IRCLK" representing the electronic shutter of the ring CCD. The period of the signal "IRCLK" is, e.g., 1.25 kHz in the first embodiment, which equals the period of a signal "LED_IRCLK" representing blinking of the light-emitting element 24 of the stationary unit 2. The signal "IRCLK" is obtained by frequency-dividing a transfer clock "CCD_SP" of the ring CCD by m (e.g., 150). The electronic shutter function of the first embodiment is implemented by this portion.

Actually, the signal "IRCLK" turns on the electronic shutter function twice in one cycle. In one period (HI period), light when the light-emitting element 19 of the pointing device 1 is kept on is received. In the other period (LOW period), light when the light-emitting element 19 of the pointing device 1 is kept off is received.

This operation will be described below in accordance with the sequence.

Solid portions in FIG. 10 correspond to a set of electronic shutter operations (a set of electronic shutter ON states: two ON states).

At a timing C, charges in the accumulation section/clear section 231 are cleared by a SW1 (234). During a period A, a current generated by the photoelectric conversion section 230 is accumulated in the accumulation section/clear section 231. At a timing E, a SW2_1 (235) is turned on to transfer the current to the hold section a (232).

Similarly, at a timing D, the charges in the accumulation section/clear section 231 are cleared by the SW1 (234). During a period B, a current generated by the photoelectric conversion section 230 is accumulated in the accumulation section/clear section 231. At a timing F, a SW2_2 (236) is turned on to transfer the current to the hold section b (233).

The charges held by the hold section a (232) and hold section b (233) are transferred to the (2i−1)th and 2ith cells on the circulative charge transfer path simultaneously at a timing G.

In the first embodiment, the signal "IRCLK" is synchronized with the signal "LED_IRCLK". Such a time relationship holds that the light-emitting element 19 of the pointing device 1 emits light at the portion A in FIG. 10 and no light at the portion B.

With this arrangement, charges in the light emission mode are held by the hold section a (232), and charges in the non-emission mode are held by the hold section b (233). As a result, the charges in the light emission mode are transferred to the 2ith cell on the circulative charge transfer path, and the charges in the non-emission mode are transferred to the (2i−1)th cell. Each of the operations indicated by the timings A, B, C, D, E, F and G is executed simultaneously for all pixels.

The operation of the circulative charge transfer path will be described next.

The circulative charge transfer path is designed to make a round in two cycles of the signal "IRCLK". Hence, for example, charges in the (2i−1)th and 2ith cells return to the same cells every two cycles of the signal "IRCLK". Every time the charges return to the cells, charges newly held by the hold section a (232) and hold section b (233) are additionally accumulated.

In the first embodiment, the circulative charge transfer path has 150 cells (m=150). Hence, the frequency of the transfer clock "CCD_SP" of the circulative charge transfer path is 150 times the signal "IRCLK".

The circulative charge transfer path has a signal read section midway. The signal read section can nondestructively convert charges passing through the circulative charge transfer path into a voltage value and read. The signal read section can also read the difference in voltage value between two adjacent cells, i.e., an even-numbered cell and an odd-numbered cell. For, e.g., the(2i−1)th and 2ith cells, the difference between the values of charges transferred from the hold section a (232) and hold section b (233) can be read.

In the first embodiment, with this function, a voltage signal corresponding to the difference in accumulated charges between the light emission mode and the non-emission mode of the pointing device 1 can be read. Hence, at least disturbance light with a frequency component much lower than the blinking frequency is eliminated.

Figure 11:
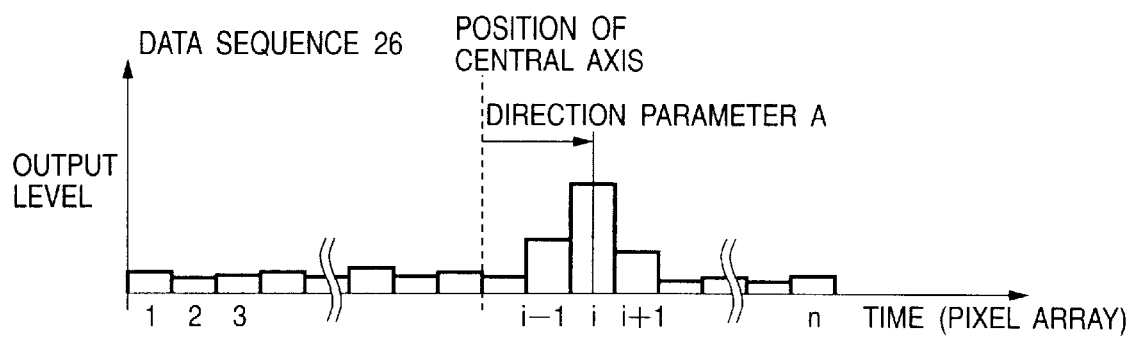
FIG. 11 is a timing chart showing an output waveform so as to explain the operation of the ring CCD according to the first embodiment.

Signals read from the signal read section are actually read in the same temporal order as the order of cells arrayed on the circulative charge transfer path. FIG. 11 is a graph showing this processing. The voltage values are read sequentially from the nth pixel to the first pixel. The high level near the ith cell means that the emitted light forms its image near the ith cell of the pixel array on the line sensor.

When a value Ai in FIG. 11 is calculated for each of the X line sensor 13 and Y line sensor 14, a parameter as the base of the angle of incidence of infrared light detected by the X line sensor 13 and Y line sensor 14 can be obtained.

As described above, according to the first embodiment, the apparatus has a relatively simple arrangement without any camera and is safe to handle, and coordinate data can be accurately obtained at a very high response speed.

(Second Embodiment)

The schematic arrangement of a coordinate input system according to the second embodiment will be described below.

Figure 12:
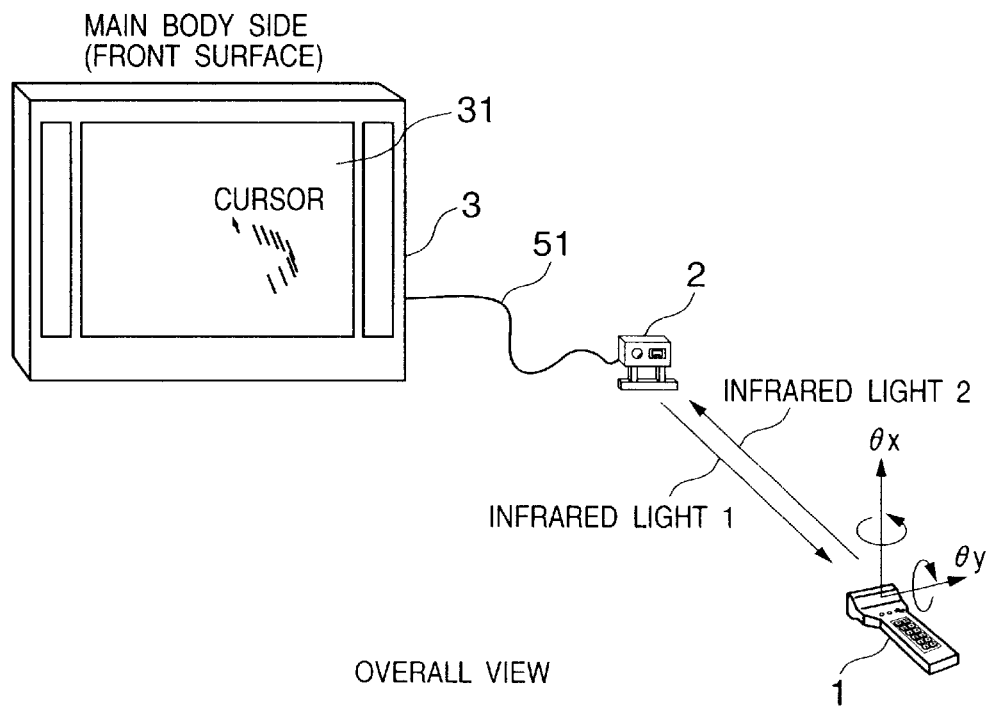
FIG. 12 is a view showing the outer appearance of a coordinate input system according to the second embodiment.

FIG. 12 is a view showing the outer appearance of the coordinate input system according to the second embodiment.

The functional arrangement of the coordinate input system of the second embodiment is basically the same as that of the coordinate input system of the first embodiment.

The coordinate input system of the second embodiment can be suitably used, e.g., when a large display device 31 or the like is used in a wide space.

In this case, the user and the display device 31 are separated by a considerably long distance, and it is normally difficult to perform infrared communication therebetween. In the second embodiment, taking such a case into consideration, a stationary unit 2 is separated from the display device 31 and connected to the display device 31 by a cable 51.

In the second embodiment, the stationary unit 2 is placed on a table in a large conference room or hung from the ceiling of a theater facility.

As described above, according to the second embodiment, in addition to the effects described in the first embodiment, when the large display device 31 is used, the degree of freedom in setting the stationary unit 2 increases, resulting in great convenience.

(Third Embodiment)

Figure 13:
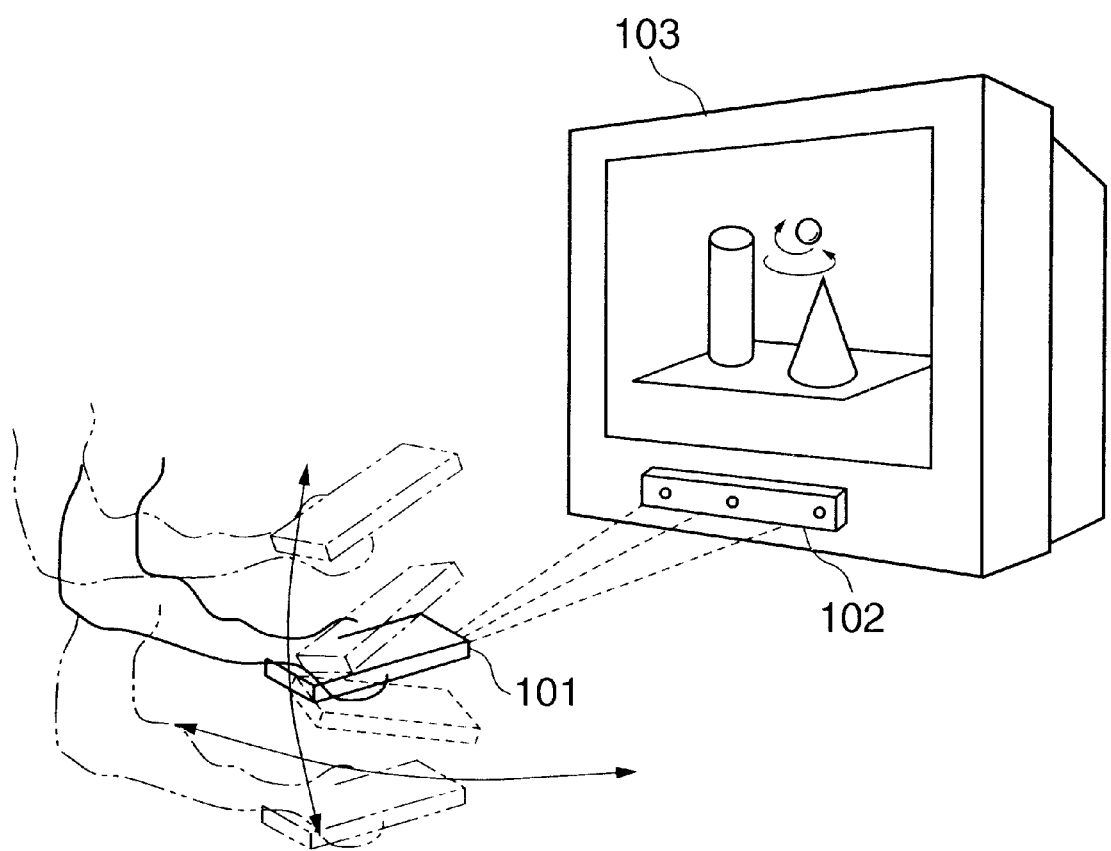
FIG. 13 is a view showing the outer appearance of a 3D coordinate input apparatus according to the third embodiment.

FIG. 13 is a view showing the outer appearance of a 3D coordinate input apparatus according to the third embodiment.

As shown in FIG. 13, the 3D coordinate input apparatus of the third embodiment is mainly constructed by a main body unit 102 and pointing device 101. the main body unit 102 is fixed, e.g., on the frame portion of a display device 103 or on a conference table. On the other hand, the pointing device 101 is a wireless device that is mainly gripped and moved by a user, thereby inputting data to the main body unit 102.

Figure 14:
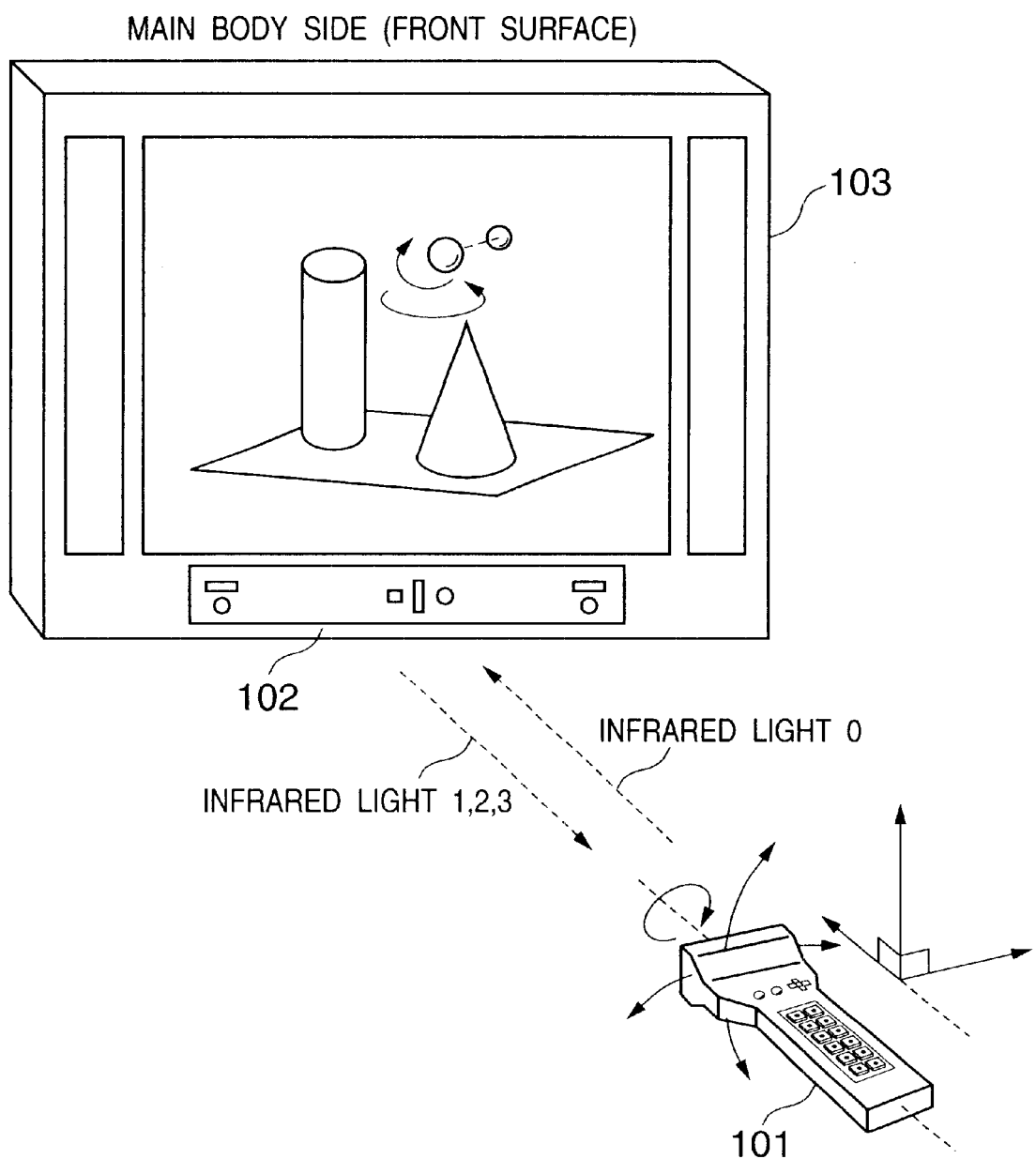
FIG. 14 is a view for explaining the schematic operation of the 3D coordinate input apparatus according to the third embodiment.

FIG. 14 is a view for explaining the schematic operation of the 3D coordinate input apparatus according to the third embodiment.

The main body unit 102 comprises a plurality of line sensors for detecting the direction of incidence of an infrared light 0 emitted from the pointing device 101, a plurality of infrared light-emitting elements capable of emitting at least infrared light beams 1 to 3 to notify the pointing device 101 of the direction of presence of the main body unit 102, and a light-receiving element for detecting the time series information of the infrared light 0 emitted from the pointing device 101 to the main body unit 102.

The plurality of line sensors comprise, e.g., one vertical line sensor and two horizontal line sensors. Each line sensor detects the position of the pointing device 101 in a corresponding direction. In addition, the distance between the pointing device 101 and the main body unit 102 is calculated on the basis of the disparity between the two line sensors in the same direction.

The pointing device 101 comprises one vertical line sensor, one horizontal line sensor, and a light-emitting element for indicating the position of the pointing device 101 and transmitting time series information to the main body unit 102.

The vertical and horizontal line sensors of the pointing device 101 detect relative directions of the infrared light beams emitted from the plurality of light-emitting elements of the main body unit 102 when viewed from the pointing device 101. Thus, the vertical and horizontal tilts of the pointing device 101 itself and the twist angle of the pointing-device 101 in the axial direction can be calculated.

Each of the main body unit 102 and pointing device 101 has a CPU for controlling the line sensors, a signal processing section for arithmetically processing signals from the line sensors, a drive circuit for electrically driving each light-emitting element, and a drive circuit for synthesizing the drive signals.

With the above arrangement, the translational position of the pointing device 101 in a predetermined space domain can be detected as the tilt and twist angles of the pointing device 101 within predetermined angle ranges. Hence, the user can input 3D motion including axial rotation by keeping the pointing device 101 at an appropriate position or moving it within a predetermined range and tilting it in an appropriate direction within a predetermined angle range.

<Arrangement and Operation of Main Body Unit>

The arrangement and operation of the main body unit 102 will be described next with reference to FIG. 15.

Figure 15:
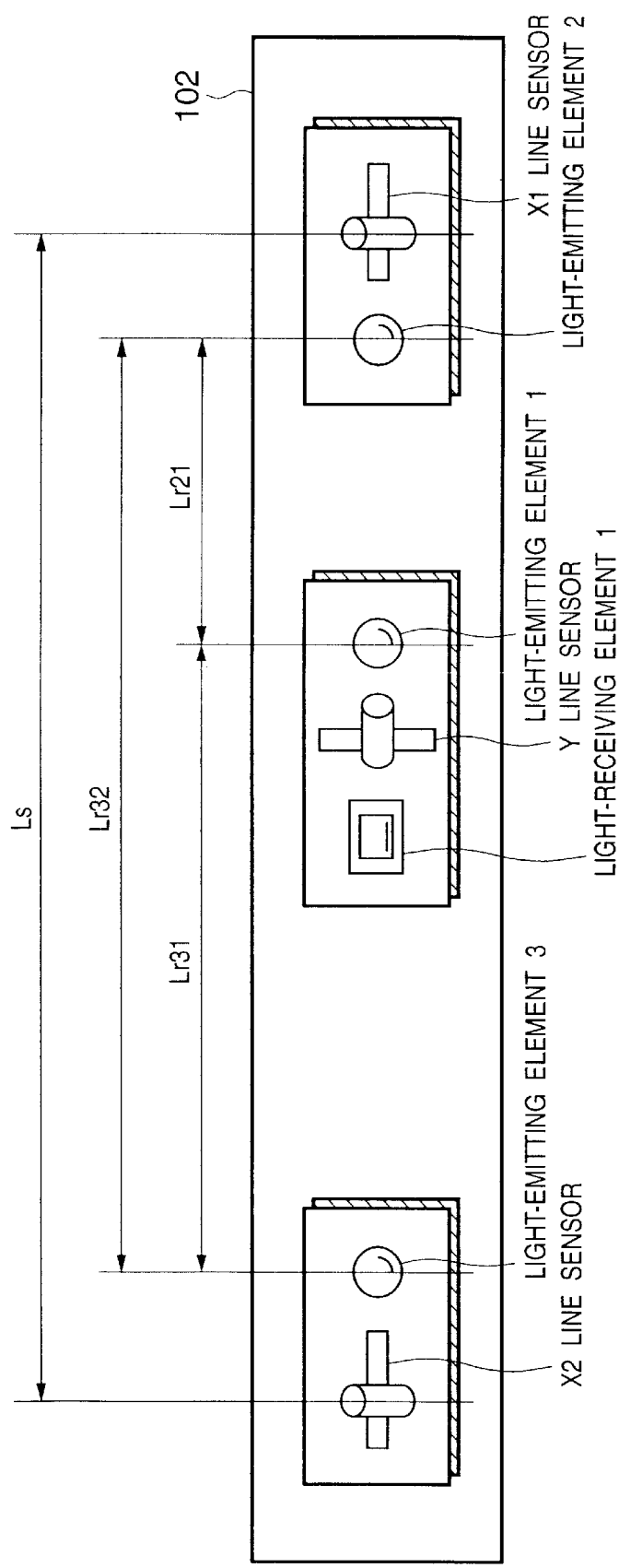
FIG. 15 is a view showing the arrangement and operation of a main body unit according to the third embodiment.

FIG. 15 is a view showing the arrangement and operation of the main body unit according to the third embodiment.

The main body unit 102 is constituted by a plurality of line sensors, a plurality of light-emitting elements, and a single-pixel light-receiving element.

As a typical arrangement, the main body unit has two, X1 line sensor and X2 line sensor in the horizontal direction (X-axis direction), as shown in FIG. 15. The two line sensors are spaced apart from each other by a predetermined distance in the X-axis direction. The main body unit also has a Y line sensor in the vertical direction (Y-axis direction). The main body unit also has light-emitting elements 1 to 3 and a single-pixel light-receiving element 1.

The X1 line sensor and X2 line sensor respectively detect data sequences representing the X-axis components of the angles of incidence of an infrared light emitted from the light-emitting element 0 on the pointing device 101. Since the X1 line sensor and X2 line sensor are spaced apart by a predetermined distance Ls in the X-axis direction, they detect data sequences having a predetermined disparity. In the third embodiment, this processing is done on the basis of the concept of triangulation.

On the other hand, the Y sensor detects a data sequence representing the Y-axis component of the angle of incidence.

In this way, the X-, Y-, and Z-coordinates of the pointing device with respect to the main body unit 102 as the origin are obtained by the X1 line sensor, X2 line sensor, and Y line sensor.

The light-emitting elements 1 to 3 emit the infrared light beams 1 to 3, respectively, to notify the pointing device 101 of the position of the main body unit 102. In the third embodiment, the pointing device 101 detects the direction of the main body unit 102, thereby detecting the X- and Y-axis direction tilts of the pointing device 101 itself.

The light-emitting elements 1 to 3 are almost lined up in the X-axis direction. The light-emitting element 1 is located near the center, and the light-emitting elements 2 and 3 are spaced apart from the light-emitting element 1 by distinctively different distances. This allows the pointing device 101 to distinguish the light-emitting elements.

The combination of a drive circuit 44 and light-emitting element 0 on the pointing device 101 side has a function of emitting infrared light 0 in accordance with a signal modulated by a carrier having a sufficiently higher frequency than the blinking frequency within the blinking period of emission-side blinking of the incident light, and transmits the time series information of blinking and switch information on the pointing device by controlling the presence/absence of the modulation.

Figure 28A:
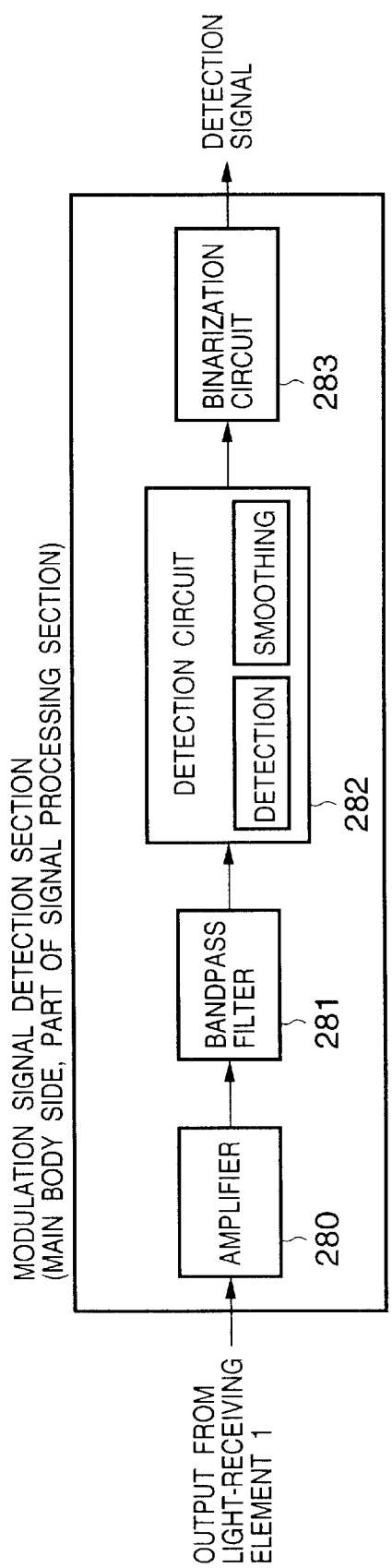
FIG. 28A is a block diagram for explaining the arrangement of a signal processing section according to the third embodiment.

FIG. 28A is a block diagram showing the arrangement of a modulation signal detection as part of a signal processing section 55 on the main body unit side.

The modulation signal detection section as part of the signal processing section 55 on the main body unit side has a bandpass filter 281 having a center frequency that is almost the same as the modulation frequency of the light-emitting element 0, a detection circuit 282, an amplifier 280, and a binarization circuit 283. The modulation signal detection section amplifies a signal obtained by the light-receiving element 1 through the amplifier 280, passes the signal through the bandpass filter 281 and detection circuit 282, and binarizes the signal through the binarization circuit 283, thereby detecting the time series information and switch information transmitted from the light-emitting element 0 as a detection signal.

Figure 28C:
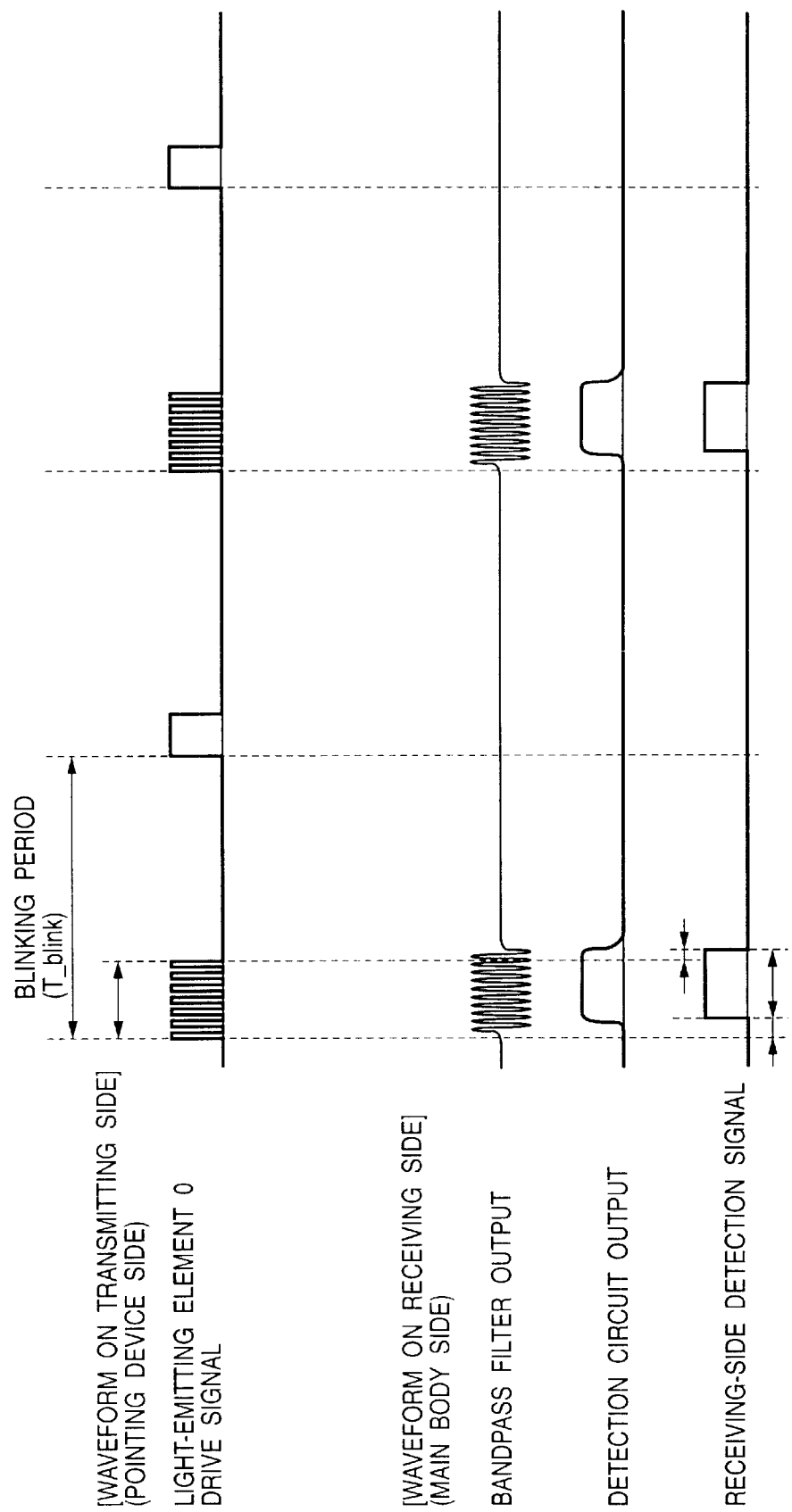
FIG. 28C is a timing chart for explaining modulation and detection in the third embodiment.

FIGS. 28B and 28C are views showing the modulation signal transmitted from the light-emitting element 0 and the procedure of detecting the signal on the main body unit side.

FIG. 28B shows a case wherein all lighting pulses are modulated. FIG. 28C shows a case wherein every other lighting pulse is modulated. The switch information can be sent by appropriately selecting one of these signal modes.

The main body unit 102 also has a first signal processing function calculating 3D coordinates from a data sequence, a second signal processing function of detecting SW information on the pointing device 101 on the basis of a signal obtained from the modulation signal detection section and detecting the infrared blinking, a control function of controlling the operation of the light-receiving element, and a communication function of sending, to a terminal device such as a host computer, the information obtained by the first and second signal processing functions in real time. Details of these functions will be described later.

<Arrangement and Operation of Pointing Device>

The arrangement and operation of the pointing device 101 will be described next with reference to FIG. 16.

Figure 16:
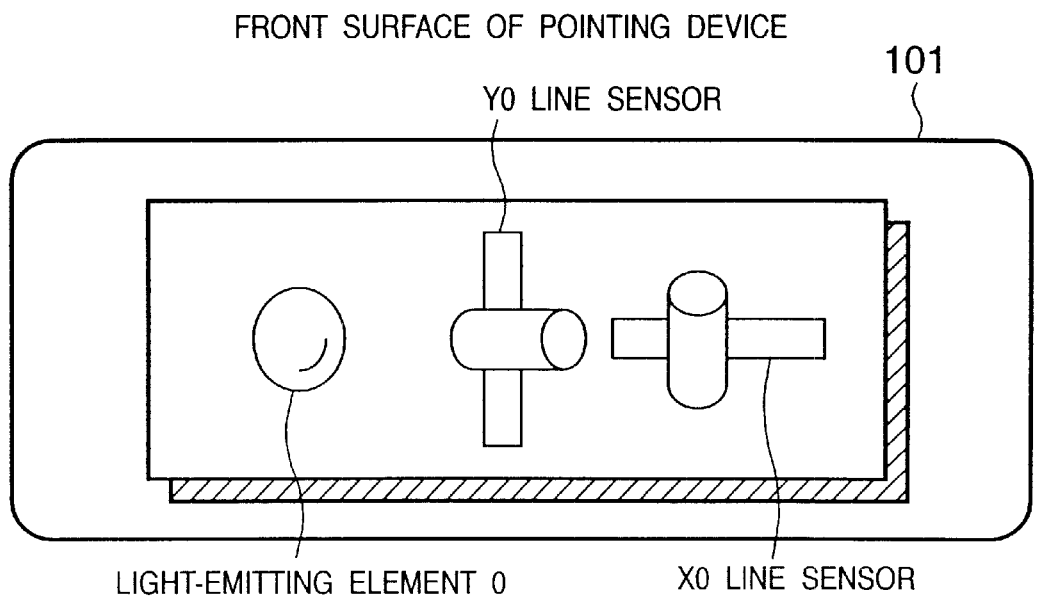
FIG. 16 is a view showing the arrangement and operation of a pointing device according to the third embodiment.

FIG. 16 is a view showing the arrangement and operation of the pointing device according to the third embodiment.

The pointing device 101 has a shape similar to that of a general remote controller for an AV device. As its basic arrangement, the pointing device 101 has an X0 line sensor in the horizontal direction (X direction), Y0 line sensor in the vertical direction (Y direction), light-emitting element 0 for emitting an infrared light, and a plurality of switches which operate when switched or pressed.

The X0 line sensor in the X direction and Y0 line sensor in the Y direction receive the infrared-light beams 1 to 3 emitted from the plurality of light-emitting elements (light-emitting elements 1 to 3) of the main body unit 102, thereby obtaining directions in which the infrared light beams 1 to 3 enter the pointing device 101. On the basis of these directions, the main body unit 102 obtains the relative tilt of the pointing device 101 itself with respect to the main body unit 102. In addition, twist angles of the infrared light beams along the axis of the pointing device 101 are obtained in consideration of the difference in incident direction between the light-emitting elements 1 to 3.

The light-emitting element 0 blinks at a frequency of several kHz and also has a modulation means for sending switch information or the like as time series information at the ON portion of the blinking. With this operation, the main body unit 102 side is notified of the position of the pointing device 101. In addition, the incident direction data of the light-emitting elements 1 to 3, which are detected by the X0 line sensor and Y0 line sensor, and the switch information of each switch on the pointing device 101 are transmitted to the main body unit 102 by the modulation means.

<Arrangement of Line Sensor>

The arrangements of the X0 line sensor and Y0 line sensor on the pointing device 101, and the X1 line sensor, X2 line sensor, and Y line sensor on the main body unit 102, which are used in the third embodiment, will be described next. These line sensors have identical arrangements, and one of them will be representatively described.

Figure 17:
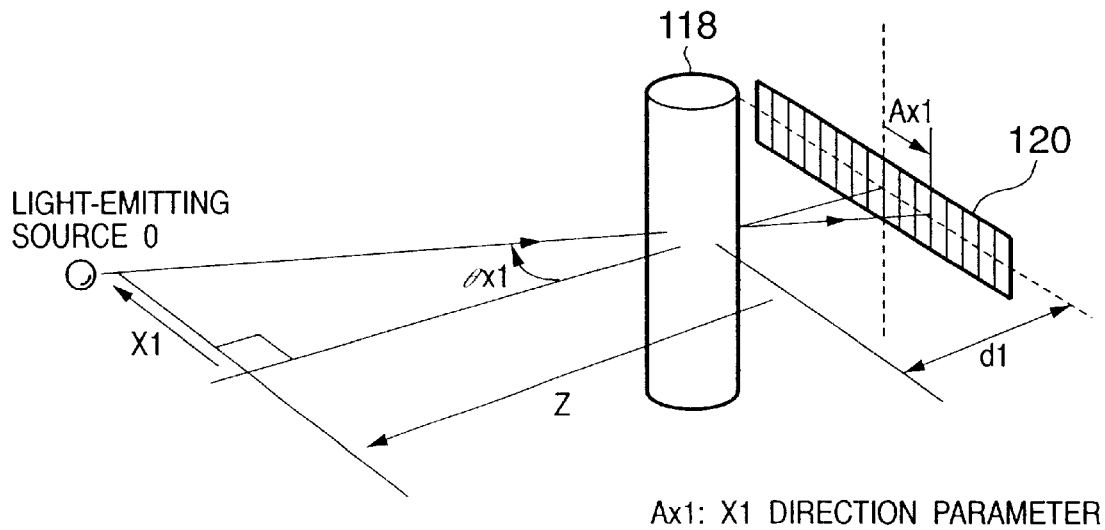
FIG. 17 is a view showing the structure near a line sensor according to the third embodiment.

FIG. 17 is a view showing the structure near a line sensor according to the third embodiment.

The line sensor is actually formed as a line sensor unit mainly comprising a cylindrical lens 118 and line sensor 120.

As shown in FIG. 17, infrared light emitted from a light-emitting source 0 at a position X1 in a plane separated from the cylindrical lens 118 by a distance Z forms an image on the line sensor 120 at a position separated from the reference position by Ax. That is, letting Px be the pixel pitch, the imaging position is near an (Ax/Px)th pixel. In the following description, Ax will be referred to as a direction parameter in the X-axis direction.

<Definition of Coordinates>

Three-dimensional coordinates and 3-degree-of-freedom rotation in the third embodiment will be defined below.

Figure 18:
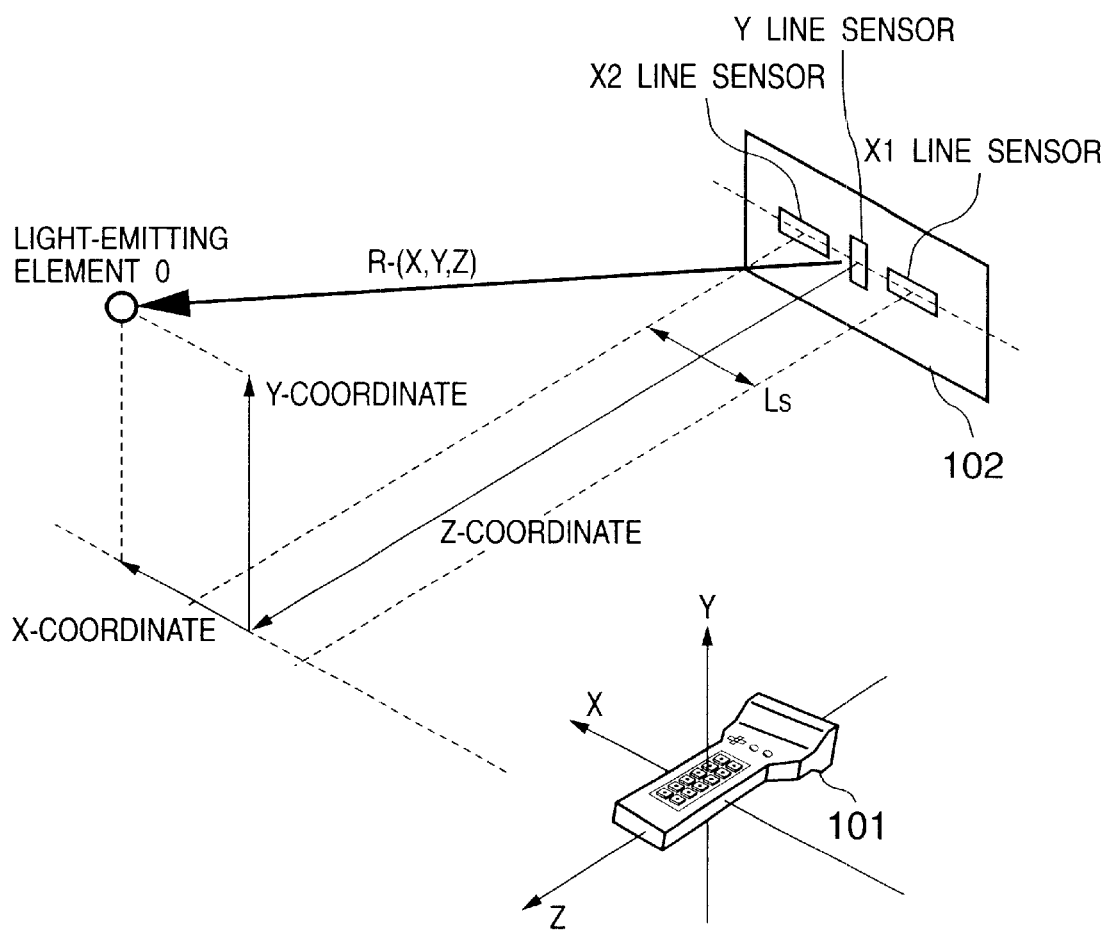
FIG. 18 is a view for explaining the definition of 3D coordinates according to the third embodiment.

As shown in FIG. 18, when an origin is set at the intermediate point between the X1 line sensor and the X2 line sensor, the translational position of the light-emitting element 0 on the pointing device 101 is defined as R= (X, Y, Z).

Figure 19:
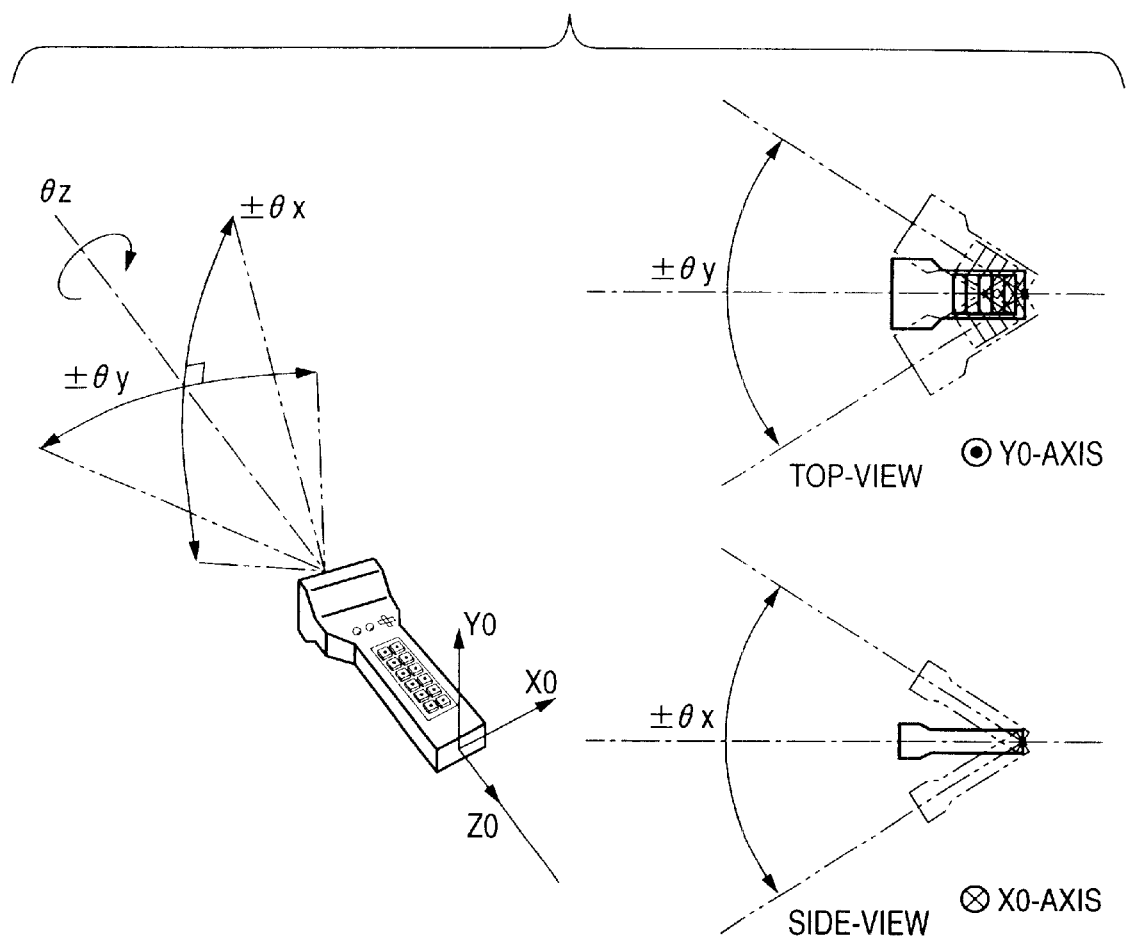
FIG. 19 is a view for explaining definitions of tilt angles in the 3-axis directions in the third embodiment.
Figure 20:
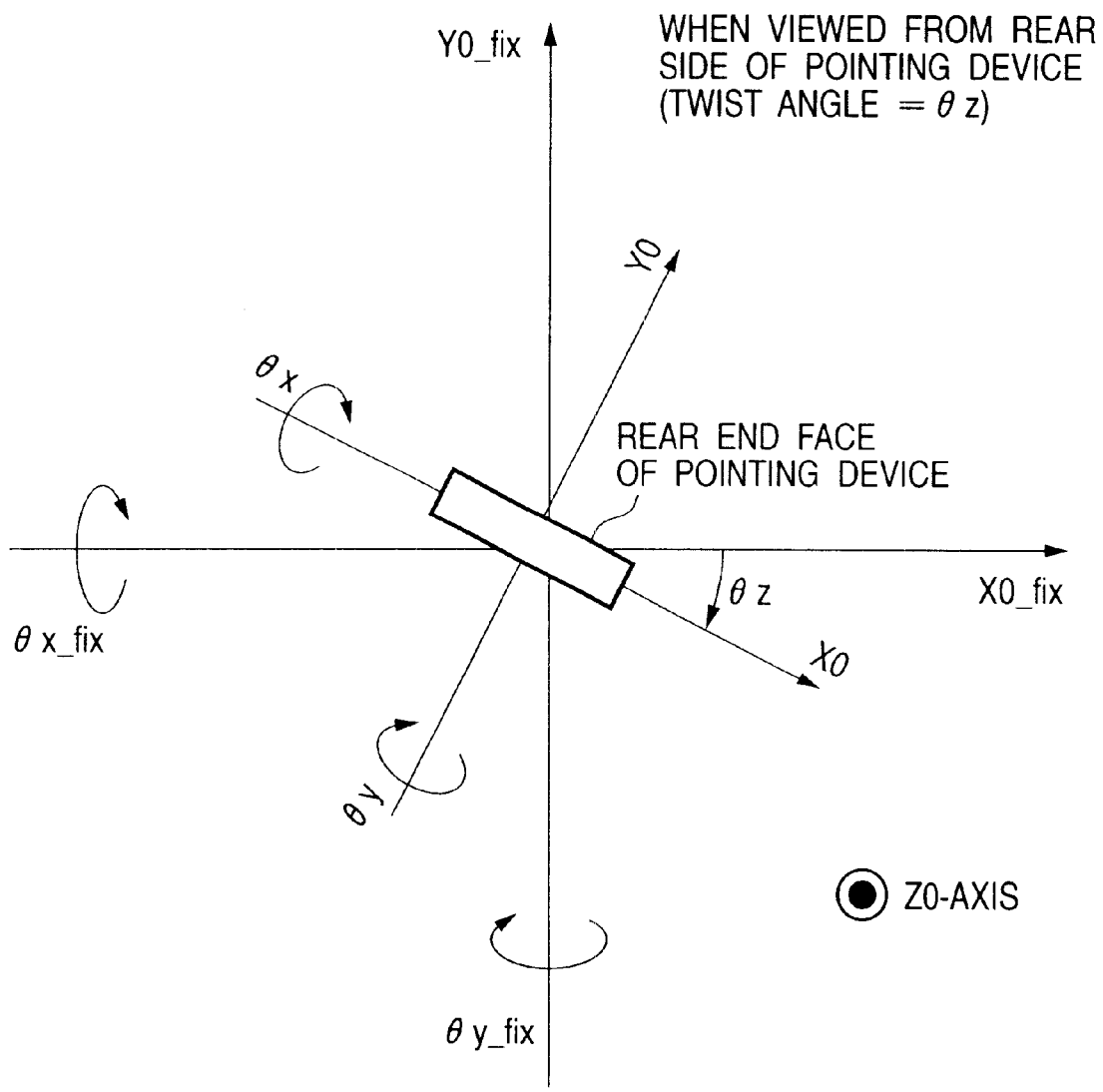
FIG. 20 is a view for explaining definitions of tilt angles in the 3-axis directions in the third embodiment.

As shown in FIGS. 19 and 20, tilts $\theta x$ and $\theta y$ with respect to a central point set at the rear portion of the central axis of the trailing edge of the pointing device 101, and a twist angle $\theta z$ along an axis Z0 are defined.

In the third embodiment, the pointing device 101 is moved by moving the wrist within the range of the degrees of freedom. Since the user moves the pointing device about his/her wrist or elbow, $\theta x$, $\theta y$, $\theta z$ (and $\theta x\_fix$ and $\theta y\_fix$) fall within the range of about ±40 deg. Assuming this, the tilt angle (rotation angle) calculation method is also based on the approximate means.

<3D Position Coordinate Calculation Means>

The procedure of calculating 3D coordinates and 3-axis tilt angles in the third embodiment will be described.

For, e.g., the X1 line sensor, the positional relationship between the line sensor, the cylindrical lens, and the light-emitting element 0 of the pointing device 101, and the definitions of infrared light incident direction $\theta x1$, direction cosine $Ax1$, focal length d, and the like will be described with reference to FIG. 17. The definitions of the X-, Y-, and Z-axes, a position vector R(X, Y, Z), and a distance L will be described with reference to FIG. 18. In addition, the tilts $\theta x$ and $\theta y$ and the twist angle $\theta z$ will be defined with reference to FIGS. 19 and 20.

As shown in FIG. 17, when the light-emitting source 0 is shifted from the central axis by $\theta x1$ in the X-Z plane, the light beam forms an image at a position shifted from the line sensor center by Ax.

At this time, equation (1) below holds.

$$Ax1 = d \times \tan(\theta x1) \tag{1}$$

Ax1 will be referred to as an X1 direction parameter hereinafter. Similarly, Ax2 will be referred to as an X2 direction parameter, and Ay as a Y direction parameter.

In the third embodiment, the relative position of the light-emitting element 0 of the pointing device 101 with respect to the center of the sensor unit is obtained, as shown in FIG. 18. That is, the 3D position vector R is obtained (the X, Y, and Z components of R are obtained).

The calculation procedure of obtaining R=(X, Y, Z) will be described below.

The procedure of obtaining θx1 and Z will be described first with reference to FIG. 21.

In the third embodiment, the X1 line sensor and X2 line sensor are present in the X direction in the same plane. The X1 line sensor and X2 line sensor are spaced apart from each other by the distance Ls. The line sensors have the same arrangement as in FIG. 17.

Hence, $$Ax1/d = \tan(\theta x1) \tag{2}$$

$$Ax2/d = \tan(\theta x2) \tag{3}$$

Figure 21:
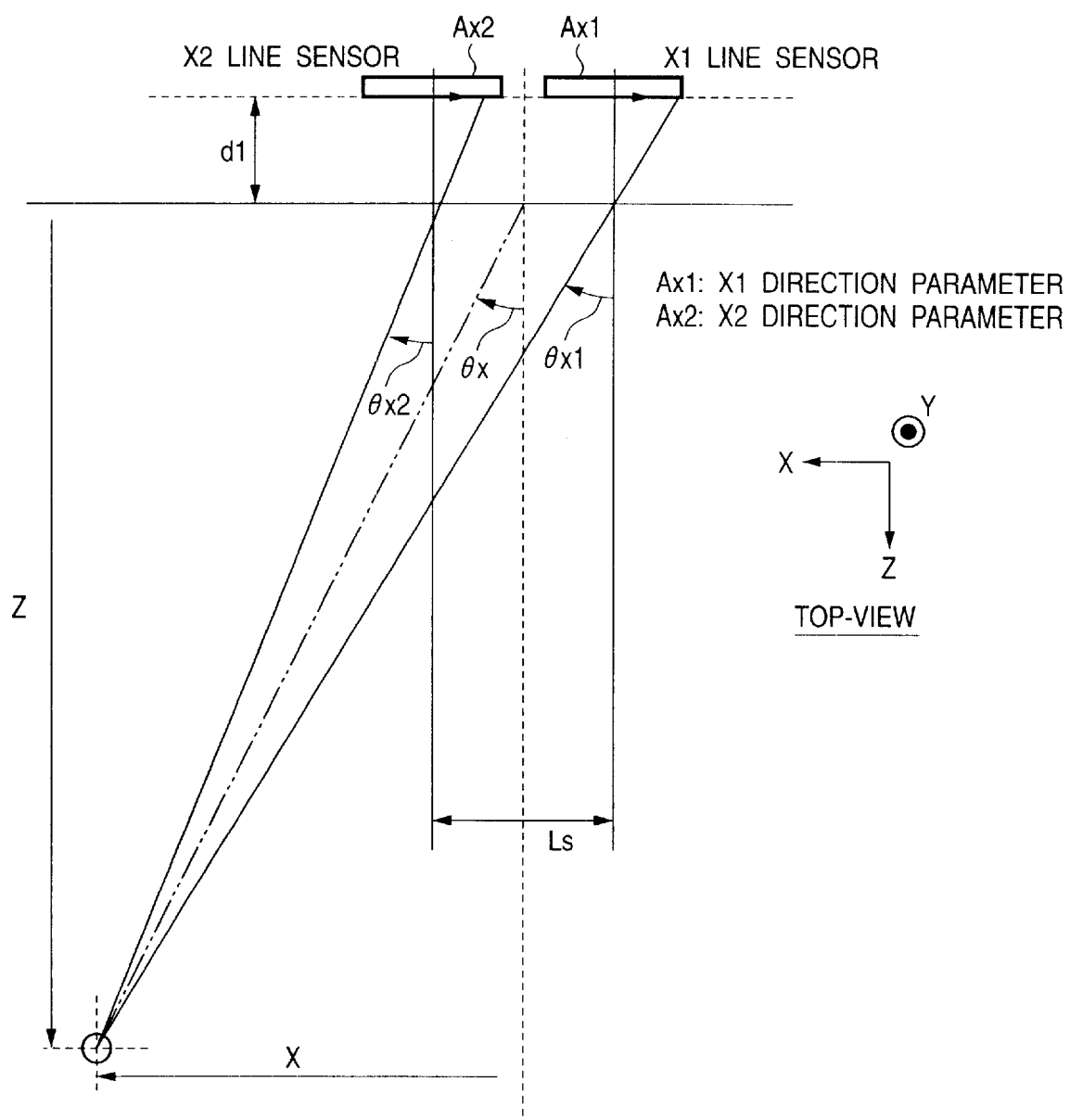
FIG. 21 is a view for explaining the definition of 3D coordinates according to the third embodiment.

FIG. 21 yields $$\tan(\theta x) = \{\tan(\theta x1) + \tan(\theta x2)\}/2 \tag{4}$$

When the X direction parameter Ax is defined by $$Ax \equiv \{Ax1 + Ax2\}/2 \tag{5}$$

equation (6) holds.

$$\tan(\theta x) = Ax/d \tag{6}$$

That is, when Ax1 and Ax2 can be measured, θx can be obtained.

Next, Z is obtained.

As shown in FIG. 21, the X1 line sensor and X2 line sensor are spaced apart from each other by the distance Ls.

Hence, the following relationships hold.

$$\{X+(Ls/2)\}/Z = \tan(\theta x1) = Ax1/d \tag{7}$$

$$\{X-(Ls/2)\}/Z = \tan(\theta x2) = Ax2/d \tag{8}$$

Equations (7) and (8) yield $$Z = (d \times Ls)/\{Ax1 - Ax2\} \tag{9}$$

That is, when Ax1 and Ax2 can be measured, Z can be obtained.

Figure 22:
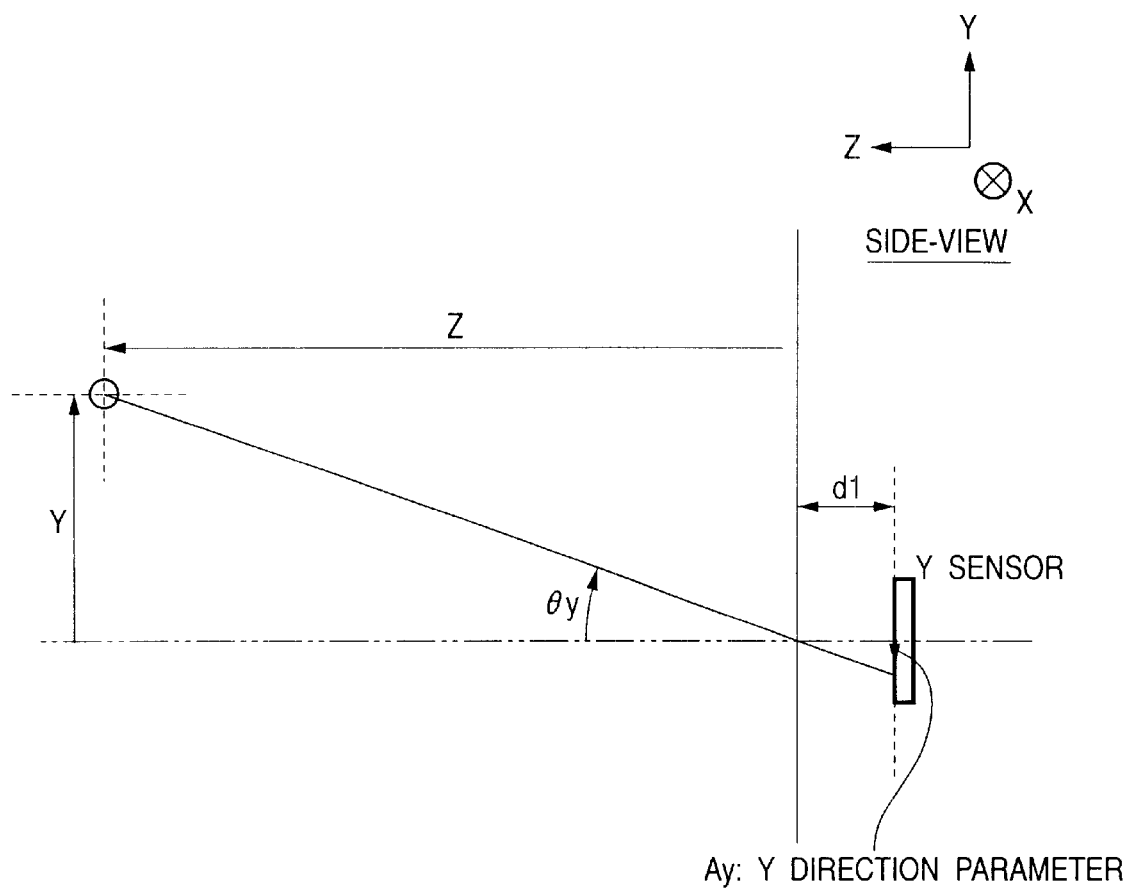
FIG. 22 is a view for explaining the definition of 3D coordinates according to the third embodiment.

The procedure of obtaining θy will be described next with reference to FIG. 22.

The following relationship holds, like equations (2) and (3).

$$\tan(\theta y) = Ay/d \tag{10}$$

That is, when Ay can be measured, θy can be obtained.
From equations (6), (9), and (10), (θx, Z, θy) are obtained.
X, Y, and Z have the following relations therebetween from FIGS. 21 and 22.

$$X = Z \times \tan(\theta x) \tag{11}$$

$$Y = Z \times \tan(\theta y) \tag{12}$$

That is, from equations (11) and (12), (X, Y) can be obtained.

With the above procedure, R=(X, Y, Z) can be obtained.

The 3D translational coordinate calculation procedure of the third embodiment has been described above.

Next, θx, θy, θz, θx_fix, and θy_fix are obtained.

Assumptions are as follows.

①  Approximate solutions are obtained within the range of about −40 deg<θx, θy, θz<+40 deg.

②  R=(X, Y, Z) is already known by the above-described method.

Figure 23:
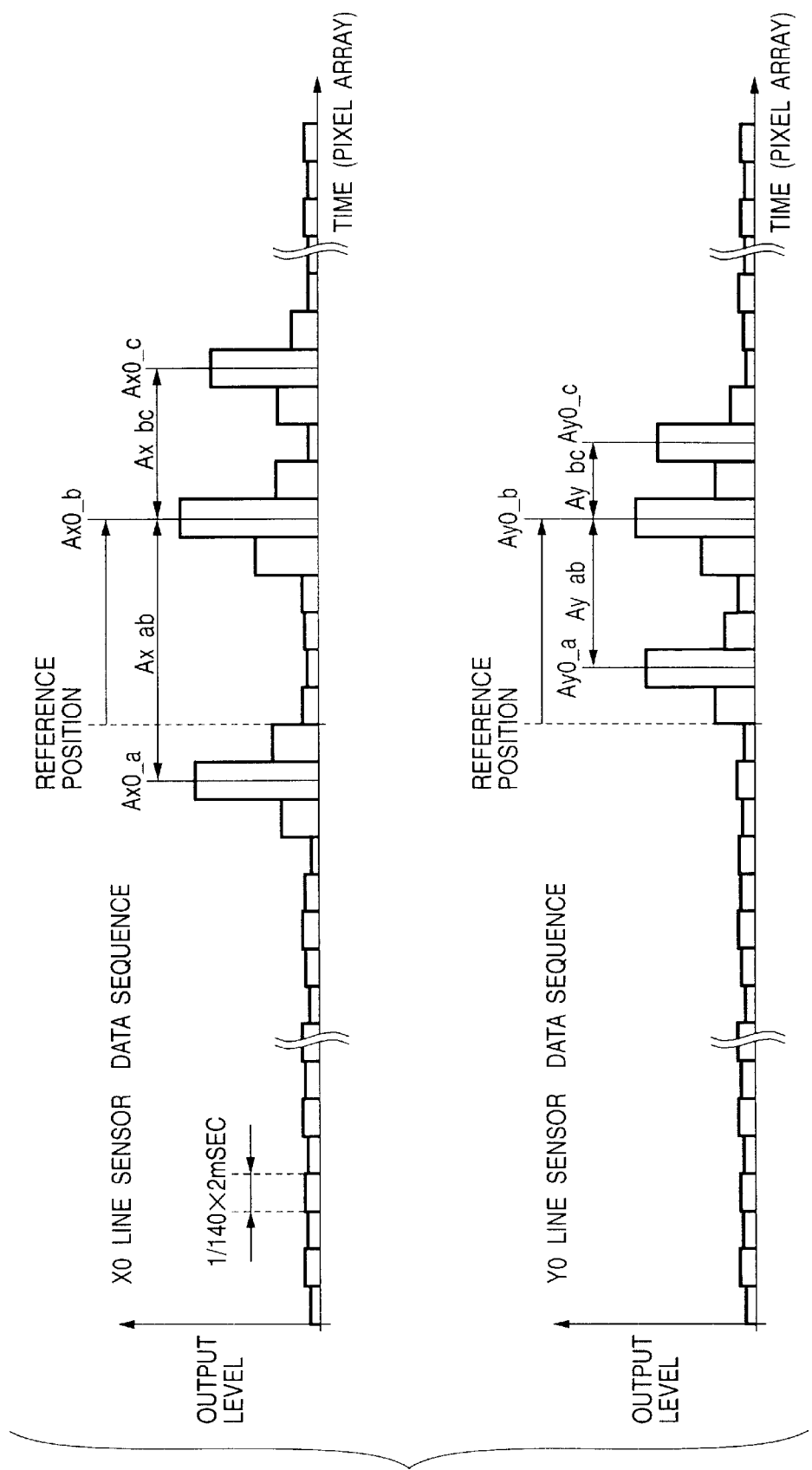
FIG. 23 shows timing charts of the output waveforms from line sensors on the pointing device according to the third embodiment.

Under these assumptions, first, output waveform distributions as shown in FIG. 23 are obtained from the X0 line sensor and Y0 line sensor on the pointing device 101. In these output waveform distributions, the following direction parameters are obtained.

$$Ax0\_a, Ax0\_b, Ax0\_c, (Ax\_ab, Ax\_bc) \tag{14}$$

$$Ay0\_a, Ay0\_b, Ay0\_c, (Ay\_ab, Ay\_bc) \tag{15}$$

The suffices of the direction parameters are a, b, and c from the left side of the data sequence, as shown in FIG. 23. The suffix b corresponds to the light-emitting element 1. The suffices a and b correspond to the light-emitting elements 2 and 3 or 3 and 2 in accordance with the direction of the twist angle of the pointing device 101 (negative or positive (θz).

When the pointing device 101 is separated by the distance Z, the interval between the light-emitting elements 1 and 3, and that between the light-emitting elements 1 and 2 on the sensor surface are projected to lengths given by $$Lr31 \times (d0/Z), Lr21 \times (d0/Z) \tag{16}$$

where d0 is the focal length between the X0 line sensor and the Y0 line sensor.

Figure 24:
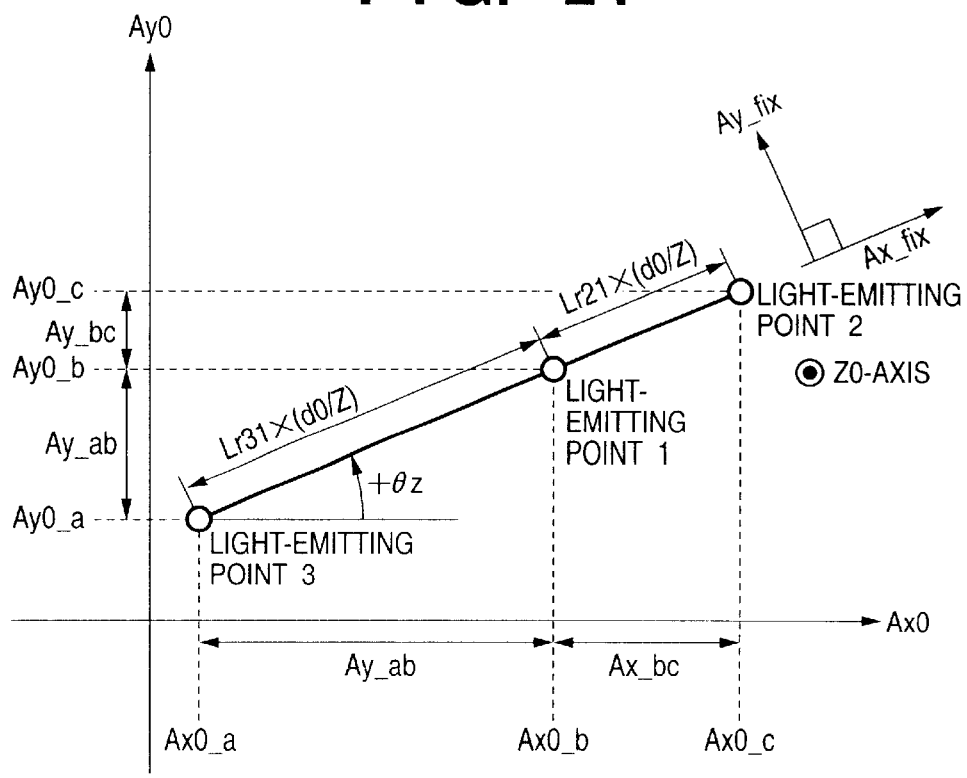
FIG. 24 is a view for explaining the influence of a twist angle in the third embodiment.
Figure 25:
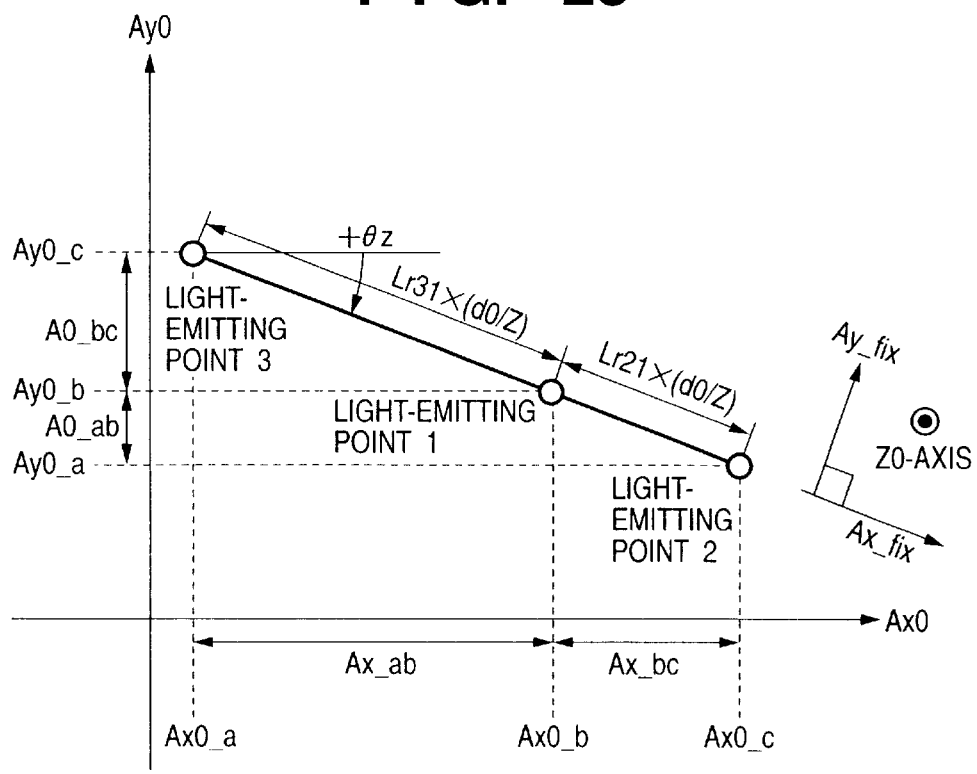
FIG. 25 is a view for explaining the influence of the twist angle in the third embodiment.

When the twist angle of the pointing device 101 is θz, the light-emitting elements 1 to 3 arrayed in the X-axis direction look as in FIGS. 24 and 25. The X-coordinate component and Y-coordinate component in FIGS. 24 and 25 correspond to the direction parameters obtained by the X0 line sensor and Y0 line sensor, respectively.

Hence, from FIGS. 24 and 25, $$\theta z = A\,TAN(|Ay5|/|Ax\_5|) \tag{17-1}$$

or $$\theta z = A\,TAN(|Ay\_4|/|Ax\_4|) \tag{17-2}$$

As for the sign of θz, when $|Ax5| \geq |Ax4|$, $\theta z \geq 0$ (18-1)

when $|Ax5| < |Ax4|$, $\theta z < 0$ (18-2)

or when $|Ay5| \geq |Ay4|$, $\theta z \geq 0$ (18-3)

when $|Ay5| < |Ay4|$, $\theta z < 0$ (18-4)

With the above procedure, θz is approximately obtained.

Next, the tilt angle of the pointing device 101 is obtained.

As the tilt angle of the pointing device 101, a tilt angle (θx, θy) based on the coordinates on the pointing device 101, and a tilt angle (θx_fix, θy_fix) based on the translational coordinates of the pointing device 101 are defined, as shown in FIGS. 19 and 20.

The following relations are obtained (approximately) from the same relations as equations (2) and (3).

$$\theta x = A\ \text{TAN}\ (Ay0\_b/Z) \quad (19\text{-}1)$$

$$\theta y = A\ \text{TAN}\ (Ax0\_b/Z) \quad (19\text{-}2)$$

note) x and y replace with each other.

When coordinate conversion as in FIGS. 20, 24, and 25 is taken into consideration, $$Ax0\_\text{fix} = \text{COS}(\theta z) \times Ax0\_b + \text{SIN}(\theta z) \times Ay0\_b \quad (20\text{-}1)$$

$$Ay0\_\text{fix} = \text{SIN}(-\theta z) \times Ax0\_b + \text{COS}(\theta z) \times Ay0\_b \quad (20\text{-}2)$$

In addition, as in equations (19-1) and (19-2), $$\theta x\_\text{fix} = A\ \text{TAN}[\{\text{SIN}(-\theta z) \times Ax0\_b + \text{COS}(\theta z) \times Ay0\_b\}/Z] \quad (21\text{-}1)$$

$$\theta \psi\_\text{fix} = A\ \text{TAN}[\{\text{COS}(\theta z) \times Ax0\_b + \text{SIN}(\theta z) \times Ay0\_b\}/Z] \quad (21\text{-}2)$$

With the above procedure, $\theta x$, $\theta y$, $\theta z$, $\theta x\_\text{fix}$, and $\theta y\_\text{fix}$ are obtained.

<Use of Ring CCD>

As a main characteristic feature of the third embodiment, ring-shaped photoelectric conversion elements (ring CCDs) are used as the X0 line sensor and Y0 line sensor on the pointing device 101 and the X1 line sensor, X2 line sensor, and Y line sensor on the main body unit 102, as in the first and second embodiments.

In the above-described first, second, and third embodiments, even when a normal line sensor is used in place of the ring CCD, a similar system can be built, though the performance is poor.

As another characteristic feature of the third embodiment, by sending time series information from the pointing device 101 to the main body unit 102, the electronic shutter function of the line sensor of the main body unit 102 and the blinking of the light-emitting element of the pointing device 101, and the electronic shutter function of the line sensor of the pointing device 101 and the blinking of the light-emitting element of the main body unit 102 are synchronized with each other. This widens the light-receiving dynamic range and remarkably increases the resistance to disturbance light.

<Layout of Light-Emitting and Light-Receiving Elements>

As shown in FIG. 15, the main body unit 102 of the third embodiment is constructed by the X1 line sensor, X2 line sensor, Y line sensor, light-emitting elements 1 to 3, and light-receiving element 1. As shown in FIG. 16, the pointing device 101 is constructed by the X0 line sensor, Y0 line sensor, and light-emitting element 0.

The X0 line sensor, X1 line sensor, and X2 line sensor are laid out in the horizontal direction, and the Y line sensor and Y0 line sensor are laid out in the vertical direction such that they are almost perpendicular to each other.

In the main body unit 102, the X1 line sensor, Y line sensor, and X2 line sensor are almost linearly laid out from the left side in this order. The X1 line sensor and X2 line sensor are spaced apart by the distance Ls. The X1 line sensor and X2 line sensor are laid out in the horizontal direction, and the Y line sensor is laid out in the vertical direction such that they are almost perpendicular to each other. The light-emitting elements 3, 1, and 2 are almost linearly laid out from the left side in this order. The light-emitting elements 3 and 1 are spaced apart by a distance Lr31, and the light-emitting elements 1 and 2 are spaced apart by a distance Lr21. The light-receiving element 1 is laid out near the Y line sensor and light-emitting element 1.

In the third embodiment, actual sizes Ls=200 mm, Lr31=100 mm, and Lr21=50 mm are proposed.

In the pointing device 101, the X0 line sensor, Y0 line sensor, and light-emitting element 0 are laid out on the front surface relatively close to each other (within the range of, e.g., 50 mm). The X0 line sensor is laid out in the horizontal direction, and the Y0 line sensor is laid out in the vertical direction such that they are almost perpendicular to each other.

<Light-Emitting and Light-Receiving Operations>

In the third embodiment, the X0 line sensor and Y0 line sensor on the pointing device 101 receive the infrared light beams 1 to 3 emitted from the light-emitting elements 1 to 3 of the main body unit 102, thereby detecting the relative angles of incidence from the light-emitting elements 1 to 3.

According to the above-described procedure, the difference in angle of incidence between the light-emitting elements 1 and 3 is detected to obtain $\theta z$. In addition, the angle of incidence from the light-emitting element 2 is obtained to obtain $\theta x$ and $\theta y$ or $\theta x\_\text{fix}$ and $\theta y\_\text{fix}$.

The light-emitting element 0 on the pointing device 101 emits the infrared light 0 to notify the main body unit 102 of the position of the pointing device 101 and send to the main body unit 102 the information of angles of incidence of the light-emitting elements 1 to 3 and switch information on the pointing device 101. The light-emitting element 0 blinks at a predetermined frequency. This blinking synchronizes with the electronic shutter function of a line sensor on the main body unit 102. This blinking is also modulated by a frequency much higher than the blinking frequency. By controlling the modulation frequency, the incident angle information and switch information are time-serially transmitted.

The third embodiment assumes a blinking frequency of several kHz and a modulation frequency of several hundred kHz.

In the main body unit 102, the infrared light 0 emitted from the light-emitting element 0 is received by the single-pixel light-receiving element 1, thereby detecting time series information containing pieces of information representing the relative incident directions of the light-emitting elements 1 to 3 of the main body unit 102 with respect to the pointing device 101 and the switch information and blinking on the pointing device 101. When these pieces of information are received by the X1 line sensor, X2 line sensor, and Y line sensor, the 3D position (more exactly, the 3D position, i.e., X, Y, and Z of the light-emitting element 0) of the pointing device 101 is obtained with reference to the line sensor group of the main body unit 102. More specifically, the Z-coordinate is obtained on the basis of the difference (so-called disparity) between the angles of incidence which are obtained by the X1 line sensor and X2 line sensor. On the basis of the Z-coordinate, the X-coordinate is obtained in accordance with the average value of the angles of incidence which are obtained by the X1 line sensor and X2 line sensor. Furthermore, the Y-coordinate is obtained in accordance with the angle of incidence obtained by the Y line sensor.

In the third embodiment, by sending the time series information from the light-emitting element 0 on the pointing device 101 to the main body unit 102, the light-emitting element 0 can be synchronized with the electronic shutter functions of the X1 line sensor, X2 line sensor, and Y line sensor of the main body unit 102. In addition, the light-emitting elements 1 to 3 of the main body unit 102 can be synchronized with the electronic shutter functions of the X0 line sensor and Y0 line sensor of the pointing device 101.

<Functional Arrangement>

The functional arrangement of the coordinate input system according to the third embodiment will be described next with reference to FIG. 26.

Figure 26:
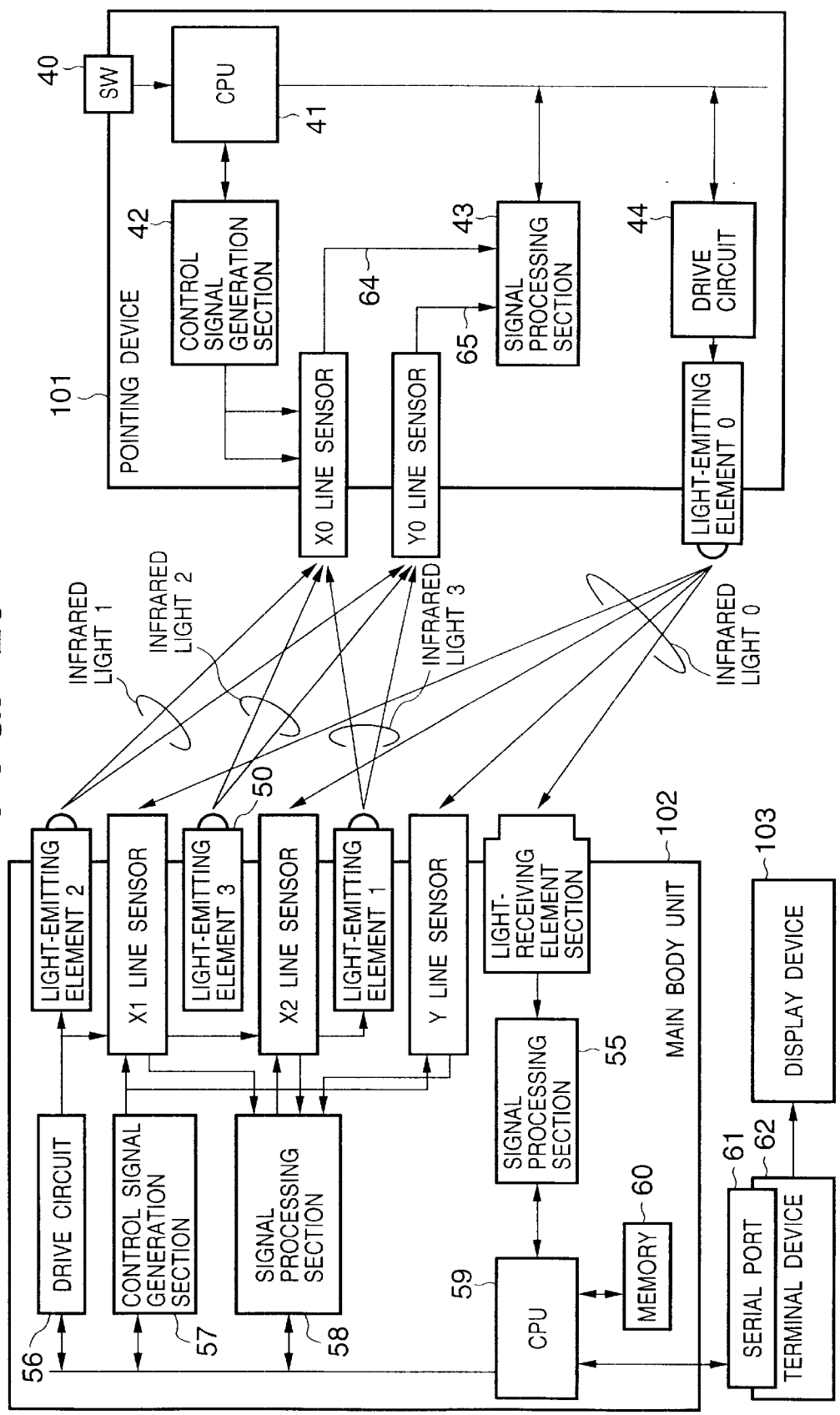
FIG. 26 is a block diagram showing the functional arrangement of the coordinate input system according to the third embodiment.

FIG. 26 is a block diagram showing the functional arrangement of the coordinate input system according to the third embodiment.

The functional arrangement of the pointing device 101 will be described first.

The pointing device 101 mainly comprises a switch group 40, CPU 41, control signal generation section 42, signal processing section 43, drive circuit 44, X0 line sensor, Y0 line sensor, and light-emitting element 0.

The CPU 41 starts a series of operations when triggered by a signal from the switch group 40 and operates the control signal generation section 42, thereby controlling the X0 line sensor and Y0 line sensor.

Signals 64 and 65 obtained from the X0 line sensor and Y0 line sensor are sent to the signal processing section 43. The signals 64 and 65 are analog data sequences as shown in FIG. 23. The signal processing section 43 obtains Ax0_a, Ax0_b, Ax0_c, Ay0_a, Ay0_b, and Ay0_c from the data sequences.

The CPU 41 controls the predetermined blinking frequency and predetermined modulation frequency on the basis of a timing obtained from the switch group 40 and incident angle data obtained from the signal processing section 43, thereby synthesizing a drive signal and sending it to the drive circuit 44. The drive circuit 44 drives the light-emitting element 0 by a predetermined voltage.

The functional arrangement of the main body unit 102 will be described next.

The main body unit 102 mainly comprises a CPU 59, signal processing section 55, drive circuit 56, control signal generation section 57, signal processing section 58, memory 60, light-receiving element 1, X1 line sensor, X2 line sensor, Y line sensor, and light-emitting elements 1 to 3.

The X1 line sensor, X2 line sensor, and Y line sensor receive the infrared light 0 emitted from the light-emitting element 0 on the pointing device 101, thereby acquiring analog data sequences as shown in FIG. 27. The signal processing section 58 obtains Ax1, Ax2, and Ay as shown in FIG. 27 from the data sequences.

Note that Ax1, Ax2, and Ay is sometimes calculated by the CPU 59. In this case, the data sequences are subjected to some processing and then digitized and stored in the memory 60. On the basis of Ax1, Ax2, and Ay, the CPU 59 also calculates the 3D coordinates of the pointing device 101 with reference to the main body unit 102.

The infrared light 0 emitted from the pointing device 101 is also received by the light-receiving element 1. The signal obtained by photoelectrically converting the light received by the light-receiving element 1 is sent to the signal processing section 55. The signal processing section 55 extracts the information of the switch group 40, timing information of the blinking frequency, and Ax0_a, Ax0_b, Ax0_c, Ay0_a, Ay0_b, and Ay0_c observed by the pointing device 101 and sends them to the CPU 59.

The CPU 59 calculates the tilt ($\theta x$, $\theta y$, $\theta z$) or ($\theta x\_fix$, $\theta y\_fix$) of the pointing device 101 on the basis of Ax0_a, Ax0_b, Ax0_c, Ay0_a, Ay0_b, and Ay0_c. The timing information of the blinking frequency extracted by the signal processing section 55 is sent to the control signal generation section 57, and the X1 line sensor, X2 line sensor, and Y line sensor are controlled, thereby synchronizing the electronic shutter functions of these line sensors with blinking of the light-emitting element 0. The timing information of the blinking frequency also synchronizes blinking of the light-emitting elements 1 to 3 of the main body unit 102 with the electronic shutter functions of the X0 line sensor and Y0 line sensor on the pointing device 101. When the drive circuit 56 operates on the basis of the timing information, the light-emitting elements 1 to 3 blink.

The electrical operations of the pointing device 101 and main body unit 102 have been described-above. The 3D coordinates X, Y, Z, $\theta x$, $\theta y$, $\theta x$ ($\theta x\_fix$, $\theta y\_fix$) calculated by these operations, including the tilt of the pointing device 101, are transmitted to a terminal device 62 such as a computer, game device, or image device through a serial port 61. On the basis of the 3D coordinates, a corresponding image is displayed on a display device 63 as an operation input for various applications.

As described above, in the third embodiment as well, a ring CCD is employed as each of the line sensors of the pointing device 101 and main body unit 102, as in the first embodiment. The basic arrangement is the same as in FIG. 8. In the third embodiment, however, a case wherein n=64, and m=140 will be exemplified.

The period of a signal "IRCLK" representing the electronic shutter of the ring CCD is, e.g., 2.0 kHz in the third embodiment, which almost equals the period of a signal "LED_IRCLK" representing blinking of the light-emitting elements 1 to 3 of the main body unit 102 with an error of about 100 PPM. The signal "IRCLK" is obtained by frequency-dividing a charge transfer clock "CCD_SP" (e.g., 280 kHz) of the ring CCD by m (140).

The electronic shutter operation is the same as that described in detail in the first embodiment, and a description thereof will be omitted here.

In the third embodiment, the signal "IRCLK" is synchronized with the signal "LED_IRCLK". Such a time relationship holds that the light-emitting element 0 of the pointing device 101 emits light at a portion A in FIG. 8 and no light at a portion B.

With this arrangement, charges in the light emission mode are held by a hold section a (232), and charges in the non-emission mode are held by a hold section b (233). As a result, the charges in the light emission mode are transferred to the 2ith cell of the transfer section, and the charges in the non-emission mode are transferred to the (2i–1)th cell. Each of the operations indicated by timings A, B, C, D, E, F, and G is executed simultaneously for all pixels.

The transfer operation of the circulative charge transfer path is the same as that described in the first embodiment, and a description thereof will be omitted here.

In the third embodiment, the circulative charge transfer path is formed from 140 cells (m=140). Hence, the frequency of the transfer clock "CCD_SP" of this transfer section is $\frac{1}{140}$ (280 kHz) of the signal "IRCLK".

Signals read from the signal read section are actually read in the same temporal order as the order of cells arrayed on the circulative charge transfer path. FIG. 24 is a graph showing this processing. The voltage values are read sequentially from the nth pixel to the first pixel. FIG. 23 shows the accumulated charge distributions or voltage value read waveforms when the infrared light beams 1 to 3 from the light-emitting elements 1 to 3 of the main body unit 102 form images on the X0 line sensor and Y0 line sensor of the pointing device 101. FIG. 27 shows the accumulated charge distributions or voltage value read waveforms when the infrared light 0 from the light-emitting element 0 of the pointing device 101 forms an image on the X1 line sensor, X2 line sensor, and Y line sensor of the main body unit 102.

<Control of Ring CCD>

Control of the ring CCD will be described next.

In the third embodiment, the ring CCD is repeatedly controlled by a timing sequence generated by the control signal generation section 42 of the pointing device 101 or the control signal generation section 57 of the main body unit 102 every time coordinate data of one point is received. The timing sequence will be described with reference to FIG. 28D.

Figure 28D:
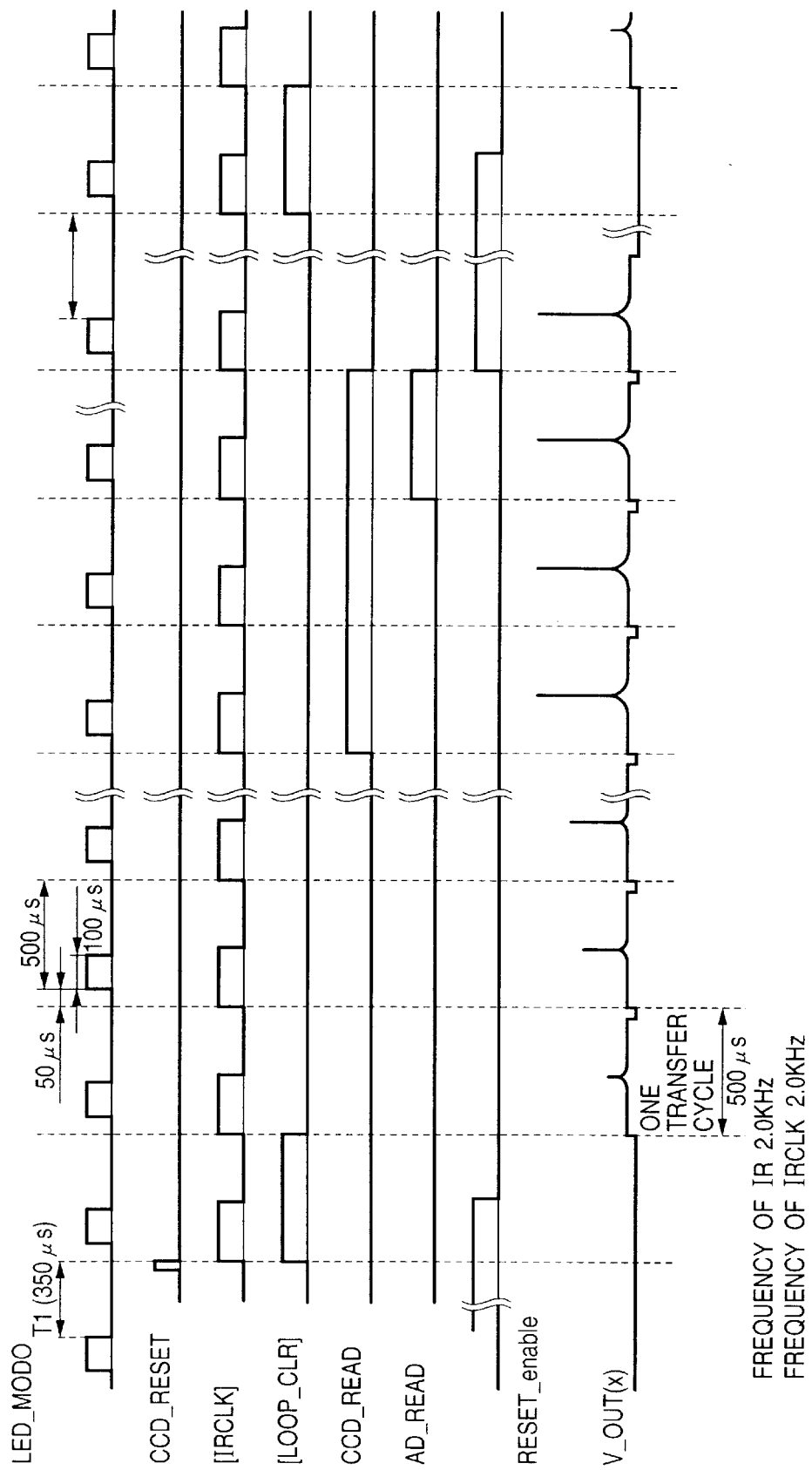
FIG. 28D is a timing chart showing the time sequence related to a control signal generation section according to the third embodiment.

Referring to FIG. 28D, signals in brackets internally control the ring CCD. The remaining signals are externally supplied to the ring CCD.

Upon receiving a signal "CCD_RESET" as a trigger, the ring CCD generates the signal "CCD_SP" and frequency-divides this signal by 140 to generate the signal "IRCLK". The signal "CCD_SP" is a transfer clock for the circulative charge transfer path, as described above. The signal "IRCLK" is used as a reference for operation of turning on the electronic shutter twice and transferring charges from the photoelectric conversion section to the circulative charge transfer path, as described above.

The timing sequence in FIG. 28D will be described. First, the signal "CCD_RESET" is externally supplied. In accordance with the signal "CCD_RESET", the signal "IRCLK" starts. Simultaneously, a signal "LOOP_CLR" goes high during, e.g., one cycle of the signal "IRCLK", so that charges remaining in the circulative charge transfer path are cleared.

After that, charges are additionally accumulated in accordance with the signal "IRCLK", so the read waveform gradually becomes large, as indicated by a signal V_OUT (X).

The signal level of the read waveform is monitored by the control signal generation section. When the signal level of the read waveform reaches a predetermined value, a signal "CCD_READ" goes high, and the shutter operation of the ring CCD stops. However the circulating operation itself continues.

In the third embodiment, while the signal "CCD_READ" is at low level, the ring CCD continues to additionally accumulate charges to the circulative charge transfer path. When the signal "CCD_READ" goes high, the additional accumulation is stopped. However, the circulating operation continues.

Hence, when the signal "CCD_READ" goes high, the waveform of the signal V_OUT(X) is kept unchanged. After that, a signal "AD_READ" goes high, and the signal V_OUT(X) is input to the A/D converter (not shown) in the signal processing section, converted into a digital signal data sequence, and sent to the CPU.

As described above, the signal "CCD_READ" remains at low level until the signal level of the read waveform of the signal V_OUT(X) reaches a predetermined value. Hence, when the signal level is high (when the level of irradiation light is high), the time when the signal "CCD_READ" remains at low level becomes short. Conversely, when the signal level is low (when the level of irradiation light is low), the time when the signal "CCD_READ" remains at low level becomes long.

That is, the time when the signal "CCD_READ" remains at low level can be regarded as kind of exposure time. In the third embodiment, it can be regarded that the exposure time is adjusted in accordance with the level of irradiation light.

The actually received waveform has a predetermined level independently of the magnitude of the signal intensity. This makes it possible to receive light in a wide dynamic range.

For these operations, both the line sensor of the main body unit and that of the pointing device perform the same operations.

<Synchronization Between Blinking and Electronic Shutter>

Synchronization between blinking of the light-emitting element 0 of the pointing device 101 and the electronic shutter of the line sensor (ring CCD) of the main body unit 102 will be described next.

In the third embodiment, the period of light emission (signal "LED_DRIVE") of the pointing device 101 is 2.0 kHz. The repetitive frequency (one cycle for two shutter ON operations) of the electronic shutter operation of the line sensor (ring CCD) of the main body unit 102 as a light reception side is also 2.0 kHz (corresponding to the signal "IRCLK").

The two frequencies, i.e., the blinking frequency on the light emission side and the repetitive frequency of the electronic shutter operation on the light reception side are set to the same value within the range of 100 PPM in advance.

As shown in FIG. 28D, the timing sequence of the ring CCD starts with the signal "CCD_RESET". Especially, it is designed in advance such that the leading edge of the signal "IRCLK" generated by the ring CCD is immediately after the trailing edge of the signal "CCD_RESET". Hence, when the timing of the signal "CCD_RESET" is controlled, the timing (phase) of the signal "IRCLK" can be controlled.

More specifically, the timing of the signal "CCD_RESET" is set such that it falls at a timing that delays a signal "LED_MODU" obtained by passing, through the signal processing section 55, a signal obtained when light emission of the pointing device 101 is detected by the light-receiving element 1 of the main body unit 102 by a predetermined time T1 (e.g., 350 $\mu$s). With this setting, the signals "IRCLK" and "LED_DRIVE" can be phase-locked at least immediately after the signal "CCD_RESET". This is equivalent to control for phase-locking blinking of the pointing device 101 with the electronic shutter of the ring CCD at the start of the timing sequence.

Figure 28E:
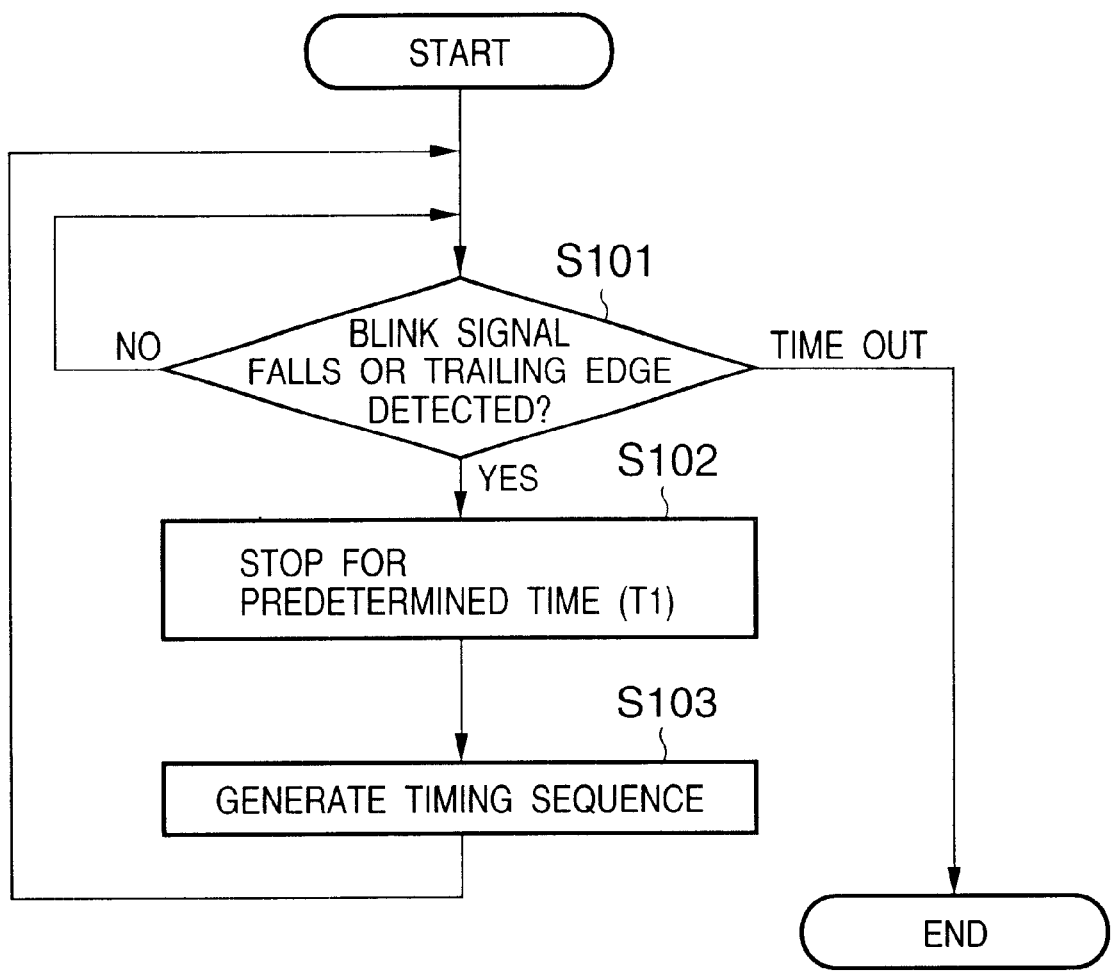
FIG. 28E is a flow chart showing processing of implementing phase lock of the third embodiment.

Processing of synchronizing the blinking of the light-emitting element 0 on the pointing device 101 with the electronic shutter operation of the ring CCD will be described here with reference to FIG. 28E.

To do synchronization of the third embodiment, the timing is adjusted immediately before the start of timing sequence shown in FIG. 28D to phase-lock the signals "IRCLK" and "LED_DRIVE" at that timing. After that, the signals "IRCLK" and "LED_DRIVE" are freely run during a period corresponding to one point (i.e., one cycle of the timing sequence). When the timing sequence is ended, detection of the trailing edge of the signal "CCD_RESET" is waited again (step S101). When the first subsequent trailing edge is detected (YES in step S101), the timing is adjusted again (i.e., processing waits for the predetermined time T1) to perform phase lock (step S102), and the next timing sequence is started again (step S103).

The frequency deviations of the signals "IRCLK" and "LED_DRIVE" during the free-run period will be described below.

In the third embodiment, the maximum period for receiving coordinates of one point is 40 ms. This means that the period of the signal "CCD_RESET" in FIG. 28D is 40 ms at maximum, i.e., the maximum free-run period is about 40 ms.

The circuits for generating the signals "IRCLK" and "LED_DRIVE" assume that they use a frequency obtained by dividing a frequency generated by a quartz oscillator. Generally, the frequency accuracy of most quartz oscillators is higher than 100 PPM. When the frequency accuracy of a quartz oscillator is, e.g., 100 PPM, the frequency deviation of the phase, which may occur during the free-run period, is 40 ms×100 PPM=4 $\mu$s. This value is sufficiently smaller than the period (500 $\mu$s) of the signal "IRCLK", or its lighting period (100 $\mu$s) or margin time (50 $\mu$s) before lighting.

According to the third embodiment, the synchronous relationship between the signal "IRCLK" and the signal "LED_DRIVE" is almost maintained even during the free-run period. Hence, the blinking of the light-emitting element 0 on the pointing device 101 can be synchronized with the electronic shutter of the line sensor (ring CCD) of the main body unit 102.

As described above, according to the third embodiment, infrared light emitted from the pointing device 101 is received by the main body unit 102 whereby the 3D position, a change in 3D position, and 3D motion of the pointing device 101 are calculated. On the other hand, infrared light emitted from the main body unit 102 is received by the pointing device 101 whereby 3-axis tilt and a change in 3-axis tilt of the pointing device 101 itself are calculated. Time series information is sent from the pointing device 101 to the main body unit 102 by infrared light whereby the two types of calculations can be executed according to the same processing procedure in real time.

Since both the main body unit 102 and pointing device 101 use a plurality of line sensors, a wireless 3D coordinate input apparatus having a wide light-receiving dynamic range for the motion of operation and resistance to disturbance light noise can be implemented.

(Fourth Embodiment)

In the above-described third embodiment, the electronic shutter function of the line sensor of the main body unit 102 is synchronized with the blinking of the light-emitting element 0 of the pointing device 101, and the electronic shutter function of the line sensor of the pointing device 101 is synchronized with the blinking of the light-emitting elements 1 to 3 of the main body unit 102 by sending time series information from the pointing device 101 to the main body unit 102, thereby remarkably improving the resistance to disturbance light.

In the fourth embodiment, especially for blinking of a pointing device 101 and that of a main body unit 102, a special relationship is established for the blink patterns and phases, and the electronic shutter function of a corresponding ring CCD is made to match the blinking. This makes it possible to remove crosstalk disturbance between the blinking of the pointing device 101 and that of the main body unit 102 while maintaining the resistance to disturbance light.

The coordinate input system according to the fourth embodiment basically has the same arrangement as that of the coordinate input system of the third embodiment. A description of contents that are the same as in the third embodiment will be omitted, and only characteristic portions of the fourth embodiment will be described below.

FIG. 29 is a timing chart showing the general relationship between the blink signal and electronic shutter function used in the in the fourth embodiment.

Referring to FIG. 29, for blinking 1 to 3, the current of a light-emitting element flows when the logic is high. For electronic shutters 1 to 3, the electronic shutter is turned on when the logic is high.

The blinking 1 and electronic shutter 1 represent the basic relationship between the blink signal and the electronic shutter in the above-described third embodiment.

As shown in FIG. 29, the electronic shutter 1 has a period ½ that of the blinking 1 and a constant phase. An odd-numbered electronic shutter ON period includes a lighting period, and no lighting is performed during an even-numbered electronic shutter ON period.

In the above-described third embodiment, the difference between charges stored in an odd-numbered cell and those stored in an even-numbered cell is used as an output signal (to be referred to as a difference signal hereinafter). For example, when common blink patterns are observed during the odd- and even-numbered electronic shutter ON periods, the patterns are canceled. On the other hand, when different blink patterns are observed during these periods, only charges accumulated by these patterns are output as an effective signal.

In the fourth embodiment, for the purpose of removing crosstalk disturbance, the combinations of the blinking 2 and electronic shutter 2, and the blinking 3 and electronic shutter 3 are proposed, as shown in FIG. 29.

The repeating period (blink pattern period) of the blink pattern of the blinking 1 is 2*Ts, while the blink pattern period of the blinking 2 is 4*Ts, and the lighting is performed twice at a period Ts only during ½ a period. The blink pattern period of the blinking 3 is 8*Ts, and the lighting is performed four times at the period Ts only during ½ a period.

The ON/OFF period (electronic shutter period) of the electronic shutter 1 is Ts, while the electronic shutter period of the electronic shutter 2 is 2*Ts, and the ON/OFF period (electronic shutter period) of the electronic shutter 3 is 4*Ts.

Figure 30:
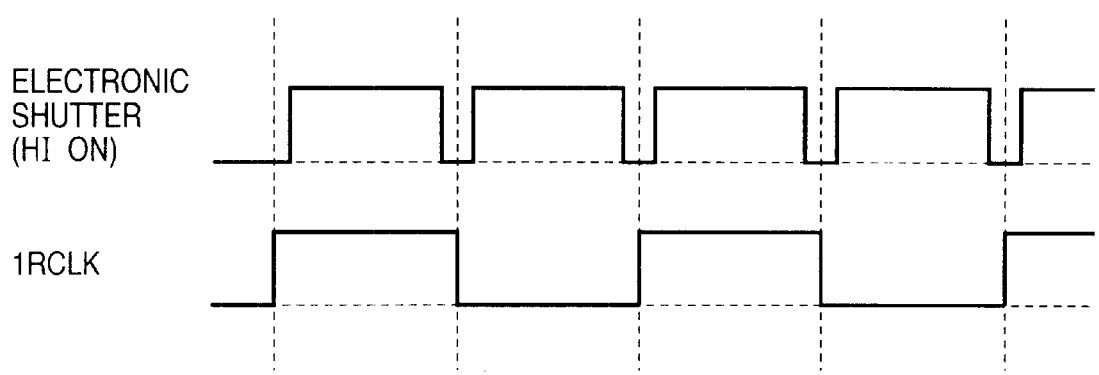
FIG. 30 is a timing chart for explaining the relationship between the blink signal and the electronic shutter function in the fourth embodiment.

For the phase relationship, the first lighting in each blinking period is performed in the same ON period of the electronic shutter 1. In addition, as shown in FIG. 30, the leading edge of the signal "IRCLK" representing each electronic shutter period matches the period.

In such a relationship, in the three combinations of blinking and electronic shutters, a predetermined difference output by the signal by blinking is obtained for blinking and a corresponding electronic shutter. On the other hand, in a combination of blinking and an electronic shutter that do not correspond to each other, the signals by blinking are canceled, and the difference output is zero. That is, at least in these relationships between blinking and electronic shutters, the crosstalk disturbance can be removed.

The above relationship can be further generalized as follows.

"For the first-order electronic shutter period Ts, the first-order blink pattern period of first-order blinking is 2*Ts. The number of times of ON operations during one first-order blink pattern period is one. The ON time of the first-order blinking is always included in an even-numbered (or odd-numbered) ON region of the first-order electronic shutter.

The nth-order blink pattern period of nth-order blinking is Ts*$2^n$. The total number of times of ON operations is $2^{n-1}$ times at the interval Ts during ½ the nth blink pattern period in each first-order electronic shutter ON period. For the phase relationship, the first ON operation in each blink pattern period is performed during the first-order electronic shutter ON period corresponding to the first-order blinking ON period.

On the other hand, the nth-order electronic shutter period is Ts*$2^{n-1}$. One nth-order electronic shutter ON period includes all ON periods during one nth-order blink pattern period. The nth-order electronic shutter OFF period matches at least one of the first-order electronic shutter OFF periods.

Such a combination of blinking and an electronic shutter, including the combination of the nth-order blinking and electronic shutter, generates no crosstalk disturbance with respect to a combination of blinking and an electronic shutter of any other order, that satisfies the same condition".

<Synchronization Between Blinking and Electronic Shutter>

In the fourth embodiment, for blinking of the pointing device 101 and that of the main body unit 102, a special relationship is established for the blink patterns and phases, and the electronic shutter function of a corresponding ring CCD is made to match the blinking. For this purpose, blinking and the electronic shutter are synchronized in a manner different from that in the third embodiment.

Figure 33:
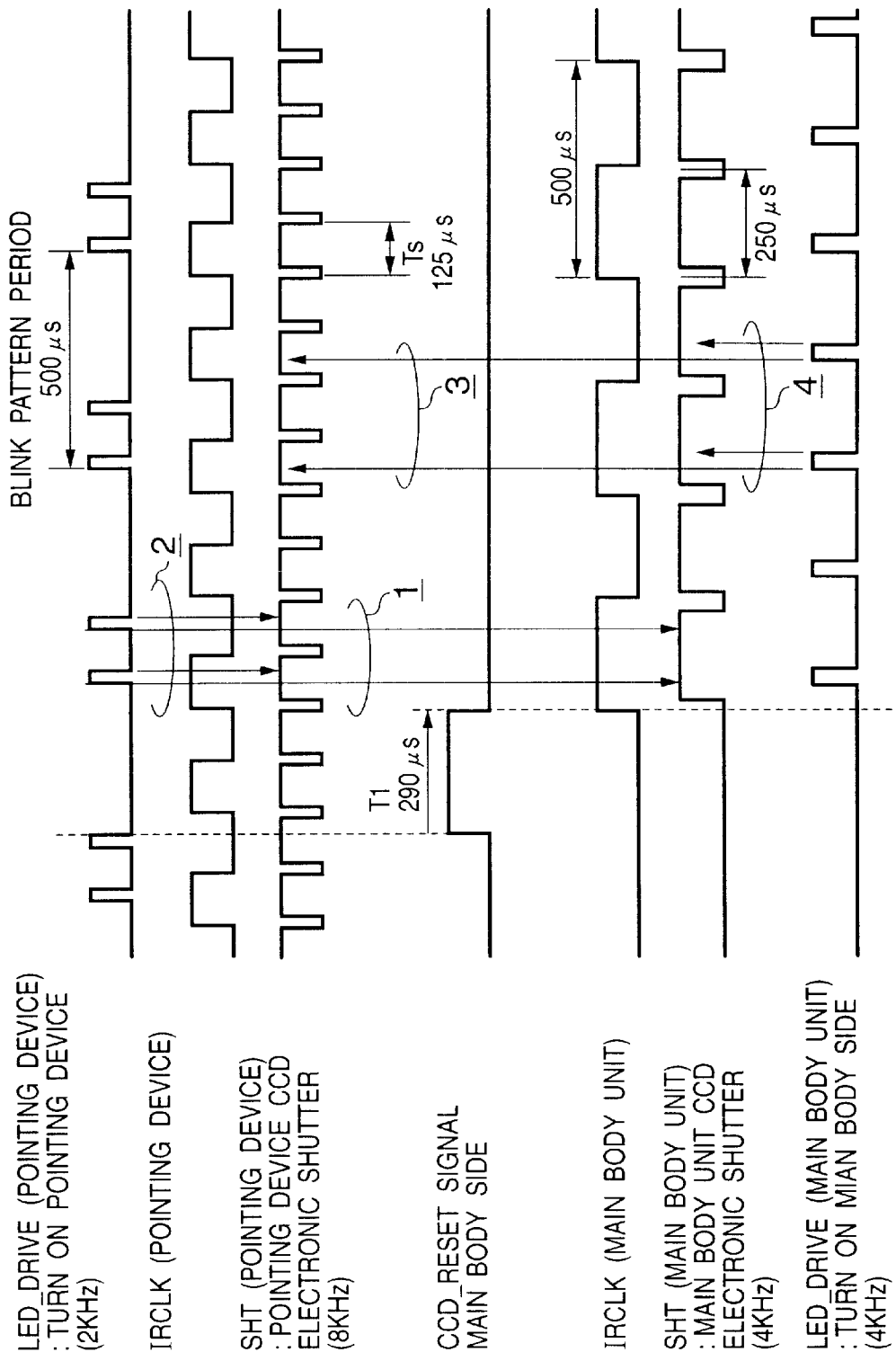
FIG. 33 is a timing chart for explaining the relationship between blinking and an electronic shutter in the fourth embodiment.
Figure 34:
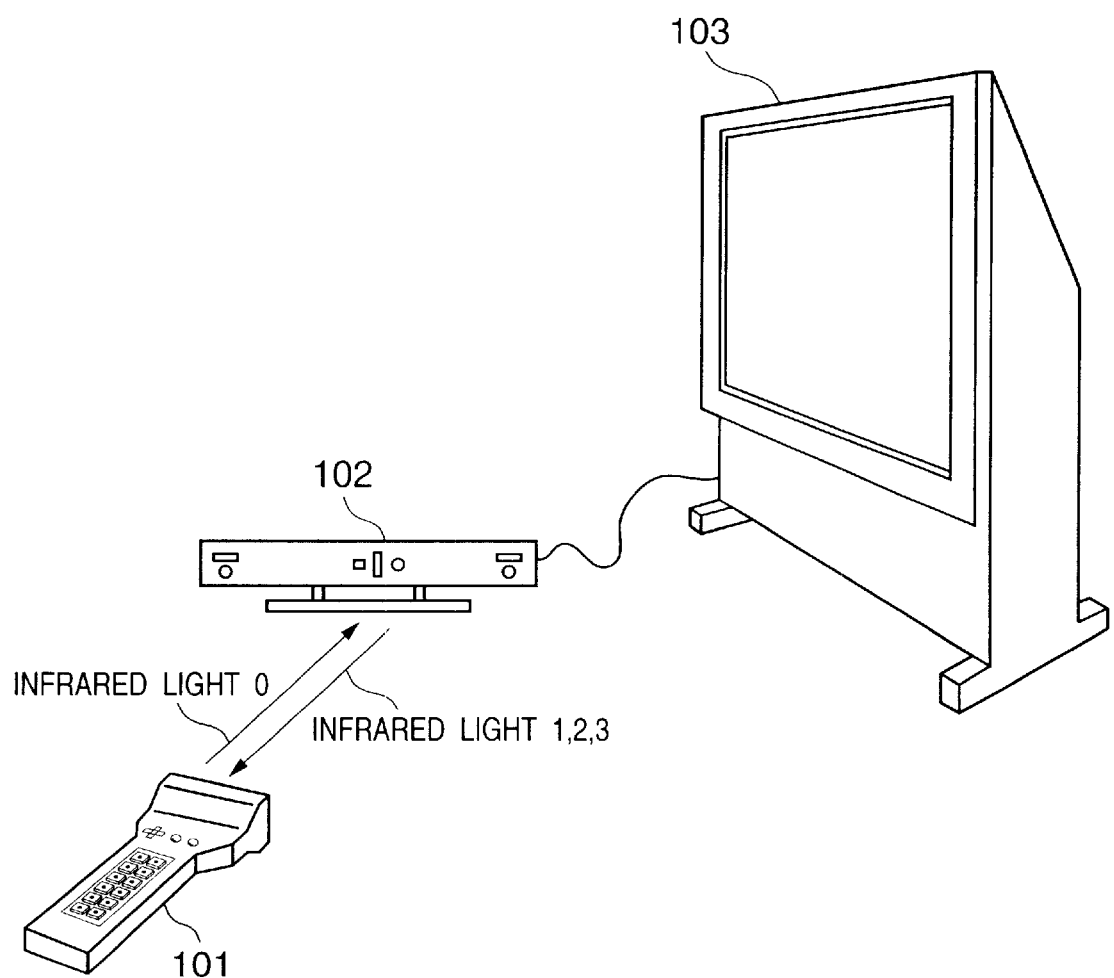
FIG. 34 is a view showing the outer appearance of a 3D coordinate input apparatus according to the fifth embodiment.

More specifically, as shown in FIG. 33, the timing is set such that the signal "CCD_RESET" falls after a predetermined time T1 from the trailing edge of the second lighting of an arbitrary period of light emission "LED_DRIVE" of the pointing device 101. With this timing, at least immediately after the signal "CCD_RESET", the signal "IRCLK" (main body unit side) and the signal "LED_DRIVE" (pointing device side) can be phase-locked. This is equivalent to control for phase-locking blinking of the pointing device 101 with the electronic shutter of the ring CCD at the start of the timing sequence.

Processing of implementing this phase lock will be described with reference to FIG. 31.

Figure 31:
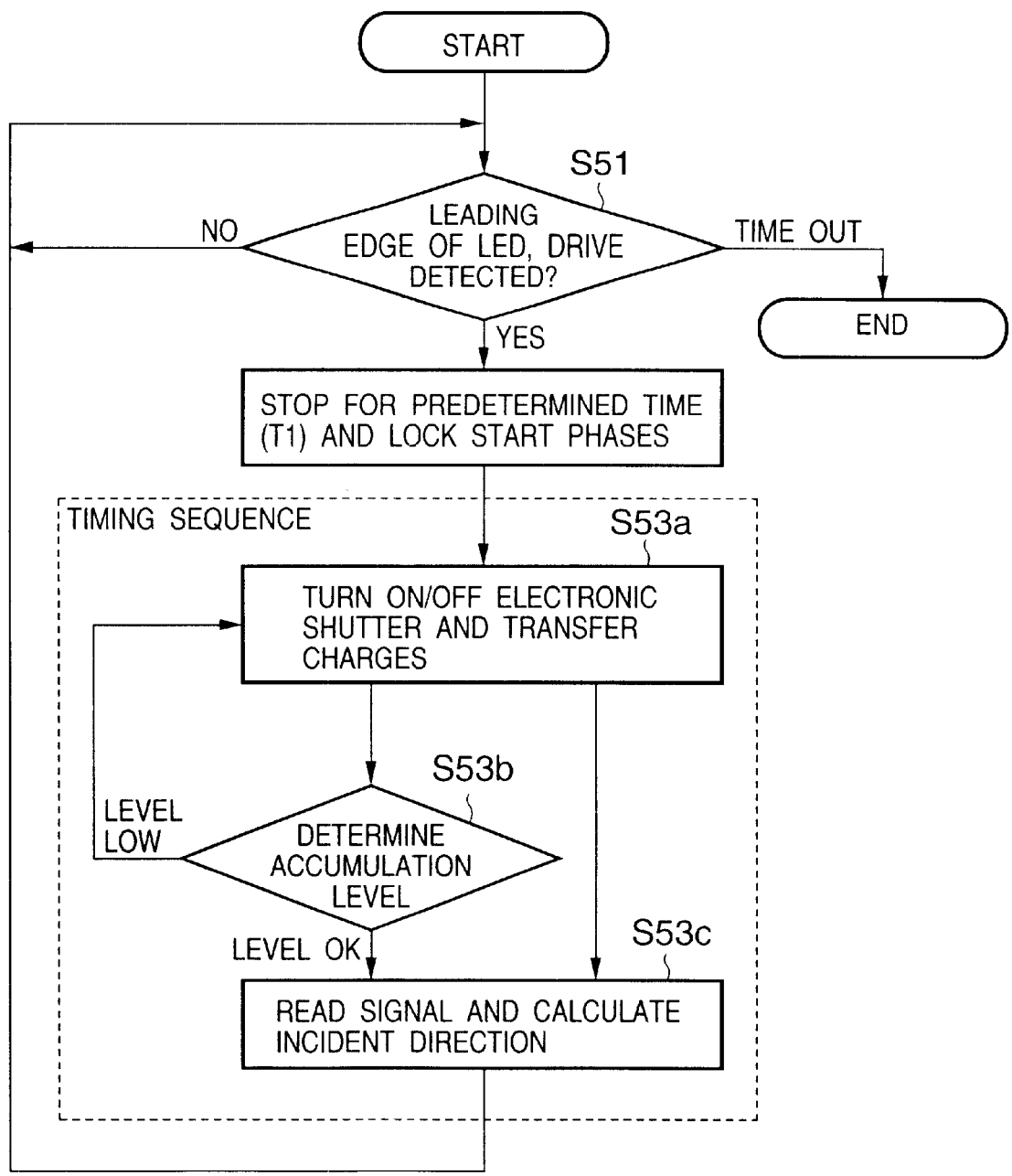
FIG. 31 is a flow chart showing processing of implementing phase lock of the fourth embodiment.

FIG. 31 is a flow chart showing processing of implementing phase lock of the fourth embodiment.

Synchronization in the fourth embodiment, the timing is adjusted immediately before the timing sequence to phase-lock the signals "IRCLK" and "LED_DRIVE" at that timing. After that, the signals "IRCLK" and "LED_DRIVE" are freely run during a period corresponding to one point (i.e., one cycle of the timing sequence).

When the timing sequence is ended, detection of the trailing edge of the signal "CCD_RESET" is waited again (step S51). When the first subsequent trailing edge is detected (YES in step S51), the timing is adjusted again (i.e., processing waits for the predetermined time T1) to lock the phases (step S52). The next timing sequence represented by steps S53a to S53c is started again. When the series of timing sequences are ended, the flow returns to step S51 to repeat the processing until time-out.

<Removal of Crosstalk Disturbance>

Removal of crosstalk disturbance in the fourth embodiment will be described next.

As described above, in the third embodiment, crosstalk disturbance may occur between light emitted from the pointing device 101 to the main body unit 102 and light emitted from the main body unit 102 to the pointing device 101. That is, light emitted from the pointing device 101 to the main body unit 102 partially enters a line sensor on the pointing device 101 by accident because, e.g., the light is reflected by the display device, or light emitted from the main body unit 102 to the pointing device 101 partially enters a line sensor on the main body unit because, e.g., the light is reflected in the room.

Figure 32:
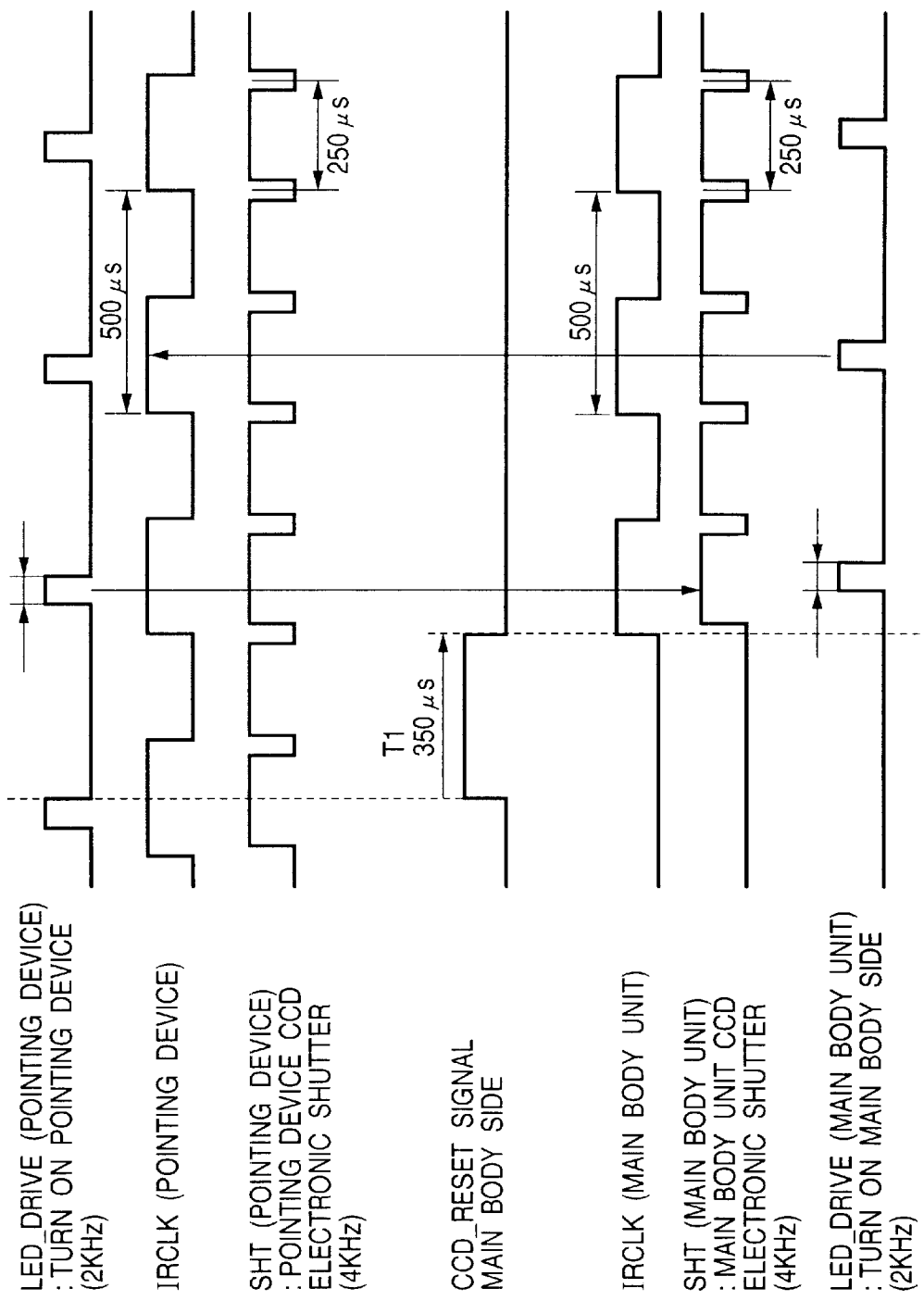
FIG. 32 is a timing chart for explaining the relationship between blinking and an electronic shutter in the third embodiment.

In the above-described third embodiment, for example, as shown in FIG. 32, the frequency (blink pattern frequency) at which the blink pattern of blinking of the main body unit 102 is repeated is set at 2 kHz, the electronic shutter frequency of the pointing device 101 is set at 4 kHz, the blink pattern frequency of blinking of the pointing device 101 is set at 2 kHz, the electronic shutter frequency of the main body unit 102 is set at 4 kHz, T1 is set at 350 µs, and the timing sequence as shown in FIG. 28D is executed to synchronize blinking of the main body unit 102 with the electronic shutter of the pointing device 101 and blinking of the pointing device 101 with the electronic shutter of the main body unit 102, thereby implementing removal of disturbance light.

In the fourth embodiment, as described above, the characteristic features of the combinations of nth-order blinking and electronic shutters are assumed. That is, "For the first-order electronic shutter period Ts, the first-order blink pattern period of first-order blinking is 2*Ts. The number of times of ON operations during one first-order blink pattern period is one. The ON time of the first-order blinking is always included in an even-numbered (or odd-numbered) ON region of the first-order electronic shutter.

The nth-order blink pattern period of nth-order blinking is $Ts*2^n$. The total number of times of ON operations is $2^n-1$ times at the interval Ts during ½ the nth blink pattern period in each first-order electronic shutter ON period. For the phase relationship, the first ON operation in each blink pattern period is performed during the first-order electronic shutter ON period corresponding to the first-order blinking ON period.

On the other hand, the nth-order electronic shutter period is $Ts*2^{n-1}$. One nth-order electronic shutter ON period includes all ON periods during one nth-order blink pattern period. The nth-order electronic shutter OFF period matches at least one of the first-order electronic shutter OFF periods.

Such a combination of blinking and an electronic shutter, including the combination of the nth-order blinking and electronic shutter, generates no crosstalk disturbance with respect to a combination of blinking and an electronic shutter of any other order, that satisfies the same condition".

On this assumption, blinking of the main body unit 102 and the electronic shutter of a line sensor of the pointing device 101 are combined as the first-order combination, and blinking of the pointing device 101 and the electronic shutter of a line sensor of the main body unit 102 are combined as the second-order combination. With this arrangement, crosstalk disturbance between the infrared light 0 emitted from the pointing device 101 to the main body unit 102 and the infrared light 1 to 3 emitted from the main body unit 102 to the pointing device 101 can be removed.

More specifically, as shown in FIG. 33, phase lock is performed while Ts is set at 125 µs, the blink pattern frequency of blinking of the main body unit 102 is set at 4 kHz, the electronic shutter frequency of the pointing device 101 is set at 8 kHz, the blink pattern frequency of blinking of the pointing device 101 is set at 2 kHz, the electronic shutter frequency of the main body unit 102 is set at 4 kHz, and T1 is set at 290 µs. With this arrangement, a blinking timing sequence can be implemented such that a synchronization holds in the respective relationships, and no crosstalk disturbance occurs between the combinations.

An arrow 1 in FIG. 33 indicates a combination of light emission and reception from the pointing device to the main body unit, an arrow 2 indicates a combination of light emission and reception from the main body unit to the pointing device, an arrow 3 indicates crosstalk from the pointing device to the pointing device, and an arrow 4 indicates crosstalk from the main body unit to the main body unit.

As described above, according to the fourth embodiment, in addition to the effects described in the third embodiment, for blinking of the pointing device 101 and that of the main body unit 102, a special relationship is established for the frequencies and phases, and the electronic shutter function of a corresponding ring CCD is made to match the blinking. This makes it possible to remove crosstalk disturbance between the blinking of the pointing device 101 and that of the main body unit 102 while maintaining the resistance to disturbance light.

(Fifth Embodiment)

In the above-described third and fourth embodiments, the main body unit 102 and display device 103 are preferably integrated. Only when this condition is satisfied, the motion of the cursor or the motion of a character of a game in the display screen of the display device 103 can be intuitively sensed as the pointing device 101 is operated.

However, when the display screen is large, or the display screen is at a remote position, it is more convenient to fix a main body unit 102 at a position relatively close to the user and performs 3D input with reference to the main body unit 102.

In the fifth embodiment, the main body unit 102 is fixed, e.g., on a table in a large conference room, on a dining table in a dining room, or on a table in a living room, and the user performs input operation on the main body unit 102 for 3D input.

In addition to the effects described in the third and fourth embodiments, when a large display device 103 is used, the number of degrees of freedom of the installation position of the main body unit 102 increases, resulting in excellent convenience.

The object of the present invention can also be achieved by supplying a storage medium which stores software program codes for implementing the functions of the above-described embodiments to a system or apparatus and causing the computer (or a CPU or MPU) of the system or apparatus to read out and execute the program codes stored in the storage medium.

In this case, the program codes read out from the storage medium implement the functions of the above-described embodiments by themselves, and the storage medium which stores the program codes constitutes the present invention.

As the storage medium for supplying the program codes, for example, a floppy disk, hard disk, optical disk, magnetooptical disk, CD-ROM, CD-R/RW, DVD-ROM/RAM, magnetic tape, nonvolatile memory card, ROM, or the like can be used.

The functions of the above-described embodiments are implemented not only when the readout program codes are executed by the computer but also when the operating system (OS) running on the computer performs part or all of actual processing on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As many apparently widely different embodiments of the present invention can be made without departing from the spirit and scope thereof, it is to be understood that the invention is not limited to the specific embodiments thereof except as defined in the appended claims.

What is claimed is:

1. A coordinate input apparatus comprising a fixed unit fixed at a predetermined position and a pointing device operated by a user, said coordinate input apparatus for inputting coordinate data representing coordinates by said pointing device,
   wherein said fixed unit comprises:
      first reception means for receiving a first signal from said pointing device, and
      first transmission means for transmitting a second signal to said pointing device, and
   wherein said pointing device comprises:
      second reception means for receiving said second signal from said first transmission means,
      coordinate calculation means for calculating the coordinate data on the basis of said second signal received by said second reception means, and
      second transmission means for transmitting at least the coordinate data calculated by said coordinate calculation means to said first reception means as the first signal,
      wherein said second reception means comprises a plurality of line sensors laid out in different directions,
      wherein each of said line sensors comprises a linear photoelectric conversion element having a circulative charge transfer path constituted by a plurality of cells, and
      wherein said line sensor is constructed to transfer charges simultaneously from all pixels of an arbitrary linear photoelectric conversion element to a charge transfer path connected to the circulative charge transfer path as a branch and then transfer the charges to the circulative charge transfer path, or transfer the charges simultaneously from all pixels of an arbitrary linear photoelectric conversion element directly to the circulative charge transfer path.

2. The apparatus according to claim 1, wherein said second transmission means transmits a signal containing switch information representing a start of operation and a supplementary information signal to said first reception means as the first signal.

3. The apparatus according to claim 1, wherein each of said first and second transmission means comprises a light-emitting element for emitting light.

4. The apparatus according to claim 1, wherein each of said first and second reception means comprises a light-receiving element for receiving light.

5. The apparatus according to claim 1, wherein said line sensor circulates the charges on the circulative charge transfer path in synchronism with ON/OFF of an electronic shutter function and additionally accumulates the charges from the photoelectric conversion element at the same line position in every circulation of the charges, and
   a signal read section is connected to a cell midway along the circulative charge transfer path to externally output a voltage proportional to the charges passing through the cell or output a voltage proportional to a difference in passing charges between two adjacent cells.

6. The apparatus according to claim 5, wherein
   the electronic shutter function is turned on once at timings when said first transmission means emits light and said first transmission means emits no light to transfer the charges simultaneously from all pixels of the linear photoelectric conversion element to corresponding cells of the circulative charge transfer path once at each timing, and
   said line sensor is designed to externally perform control to circulate the charges while additionally accumulating the charges by turning on/off the electronic shutter function and control to circulate the charges while fixing the electronic shutter function in an OFF state to stop additionally accumulating the charges.

7. The apparatus according to claim 6, wherein the number of times of additional accumulation of the charges of said line sensor is controlled by the external control function in accordance with a reception amount of the light emitted from said first transmission means.

8. The apparatus according to claim 1, wherein said second transmission means synthesizes the coordinate data with a timing signal for synchronizing operation of said line sensor with that of said first transmission means and transmits the synthesized signal to said first reception means as the first signal.

9. The apparatus according to claim 8, wherein said first transmission means blinks in synchronism with the electronic shutter function in accordance with a predetermined timing sequence generated on the basis of the timing signal.

10. A storage medium which stores a program for causing a computer to function as each component of the coordinate input apparatus of claim 1.

11. The apparatus according to claim 1, wherein said coordinate data represents amounts of changes in coordinates.

12. A coordinate input method in which a fixed unit fixed at a predetermined position and a pointing device operated by a user are used, and the pointing device is used to input coordinate data representing coordinates, comprising:
   a first transmission step of transmitting a first signal representing a start of operation from the pointing device to the fixed unit;
   a first reception step of receiving the first signal by the fixed unit;
   a second transmission step of transmitting a second signal representing a direction of presence of the fixed unit itself to the pointing device;
   a second reception step of receiving the second signal by the pointing device; and
   a calculation step of calculating the coordinate data in the pointing device on the basis of the second signal,
   wherein said pointing device comprises a plurality of line sensors laid out in different directions
   wherein each of said line sensors comprises a linear photoelectric conversion element having a circulative charge transfer path constituted by a plurality of cells,
   wherein said line sensor is constructed to transfer charges simultaneously from all pixels of an arbitrary linear photoelectric conversion element for a charge transfer path connected to the circulative charge transfer path as a branch and then transfer the charges to the circulative charge transfer path, or transfer the charges simultaneously from all pixels of an arbitrary linear photoelectric conversion element directly to the circulative charge transfer path.

13. The method according to claim 12, wherein each of the first and second signals is an optical signal emitted/received between the fixed unit and the pointing device.

14. A storage medium which stores a program for executing a processing procedure of the coordinate input method of claim 12.

15. A computer program for executing a processing procedure of the coordinate input method of claim 12.

16. The method according to claim 12, wherein said coordinate data represents amounts of changes in coordinates.

17. A coordinate input pointing device operated by a user and used to input coordinate data representing coordinates to a fixed unit fixed at a predetermined position, comprising:
   transmission means for transmitting a first signal to the fixed unit;
   reception means for receiving a second signal from the fixed unit; and
   coordinate calculation means for calculating the coordinate data on the basis of the second signal received by said reception means,
   wherein the coordinate data calculated on the basis of the second signal is transmitted to the fixed unit as the first signal,
   wherein said reception means comprises a plurality of line sensors laid out in different directions,
   wherein each of said line sensors comprises a linear photoelectric conversion element having a circulative charge transfer path constituted by a plurality of cells,
   wherein said line sensor is designed to transfer charges simultaneously from all pixels of an arbitrary linear photoelectric conversion element to a charge transfer path connected to the circulative charge transfer path as a branch and then transfer the charges to the circulative charge transfer path, or transfer the charges simultaneously from all pixels of an arbitrary linear photoelectric conversion element directly to the circulative charge transfer path.

18. The device according to claim 17, wherein said transmission means transmits a signal containing switch information representing a start of operation and a supplementary information signal to the fixed unit as the first signal.

19. The device according to claim 17, wherein said transmission means comprises a light-emitting element for emitting light.

20. The device according to claim 17, wherein said reception means comprises a light-receiving element for receiving light.

21. The device according to claim 17, wherein said line sensor circulates the charges on the circulative charge transfer path in synchronism with ON/OFF of an electronic shutter function and additionally accumulates the charges from the photoelectric conversion element at the same line position in every circulation of the charges, and
   a signal read section is connected to a cell midway along the circulative charge transfer path to externally output a voltage proportional to the charges passing through the cell or output a voltage proportional to a difference in passing charges between two adjacent cells.

22. The device according to claim 21, wherein the electronic shutter function is turned on once at timings when said first transmission means emits light and said first transmission means emits no light to transfer the charges simultaneously from all pixels of the linear photoelectric conversion element to corresponding cells of the circulative charge transfer path once at each timing, and
   said line sensor is designed to externally perform control to circulate the charges while additionally accumulating the charges by turning on/off the electronic shutter function and control to circulate the charges while fixing the electronic shutter function in an OFF state to stop additionally accumulating the charges.

23. The device according to claim 22, wherein the number of times of additional accumulation of the charges of said line sensor is controlled by the external control function in accordance with a reception amount of the light emitted from the fixed unit.

24. The device according to claim 17, wherein said transmission means synthesizes the coordinate data with a timing signal for synchronizing operation of said line sensor with that of the fixed unit and transmits the synthesized signal to the fixed unit as the first signal.

25. The device according to claim 24, wherein the fixed unit blinks in synchronism with the electronic shutter function in accordance with a predetermined timing sequence generated on the basis of the timing signal.

26. A storage medium which stores a program for causing a computer to function as each component of the coordinate input pointing device of claim 17.

27. A computer program for causing a computer to function as each component of the coordinate input pointing device of claim 17.

28. The device according to claim 17, wherein said coordinate data represents amounts of changes in coordinates.

29. A coordinate input apparatus comprising
a pointing device and a main body unit, said coordinate input apparatus for inputting coordinate information indicated by said pointing device,
wherein said main body unit comprises:
first detection means for detecting a first incident direction defined as an incident direction of light emitted from said pointing device with reference to said main body unit, and
first calculation means for calculating 3D translation information of said pointing device with respect to said main body unit on the basis of a detection result from said first detection means, and
wherein said pointing device comprises:
second detection means for detecting a second incident direction defined as a relative incident direction of light emitted from said main body unit with reference to said pointing device, and
second calculation means for calculating 3-axis rotation information of said pointing device on the basis of a detection result from said second detection means, and
wherein calculation results calculated by said first and second calculation means are substantially simultaneously output,
wherein each of said first and second detection means comprises a plurality of line sensors laid out in different directions,
wherein each of said line sensors comprises a linear photoelectric conversion element having a circulative charge transfer path constituted by a plurality of cells, and
wherein said line sensor is constructed to transfer charges simultaneously from all pixels of an arbitrary linear photoelectric conversion element to a charge transfer path connected to the circulative charge transfer path as a branch and then transfer the charges to the circulative charge transfer path, or transfer the charges simultaneously from all pixels of an arbitrary linear photoelectric conversion element directly to the circulative charge transfer path.

30. The apparatus according to claim 29, wherein
said first detection means has first line sensors in X and Y directions, said first line sensors detecting the first incident direction,
said main body unit further comprises a plurality of first light-emitting elements,
said first line sensors comprise a plurality of line sensors in at least one of the X and Y directions, which are spaced apart by a predetermined interval, and
said plurality of first light-emitting elements comprise at least three light-emitting elements linearly laid out and spaced apart by a predetermined interval.

31. The apparatus according to claim 30, wherein said first calculation means further calculates, on the basis of the first incident direction, 3D position coordinates of said pointing device with reference to a predetermined position, an amount of change in 3D position coordinates, and a moving amount corresponding to the 3D position coordinates.

32. The apparatus according to claim 30, wherein
each of said first and second line sensors is a ring CCD formed from a linear photoelectric conversion element and having a circulative charge transfer path constructed by a plurality of cells,
charges are transferred simultaneously from all pixels of an arbitrary linear photoelectric conversion element to a charge transfer path connected to the circulative charge transfer path as a branch and then transferred to the circulative charge transfer path, or transferred simultaneously from all pixels of an arbitrary linear photoelectric conversion element directly to the circulative charge transfer path, and
the charges on the circulative charge transfer path are circulated in synchronism with ON/OFF of an electronic shutter function and additionally accumulated from the photoelectric conversion element at the same line position in every circulation of the charges.

33. The apparatus according to claim 32, wherein in said line sensor, a signal read section is connected to a cell midway along the circulative charge transfer path to externally output a voltage proportional to the charges passing through the cell.

34. The apparatus according to claim 33, wherein the signal read section can nondestructively read one of a voltage proportional to a difference of charges in an odd-numbered cell with respect to those of an even-numbered cell and a voltage proportional to a difference of charges in the even-numbered cell with respect to those of the odd-numbered cell.

35. The apparatus according to claim 32, wherein
the electronic shutter function is turned on once during each of ON and OFF periods of light-emission-side blinking of incident light, and
the charges accumulated at each timing are transferred to adjacent cells on the circulative charge transfer path.

36. The apparatus according to claim 35, wherein said line sensor adaptively controls the number of times of accumulation in accordance with a light reception amount or an amount of accumulated charges.

37. The apparatus according to claim 32, wherein
said line sensor is designed to externally perform control to circulate the charges while additionally accumulating the charges by turning on/off the electronic shutter function and control to circulate the charges while fixing the electronic shutter function in an OFF state to stop additionally accumulating the charges.

38. The apparatus according to claim 32, wherein blinking of light emitted from said pointing device is synchronized with an electronic shutter function of said first line sensors of said main body unit, and blinking of light emitted from said main body unit is synchronized with an electronic shutter function of said line sensors of said pointing device.

39. The apparatus according to claim 29, wherein
said second detection means has second line sensors in X and Y directions, said second line sensors detecting the second incident direction, and
said pointing device further comprises at least one second light-emitting element, and a plurality of switches.

40. The apparatus according to claim 39, wherein
said second calculation means further calculates, on the basis of the second incident direction, a tilt of said pointing device with reference to a predetermined direction, and an amount of change in tilt, and
said second light-emitting element transmits to said main body unit information obtained by synthesizing a calculation result from said second calculation means and switch information of said plurality of switches.

41. The apparatus according to claim 40, wherein
a Z-axis of said pointing device is defined as a direction indicating a front side of said pointing device or a direction from said pointing device to said main body unit, X0- and Y0-axes of said pointing device are defined as coordinate axes that rotate along the Z-axis as said pointing device itself rotates along the Z-axis, and are perpendicular to each other and perpendicular to the Z-axis of said pointing device, and the tilt is detected as a synthesis of θx, θy, and θz defined on the basis of rotation along the three, X0-, Y0-, and Z-axes.

42. The apparatus according to claim 40, wherein a Z-axis of said pointing device is defined as a direction indicating a front side of said pointing device or a direction from said pointing device to said main body unit, X0-fix and Y0__fix axes of said pointing device are defined as coordinate axes that do not rotate along the Z-axis as said pointing device itself rotates along the Z-axis, and are perpendicular to each other and perpendicular to the Z-axis of said pointing device, and the tilt is detected as a synthesis of θx__fix, θy__fix, and θz defined on the basis of rotation along the three, X0__fix, Y0__fix, and Z-axes.

43. The apparatus according to claim 39, wherein said second light-emitting element has a function of emitting light in accordance with a signal modulated by a carrier having a frequency much higher than a blinking frequency within a blinking period of light-emission-side blinking of the incident light, and transmits the time series information of blinking and the switch information on said pointing device by controlling presence/absence of modulation.

44. The apparatus according to claim 43, wherein said main body unit comprises a bandpass filter having a center frequency substantially equal to a modulation frequency in said second light-emitting element, and a detection circuit, and detects the time series information and switch information transmitted by said second light-emitting element by passing a signal obtained by said first light-receiving element through said bandpass filter and detection circuit.

45. The apparatus according to claim 29, wherein first light-emitting operation of the light emitted from said main body unit has a first correspondence relationship synchronized with second detection operation of said second detection means, second light-emitting operation of the light emitted from said pointing device has a second correspondence relationship synchronized with first detection operation of said first detection means, and the first and second correspondence relationships satisfy a predetermined condition.

46. The apparatus according to claim 45, wherein for the synchronization, with reference to time of a leading edge or trailing edge of arbitrary lighting of the blinking obtained from a time series signal detected by detection means which is characterized by having a function of emitting light in accordance with the signal modulated by the carrier having the frequency sufficiently higher than the blinking frequency within the blinking period of light-emission-side blinking of the incident light, and transmitting the time series information of blinking and the switch information on said pointing device by controlling the presence/absence of modulation, a timing sequence as a control signal of said ring CCD is started, and a series of operations are repeated every time coordinates of one point are processed.

47. A storage medium which stores a program for causing a computer to function as each component of the coordinate input apparatus of claim 29.

48. A computer program for causing a computer to function as each component of the coordinate input apparatus of claim 29.

49. A coordinate input method of using a pointing device and a main body unit and inputting coordinate information indicated by the pointing device, comprising:

a first detection step of detecting, by the main body unit, a first incident direction defined as an incident direction of light emitted from the pointing device with reference to the main body unit;

a first calculation step of calculating 3D translation information of the pointing device with respect to the main body unit on the basis of a detection result in the first detection step;

a second detection step of detecting, by the pointing device, a second incident direction defined as a relative incident direction of light emitted from the main body unit with reference to the pointing device; and a second calculation step of calculating 3-axis rotation information of the pointing device on the basis of a detection result in the second detection step, wherein calculation results calculated in the first and second calculation steps are substantially simultaneously output, wherein said pointing device comprises a plurality of line sensors laid out in different directions wherein each of said line sensors comprises a linear photoelectric conversion element having a circulative charge transfer path constituted by a plurality of cells, and said line sensor is designed to transfer charges simultaneously from all pixels of an arbitrary linear photoelectric conversion element to a charge transfer path connected to the circulative charge transfer path as a branch and then transfer the charges to the circulative charge transfer path, or transfer the charges simultaneously from all pixels of an arbitrary linear photoelectric conversion element directly to the circulative charge transfer path.

50. A storage medium which stores a program for executing a processing procedure of the coordinate input method of claim 49.

51. A computer program for executing a processing procedure of the coordinate input method of claim 49.

52. A coordinate input apparatus which comprises a pointing device and a main body unit, said coordinate input apparatus for inputting coordinate information indicated by said pointing device, wherein said main body unit comprises:
first light-emitting means for emitting light,
first detection means for detecting the light emitted from said pointing device, and
wherein said pointing device comprises:
second light-emitting means for emitting light, and
second detection means for detecting the light emitted from said main body unit,
wherein a first light-emitting operation of said first light-emitting means has a first correspondence relationship synchronized with a second detection operation of said second detection means,
wherein a second light-emitting operation of said second light-emitting means has a second correspondence relationship synchronized with a first detection operation of said first detection means,
wherein said first and second correspondence relationships satisfy a predetermined condition,
wherein said first detection means comprises a first line sensor having a first electronic shutter function synchronized with a first blink pattern period of the light which is emitted from said pointing device in accordance with a first blink pattern, wherein said first line sensor outputs a signal corresponding to a difference between charges accumulated during an ON period of the first blink pattern and those accumulated during an OFF period, wherein said second detection means comprises a second line sensor having a second electronic shutter function synchronized with a second blink pattern period of the light which is emitted from said main body unit in accordance with a second blink pattern, and wherein said second line sensor outputs a signal corresponding to a difference between charges accumulated during an ON period of the second blink pattern and those accumulated during an OFF period.

53. The apparatus according to claim 52, wherein the second blink pattern period is twice the first blink pattern period, blinking in the first blink pattern period is performed a total of two times during ½ the first blink pattern period in each second electronic shutter function ON period, and the first ON period during the second blink pattern period and the ON period of the first blink pattern period are within the second electronic shutter function ON period, and the first electronic shutter period of the first electronic shutter function is twice the second electronic shutter period of the second electronic shutter function, the first electronic shutter function ON period includes the twice ON periods of the second blink pattern period, and an OFF timing of the first electronic shutter function matches one of OFF timings of the second electronic shutter function.

54. The apparatus according to claim 53, wherein for a combination of the second electronic shutter period and the first blink pattern period and a combination of the first electronic shutter period and the second blink pattern period satisfy the predetermined condition in that "for a first-order electronic shutter period Ts, a first-order blink pattern period of first-order blinking is 2*Ts, the number of times of ON operations during one first-order blink pattern period is one, the ON time of the first-order blinking is always included in an even-numbered (or odd-numbered) ON region of the first-order electronic shutter, an nth-order blink pattern period of nth-order blinking is Ts *$2^n$ the total number of times of ON operations is $2^{n-1}$ times at the interval Ts during ½ the nth blink pattern period in each first-order electronic shutter ON period, for a phase relationship, a first ON operation in each blink pattern period is performed during the first-order electronic shutter ON period corresponding to the first-order blinking ON period, the nth-order electronic shutter period is Ts*$2^{n-1}$, one nth-order electronic shutter ON period includes all ON periods during one nth-order blink pattern period, and the nth-order electronic shutter OFF period matches at least one of the first-order electronic shutter OFF periods", and the combination is included in combination of the nth-order blinking and electronic shutter and is a combination with different orders.

55. A storage medium which stores a program for causing a computer to function as each component of the coordinate input apparatus of claim 52.

56. A computer program for causing a computer to function as each component of the coordinate input apparatus of claim 52.

57. A coordinate input method of using a pointing device and a main body unit and inputting coordinate information indicated by the pointing device, comprising:

the first light-emitting step of emitting light from the main body unit;

the first detection step of detecting, by the main body unit, light emitted from the pointing device;

the second light-emitting step of emitting light from the pointing device; and the second detection step of detecting, by the pointing device, the light emitted from the main body unit, wherein first light-emitting operation in the first light-emitting step has a first correspondence relationship synchronized with second detection operation in the second detection step, second light-emitting operation in the second light-emitting step has a second correspondence relationship synchronized with first detection operation in the first detection step, and the first and second correspondence relationships satisfy a predetermined condition, wherein said main body unit comprises a first line sensor having a first electronic shutter function synchronized with a first blink pattern period of the light which is emitted from said pointing device in accordance with a first blink pattern, wherein said first line sensor outputs a signal corresponding to a difference between charges accumulated during an ON period of the first blink pattern and those accumulated during an OFF period, wherein said pointing device comprises a second line sensor having a second electronic shutter function synchronized with a second blink pattern period of the light which is emitted from said main body unit in accordance with a second blink pattern, and wherein said second line sensor outputs a signal corresponding to a difference between charges accumulated during an ON period of the second blink pattern and those accumulated during an OFF period.

58. A storage medium which stores a program for executing a processing procedure of the coordinate input method of claim 57.

59. A computer program for executing a processing procedure of the coordinate input method of claim 57.

* * * * *